(12) United States Patent
Zornes

(10) Patent No.: US 6,631,603 B2
(45) Date of Patent: Oct. 14, 2003

(54) BUILDING STRUCTURES

(75) Inventor: David A. Zornes, Redmond, WA (US)

(73) Assignee: Hexablock, Inc., Sammamish, WA (US)

( * ) Notice: Subject to any disclaimer, the term of this patent is extended or adjusted under 35 U.S.C. 154(b) by 0 days.

(21) Appl. No.: 09/879,820

(22) Filed: Jun. 11, 2001

(65) Prior Publication Data

US 2002/0069603 A1 Jun. 13, 2002

Related U.S. Application Data

(63) Continuation of application No. PCT/US99/29738, filed on Dec. 14, 1999.
(60) Provisional application No. 60/112,309, filed on Dec. 14, 1998, provisional application No. 60/112,595, filed on Dec. 17, 1998, provisional application No. 60/113,151, filed on Dec. 19, 1998, provisional application No. 60/120,338, filed on Feb. 17, 1999, provisional application No. 60/123,780, filed on Mar. 11, 1999, provisional application No. 60/135,442, filed on May 22, 1999, provisional application No. 60/135,836, filed on May 24, 1999, provisional application No. 60/143,653, filed on Jul. 13, 1999, and provisional application No. 60/155,362, filed on Sep. 20, 1999.

(51) Int. Cl.[7] .............................. E04C 2/54; E04C 2/34; E04H 9/00
(52) U.S. Cl. .................. 52/782.1; 52/783.1; 52/784.15; 52/794.1; 52/79.1
(58) Field of Search .......................... 52/586.1, 585.1, 52/309.11, 309.7, 598, 604, 608, 782.1, 783.1, 784.15, 794.1, 79.1, 79.9, 578, 582.1

(56) References Cited

U.S. PATENT DOCUMENTS 244,997 A * 8/1881 Kennedy
254,269 A * 2/1882 Brown
640,841 A * 1/1900 Wadsworth
905,189 A * 12/1908 Hyke (List continued on next page.)

FOREIGN PATENT DOCUMENTS

| EP | 0 027 840 A1 | 5/1981 |
| FR | 2 307 217 A1 | 11/1976 |
| JP | 3205384 | 9/1991 |

*Primary Examiner*—Carl D. Friedman
*Assistant Examiner*—Kevin McDermott
(74) *Attorney, Agent, or Firm*—Christensen O'Connor Johnson Kindness PLLC

(57) ABSTRACT

A building structure offset uses hexagon structures assembled in an offset layering architecture to construct walls, floors and roofs. Hexagon building structures include interior panels adhered to both sides of a foam core. The structures also include radial cutouts the corners for offset layering assembly with another structure. Peg retainers selectively secure the hexagon building structures together. Fastening holes provide fastener locations for screwing or bolting through the layers of the hexagon structures. The holes align with an offset layer of hexagons when assembled in the axial direction. Conduit holes are selectively located depending on the fastening technique selected. The system includes five derivatives of hexagon building structures and a header, providing square, triangular, and curved geometries when assembled. Since hexagon buildings are built from hexagon building structures without customization, hexagon buildings can be rebuilt, modified, or recycled using the same materials.

33 Claims, 50 Drawing Sheets

U.S. PATENT DOCUMENTS

| | | | |
|---|---|---|---|
| 2,025,496 A | * | 12/1935 | Courtois |
| 2,111,003 A | * | 3/1938 | Petty |
| 2,136,346 A | * | 11/1938 | Wadman |
| 2,341,777 A | * | 2/1944 | Hensel |
| 2,493,458 A | | 1/1950 | Koenig |
| 2,493,470 A | * | 1/1950 | Tau |
| 3,082,489 A | * | 3/1963 | Douglas |
| 3,149,437 A | | 9/1964 | Wheeler-Nicholson |
| 3,881,284 A | | 5/1975 | Martin |
| 3,950,888 A | | 4/1976 | Hogan |
| 4,008,932 A | * | 2/1977 | Wildschut ............... 52/609 |
| 4,197,282 A | | 4/1980 | Bailly-Lacresse et al. |
| 4,537,001 A | * | 8/1985 | Uppstrom ............... 52/311 |
| 4,811,034 A | * | 3/1989 | Kaminskas ............ 343/915 |
| 4,832,881 A | | 5/1989 | Arnold, Jr. et al. |
| 4,928,575 A | | 5/1990 | Smirlock et al. |
| 4,964,834 A | | 10/1990 | Myller |
| 5,174,081 A | * | 12/1992 | Reichartz ............... 52/126.6 |
| 5,280,691 A | * | 1/1994 | Rundmund ............... 404/34 |
| 5,560,151 A | * | 10/1996 | Roberts ............... 52/245 |
| 5,652,039 A | * | 7/1997 | Tremain et al. ............ 428/121 |
| 5,735,092 A | * | 4/1998 | Clayton et al. ............ 52/309.9 |
| 5,741,571 A | * | 4/1998 | Bowerman et al. ......... 428/119 |
| 5,813,180 A | * | 9/1998 | Whitney et al. ............ 52/265 |
| 5,848,508 A | * | 12/1998 | Albrecht ............... 52/309.14 |
| 5,904,006 A | * | 5/1999 | Evans ............... 52/80.1 |
| 5,904,021 A | * | 5/1999 | Fisher ............... 472/92 |
| 6,412,231 B1 | * | 7/2002 | Palatin ............... 52/79.1 |

* cited by examiner

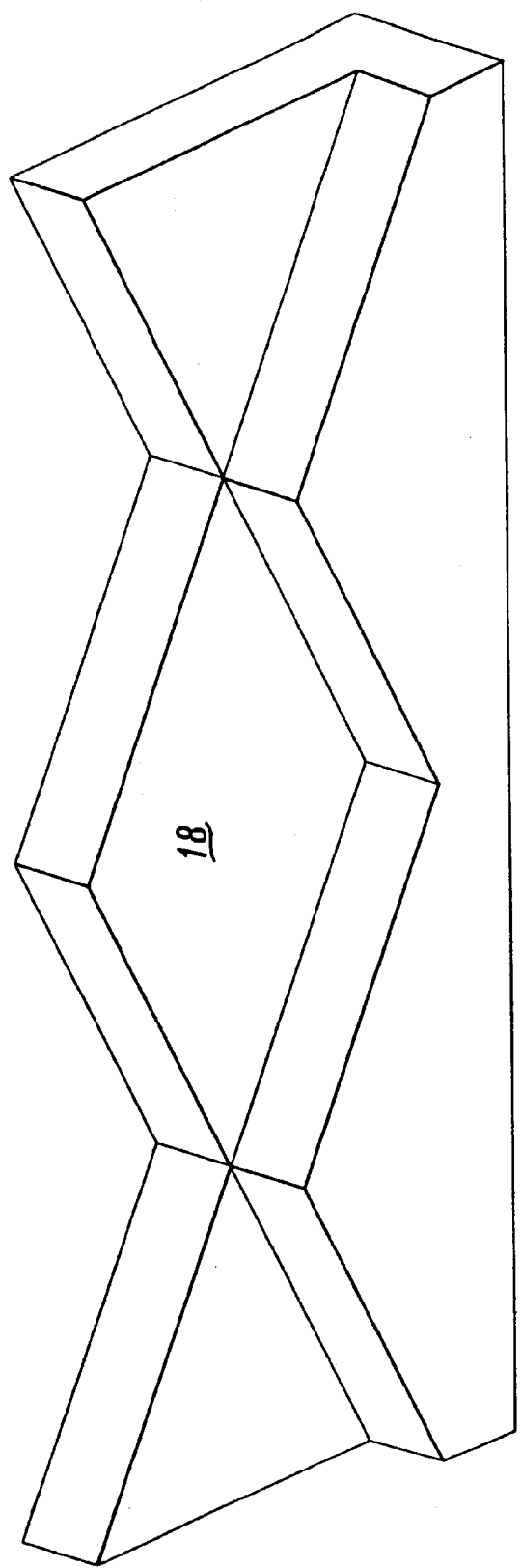

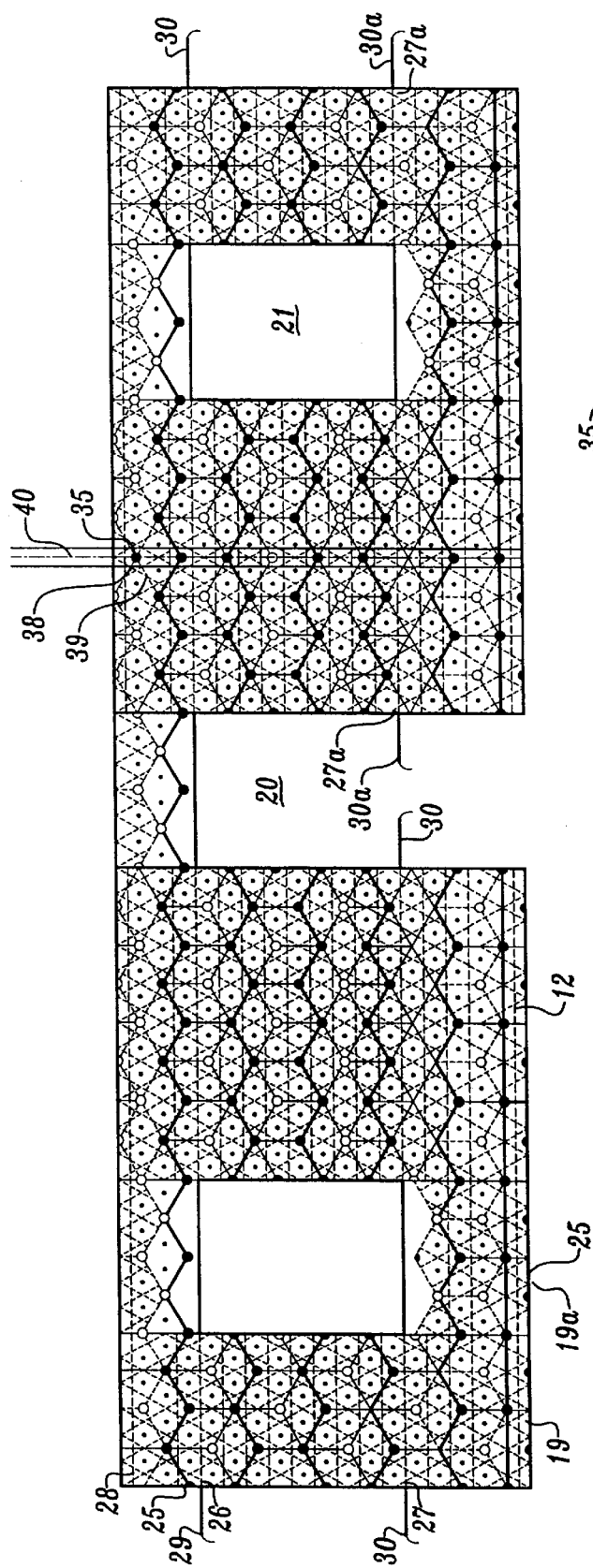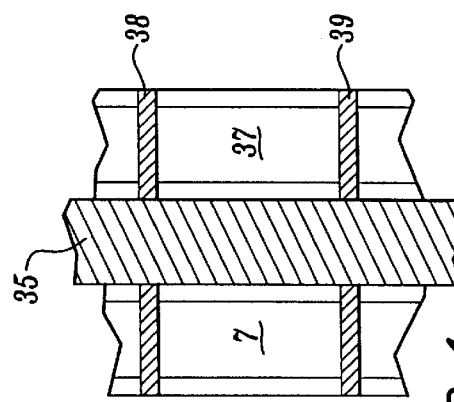
Fig. 19.
Fig. 19d.

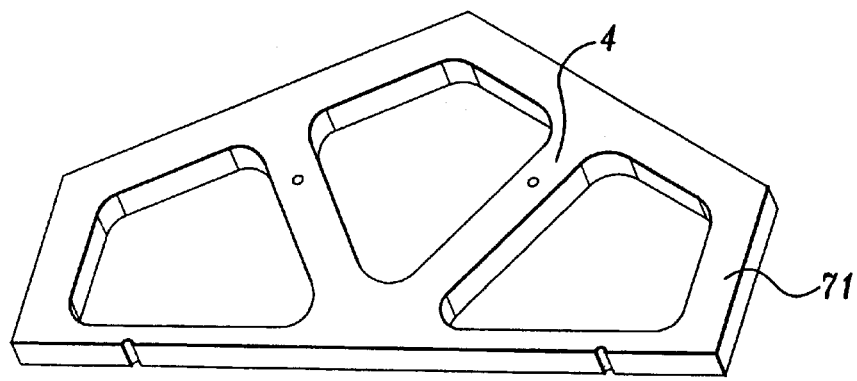
Fig. 36.
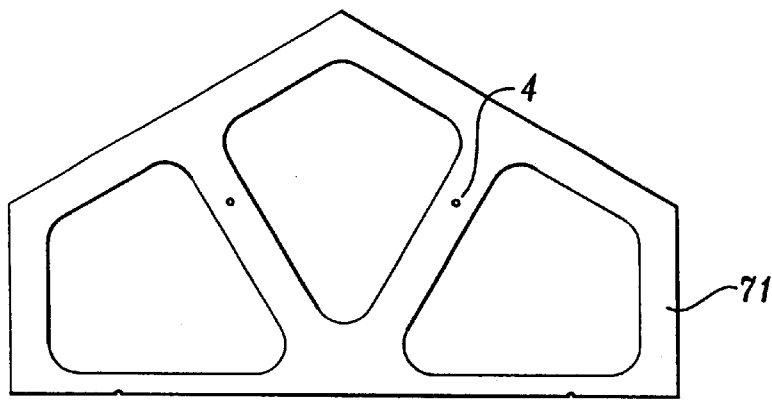
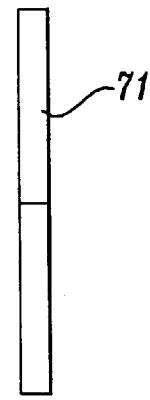
Fig. 37.              Fig. 38.

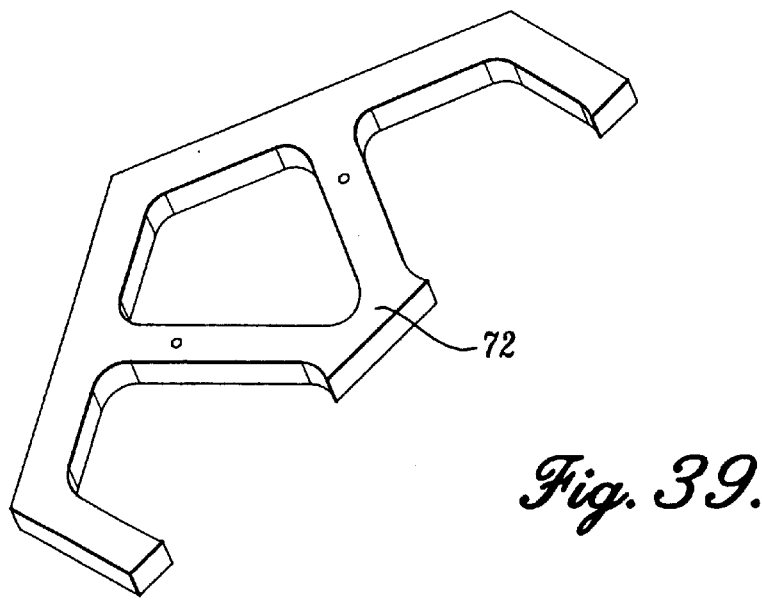
Fig. 39.
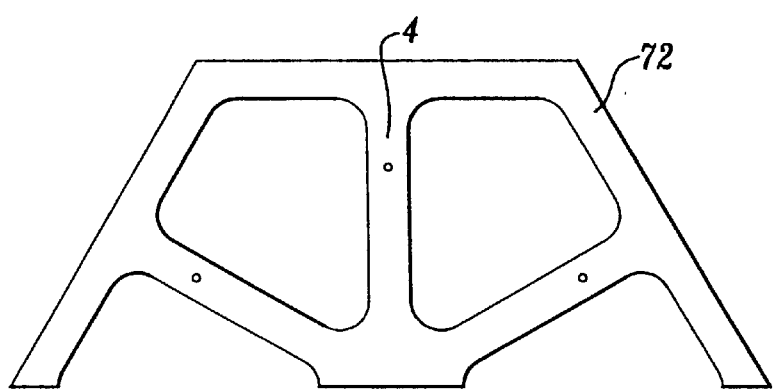
Fig. 40.
Fig. 41.

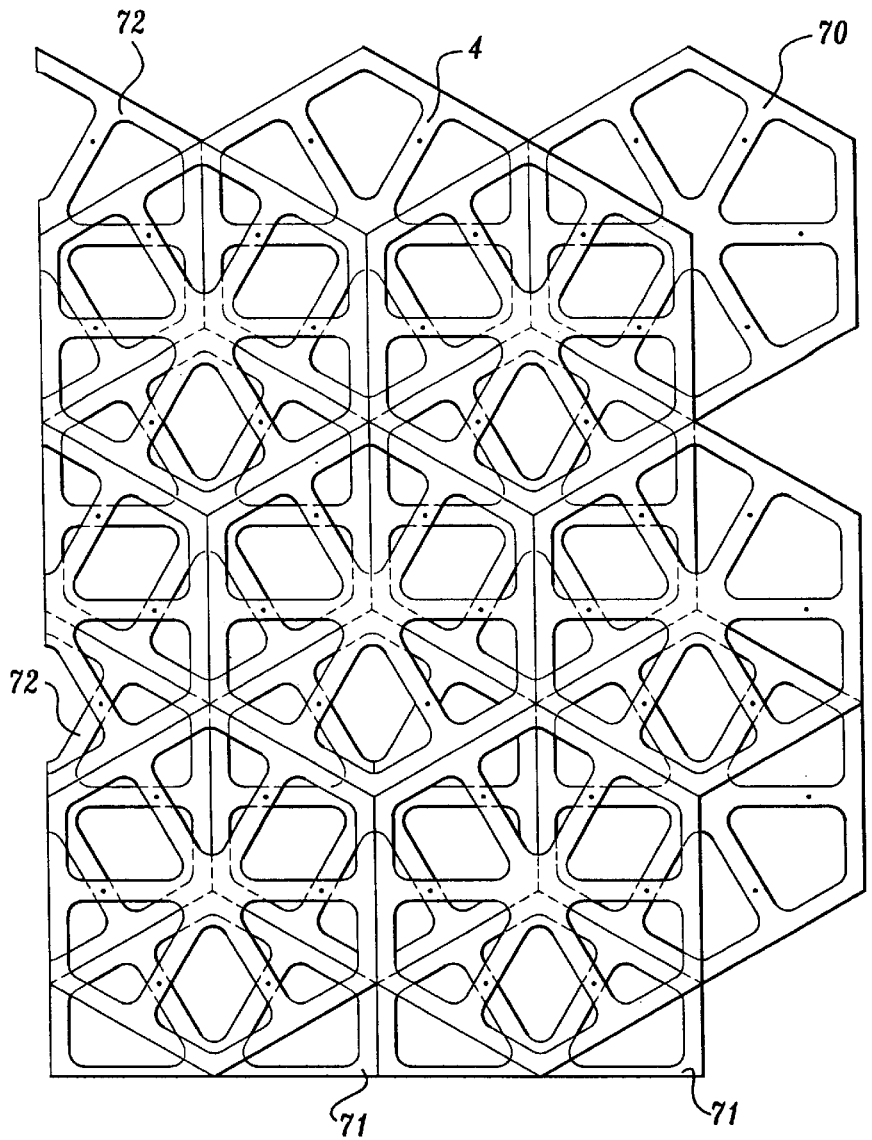
Fig. 42.
Fig. 43.

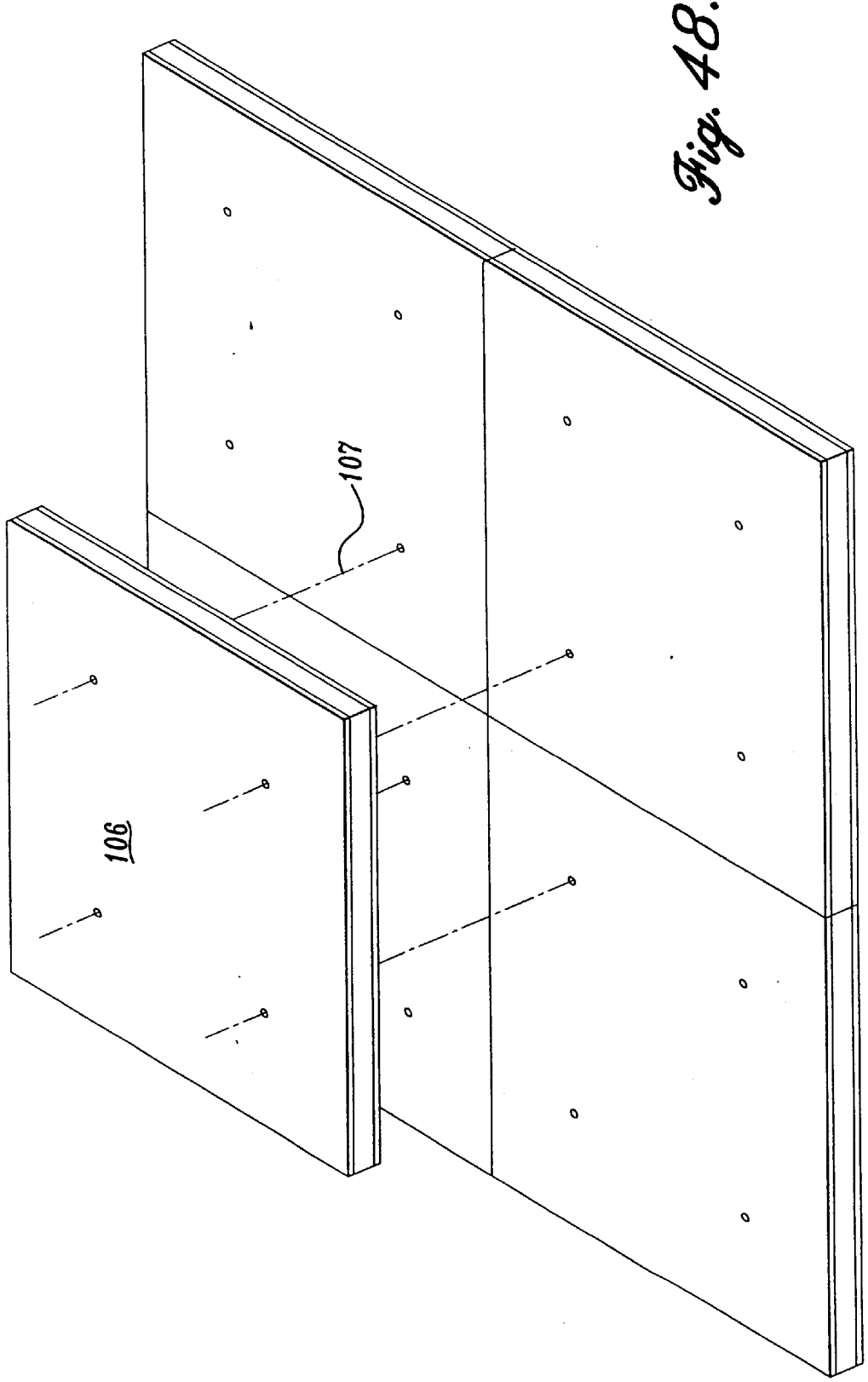

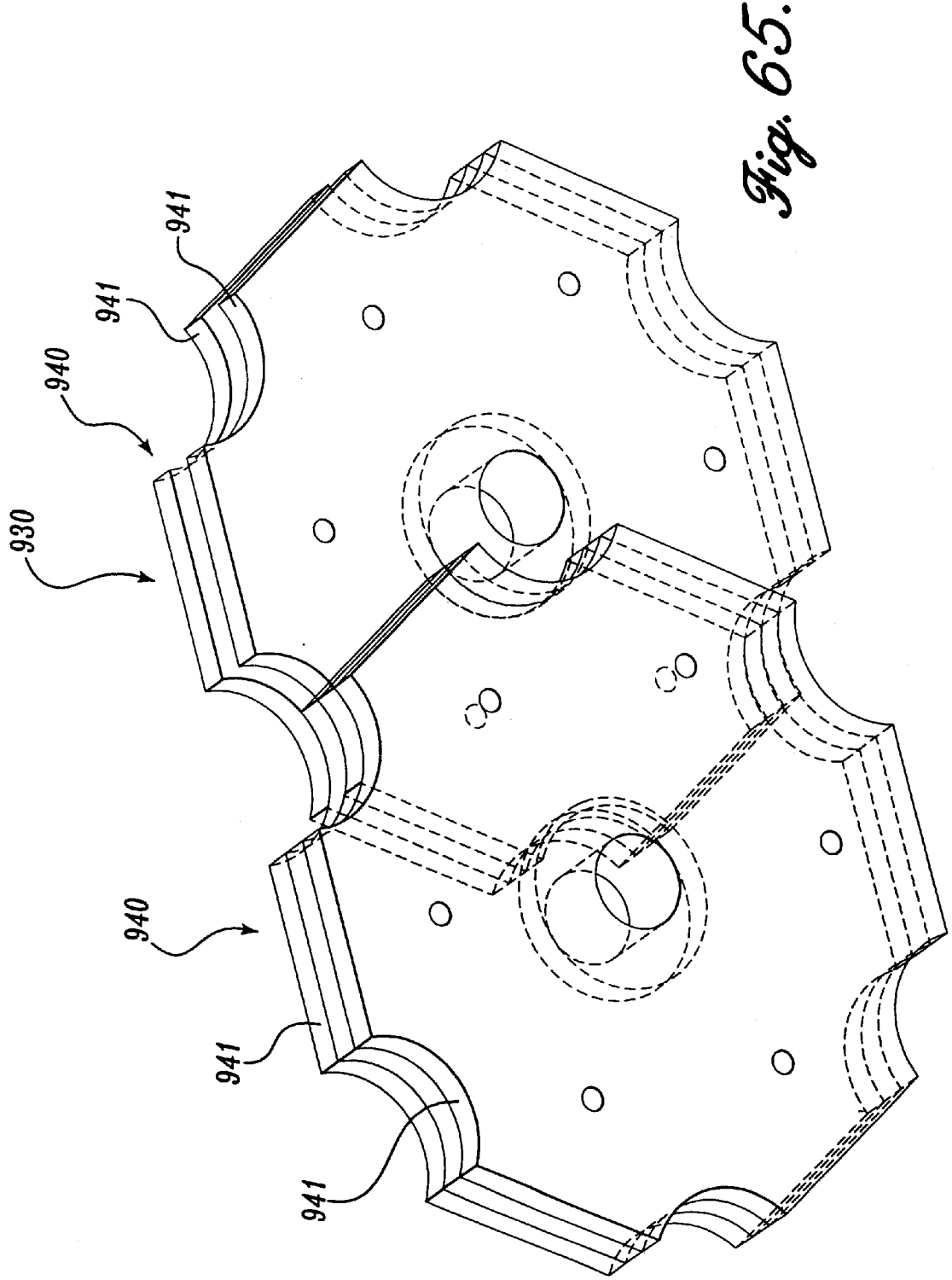

BUILDING STRUCTURES

CROSS-REFERENCE TO RELATED APPLICATIONS

This application is a continuation of co-pending International Application No. PCT/US99/29738, filed Dec. 14, 1999, which was published by the International Bureau in English on Feb. 2, 2001, and claims the benefit of the filing dates of the following U.S. provisional patent applications: No. 60/112,309, filed Dec. 14, 1998; No. 60/112,595, filed Dec. 17, 1998; No. 60/113,151, filed Dec. 19, 1998; No. 60/120,338, filed Feb. 17, 1999; No. 60/123,780, filed Mar. 11, 1999; No. 60/135,442, filed May 22, 1999; No. 60/135,836, filed May 24, 1999; No. 60/143,653, filed Jul. 13, 1999; and No. 60/155,362, filed Sep. 20, 1999.

FIELD OF THE INVENTION

The present invention is generally directed to bulding block apparatus, and more specifically to tessellation building block apparatus that can be arrayed as tessellation shapes and their derivatives, into geometric forms that construct various types of structures.

BACKGROUND OF THE INVENTION

Currently, building lumber boards, layered insulated panel structures, and composite materials are engineered products that must be custom manufactured for every job, requiring manual cuts to achieve the geometry desired in a building. It would be far superior to use a building structure that does not require customization in order to assemble the geometric shapes required to construct a building or other structure. Further, many materials are either not easy to cut, or are unhealthy to fashion on the job. It would be highly desirable to have a building structure that can tolerate high stress loads and does not require numerous amounts of customization.

Accordingly, there is a continuing need in the art for a type of building structure that can be used to produce most geometries desired in the construction of a building or other structure. It is also desirable for a building structure to recyclable, allowing building occupants to be able to change a building's geometry in relatively short time without cutting any panels to achieve the new geometry. This is useful since in the field of building materials, many composite materials are very difficult to cut, and many concrete fiber-type materials produce carcinogens when cut.

SUMMARY OF THE INVENTION

In brief, this invention is directed to a building block that does not need to be cut to assemble geometric shapes required to build a building or other structure. Materials can be selected for building blocks that are not easy to cut or healthy to cut on the job, but are good environmental material like concrete fiber sheeting. The skill level needed to produce a building is reduced. Structures are recyclable to other like buildings in the normal course of remodeling and can be retrieved for new buildings, after natural disasters like tornado, hurricane, flooding, earthquakes, and tidal waves randomly scatter building parts. The present invention is recyclable directly to another building using the same dimension of hexagon, or a hexagon twice the size and half the size. Hexagons can be clustered providing construction of smaller hexagons with larger hexagons. In one embodiment of the present invention, the apparatus is a hexagon panel assembly, which includes geometric derivatives of hexagons and a header for door and window openings to assemble single or double hexagon panel walls including a pitched roof. A floor base plate is designed to mount to the floor and establish the wall locations. Steel wire can make the independent hexagon components all one strong assembly. Contractors could pick the building off the ground as one unit.

In still a further embodiment of the present invention, square-shaped panel assemblies and their derivatives are utilized for the offset layering building structures. Square shapes, however, do not assemble into 30 degree pitched roofs, circular geometry, or provide the maximum equally spaced fasteners per square foot of buildings. Stresses are lower in hexagons than in squares. Concrete squares layered, provides a high performance foundation floor. Walls made from squares and square derivatives in the shape of rectangles and triangles form walls and 45° pitch roofs. Window and door openings can also be assembled from square tessellations and their derivatives. Square and hexagon tessellation walls and floors, or other structures can be assembled into one structure. Other types of tessellation panel assemblies are also contemplated, and can be utilized without departing from the scope of the present invention.

In still a further embodiment of the invention a hexagon tessellation frame is provided to replace dimensional lumber for the construction of ceilings, roofs, wall and other structure. These tessellation frames also can be a variety of shapes, but hexagons are a preferred embodiment for offset layering and common fastening points.

In still a further embodiment of the invention, closed cell spheres are cast into foam from aluminum, ceramic, glass, polymers, polyimides, and other materials as spheres or closed cell materials become available. Further these closed cell foam spheres can have the gases or air replaced with fluids like perilites that are phase change materials or gases like helium. Some spheres are coatings providing spheres within spheres.

Utilizing the present invention, a structurally sound building can be assembled in harsh climatic regions. The building can be assembled on snow, ice fields, desert sand, and flood plains. When panels contain foam materials the building will float on water and will rise from the ground during flooding of the grounds around the building. This building could be used as a houseboat.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 17 illustrates a perspective view of door and window header;

FIG. 19 illustrates a plan view of hexagon wall sections assembled into a wall;

FIG. 19A illustrates a cross-sectional view of the hexagon wall section of FIG. 19;

FIG. 36 illustrates a perspective view of a hexagon frame split on the flats;

FIG. 37 illustrates a side view of the split hexagon frame of FIG. 36;

FIG. 38 illustrates an end view of the split hexagon frame of FIG. 36;

FIG. 39 illustrates a perspective view of a hexagon frame split on points;

FIG. 40 illustrates a side view of the split hexagon frame of FIG. 39;

FIG. 41 illustrates an end view of the split hexagon frame of FIG. 39;

FIG. 42 illustrates a side view of a partial wall assembly of the hexagon frames of FIGS. 33, 36, and 39;

FIG. 43 illustrates an end view of hexagon frame assembly of FIG. 42;

FIG. 48 illustrates a perspective view of square layered offset tessellations showing the common fastener locations;

FIG. 65 illustrates a perspective view of several interconnecting individual hexagons.

DETAILED DESCRIPTION OF THE PREFERRED EMBODIMENT

Figure 1:
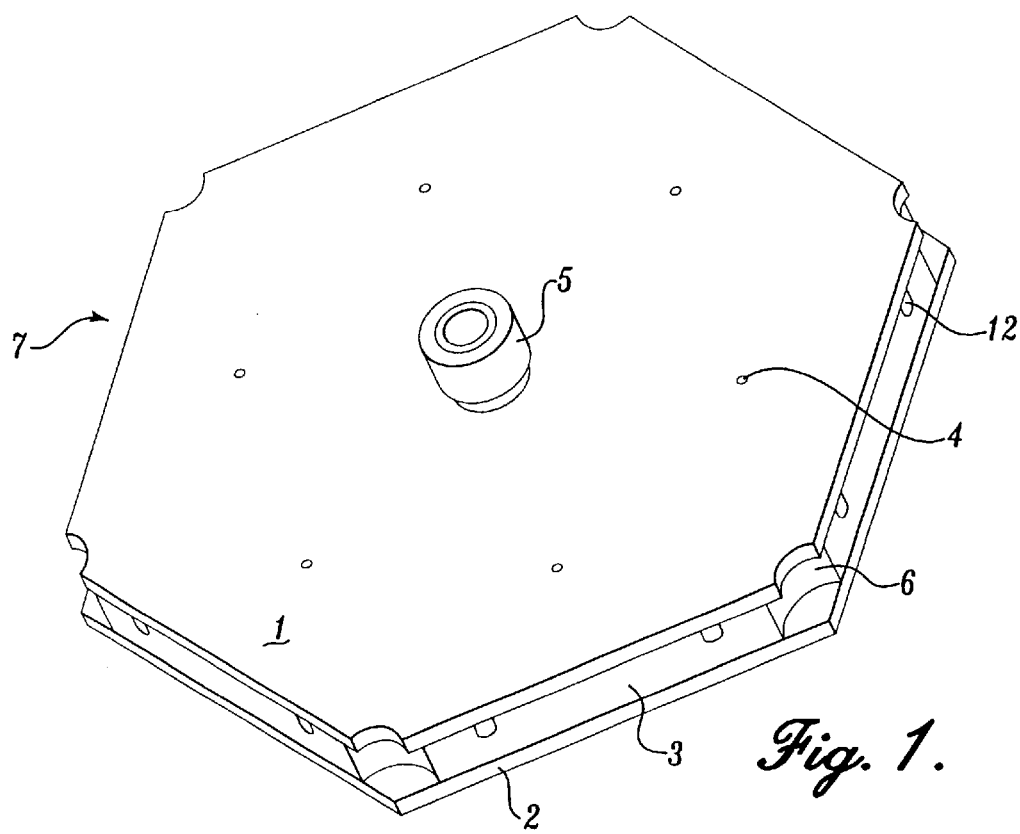
FIG. 1 illustrates a perspective view of the hexagon and peg.
Figure 3:
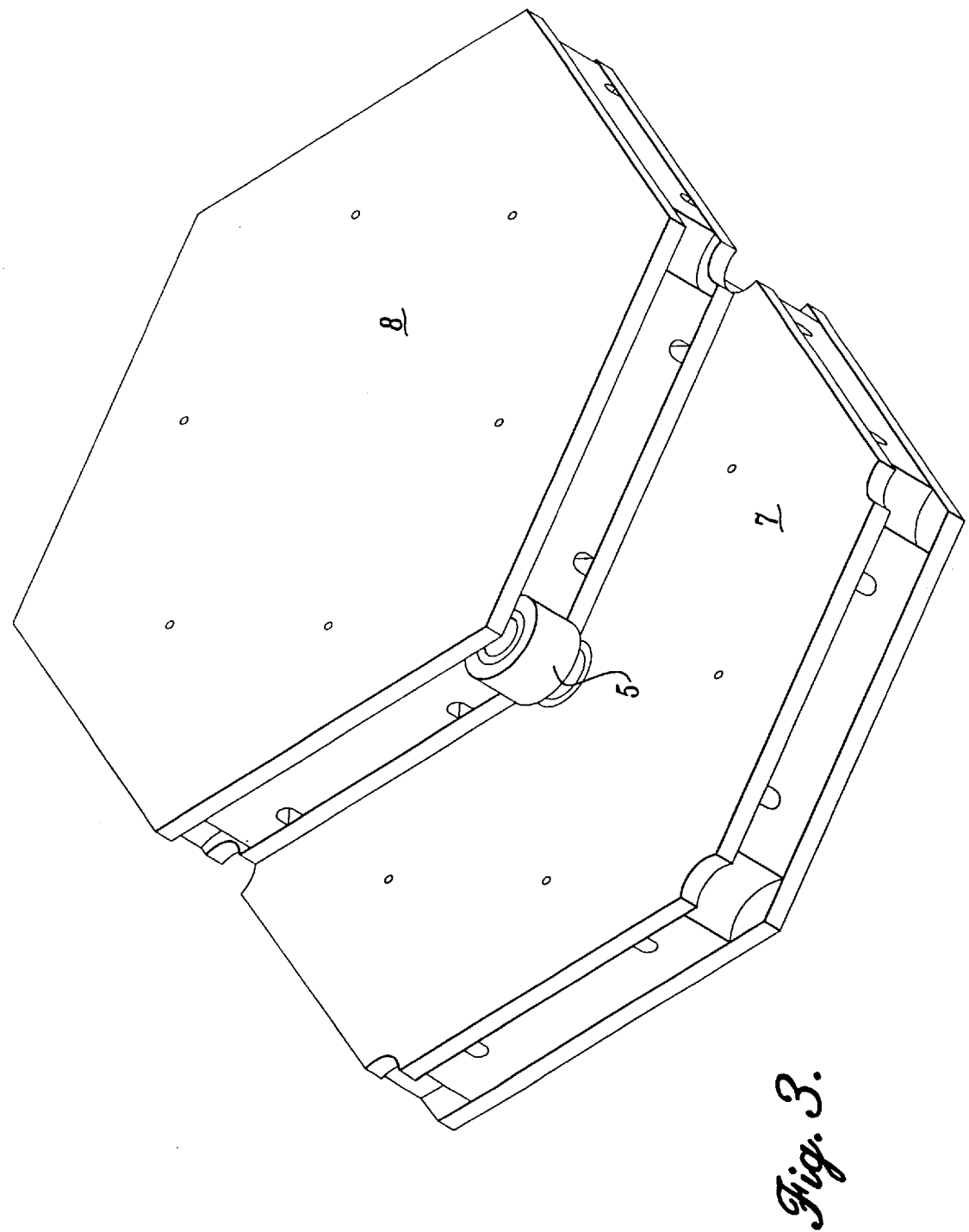
FIG. 3 illustrates a perspective view of two hexagons assembled.

FIG. 1 illustrates a preferred embodiment hexagon building structure 7 and peg retainer 5 constructed in accordance with the present invention. Preferably, six alignments fastening holes 4 are equidistantly spaced and located on interior panels 1 and 2. The panels 1 and 2 are adhered to a foam core 3. Preferably, the hexagon building structure 7 includes radial cutouts 6 for assembly to another peg retainer (not shown). Preferably, the holes 4 are the primary fastener location for screwing or bolting through the layers of the hexagon. The holes 4 align with an offset layer of hexagons when assembled in the axial direction (as shown in the assembly of FIG. 3). In one preferred embodiment of the present invention, the set of six holes 4 are the only fastening technique necessary for joining an offset layering assembly of hexagon building structures 7. Conduit holes 12 are selectively located depending on the fastening technique selected.

A preferred embodiment of the present invention includes a hexagon building structure 7 system for constructing buildings and other structures, including but not limited to, complex geometries such as door openings, window openings, roof pitches, and curved archways. Tessellations are seamless tileable patterns created from a basic geometric grid. Variations of tessellations can be formed from squares, triangles, stars shapes, hexagons, and curved shapes. Hexagons in particular, are easy to produce, and provide the benefits of forming desirable geometric shapes, lowering stresses, and increasing leverage when the hexagons are used in an offset layering configuration. The hexagon building structure 7 is symmetrical and provides seven fastening points (at the six corner points and the center point) when layered and offset equally against three other hexagon-building structures 7 of the same size. When offset equally, the center point of a first six corner points aligns with a corner point three other hexagon building structures 7, in a corner point-to-center alignment. Thus, three hexagon-building structures 7 assemble symmetrically in the same plane and connect centrally to one offset hexagon building structure 7 in another plane.

In order to layer and offset a tessellation into a composite structure that is useful, symmetrical equal fastening points are desirable for calculating and predicting structural stress. An additional structural benefit of hexagon building structures 7 is the alignment of six additional common alignment points (alignments fastening holes 4 in this preferred embodiment) that result when hexagon building structures 7 are stacked or layered in the axial direction at an equal symmetrical offset distance. The six alignments fastening holes 4 are located between the six flat edges and center. These six alignments fastening holes 4 are found by drawing lines between each corner-point and the two closest non-adjacent, corner-points (forming two isosceles triangles). The intersecting points of these lines define the location of the alignments fastening holes 4, which are equally spaced. This additional set of six fastening points provides the most substantial fastening points for maximum strength. These six alignments fastening holes 4 align in stacked offset layers of hexagons to provide common predictable fastening locations.

In a preferred embodiment of the present invention, thirteen common fastening points (the six alignments fastening holes 4, six corner points, and one center point) align in stacked offset hexagons. Other common fastening points can also be derived without departing from the scope of the present invention. Bolt, wire, or other suitable fasteners penetrate through the panels 1 and 2 to mechanically compress the panels at the fastener points. In some embodiments, the walls at right angles are compressed together for building integrity. This is desirable over panel systems dependent on adhesives.

In another aspect of the present invention, adhesives or caulking sealant are added between the panels during assembly. A void or a full sheet of insulation can also be sandwiched between the hexagon building structures 7 depending upon the particular application. Further, in some embodiments an adhesive closed cell tape seal, similar to automotive weather stripping, is wrapped around the hexagon building structures 7 prior to assembly for additional compression sealing. Preferably, joint fasteners with flat heads fasten hexagon-building structures 7 together. Screws can either partially or fully penetrate through the full set of layered hexagon building structures 7 and are also adaptable.

In other embodiments of the present invention, the peg retainer 5 is replaced with a small bolt (not shown), depending upon the strength of the materials utilized. Fasteners can be inserted through the alignments fastening holes 4 either manually or by CNC automation. The number of fasteners applied is an issue typically specified by the builder. In some embodiments, steel cables (not shown) are threaded through the wiring holes 12. The steel cable can be configured to run in all directions, as required by the builder. Further, in high wind and/or flood areas, the steel cables and wiring holes 12 can be used as a cabling system in order to anchor a building to the ground.

Figure 2:
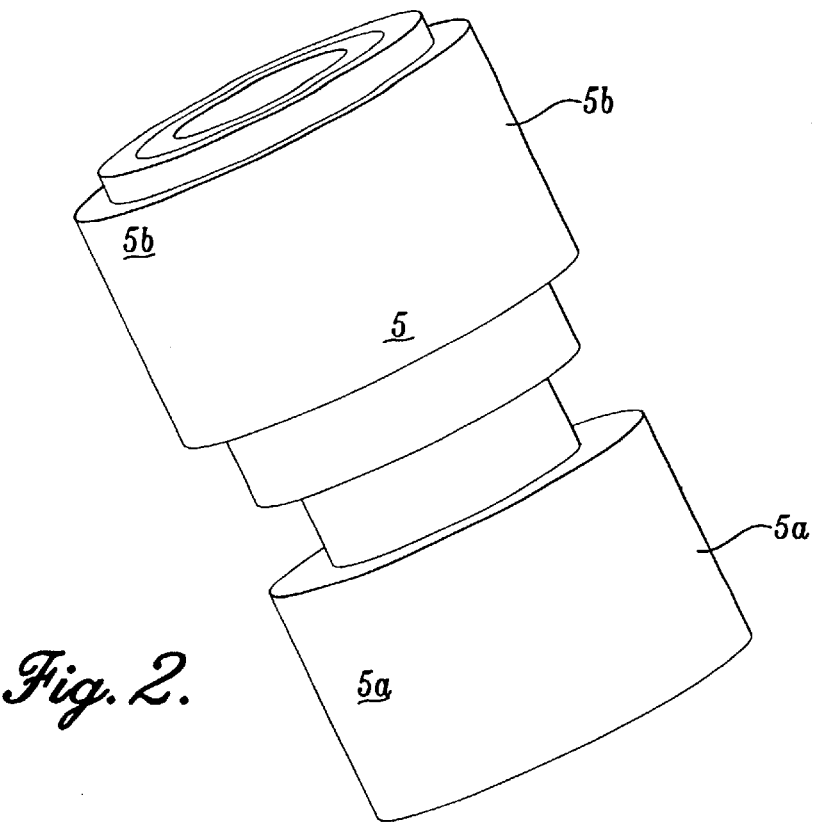
FIG. 2 illustrates a perspective view of the peg dowel.
Figure 9:
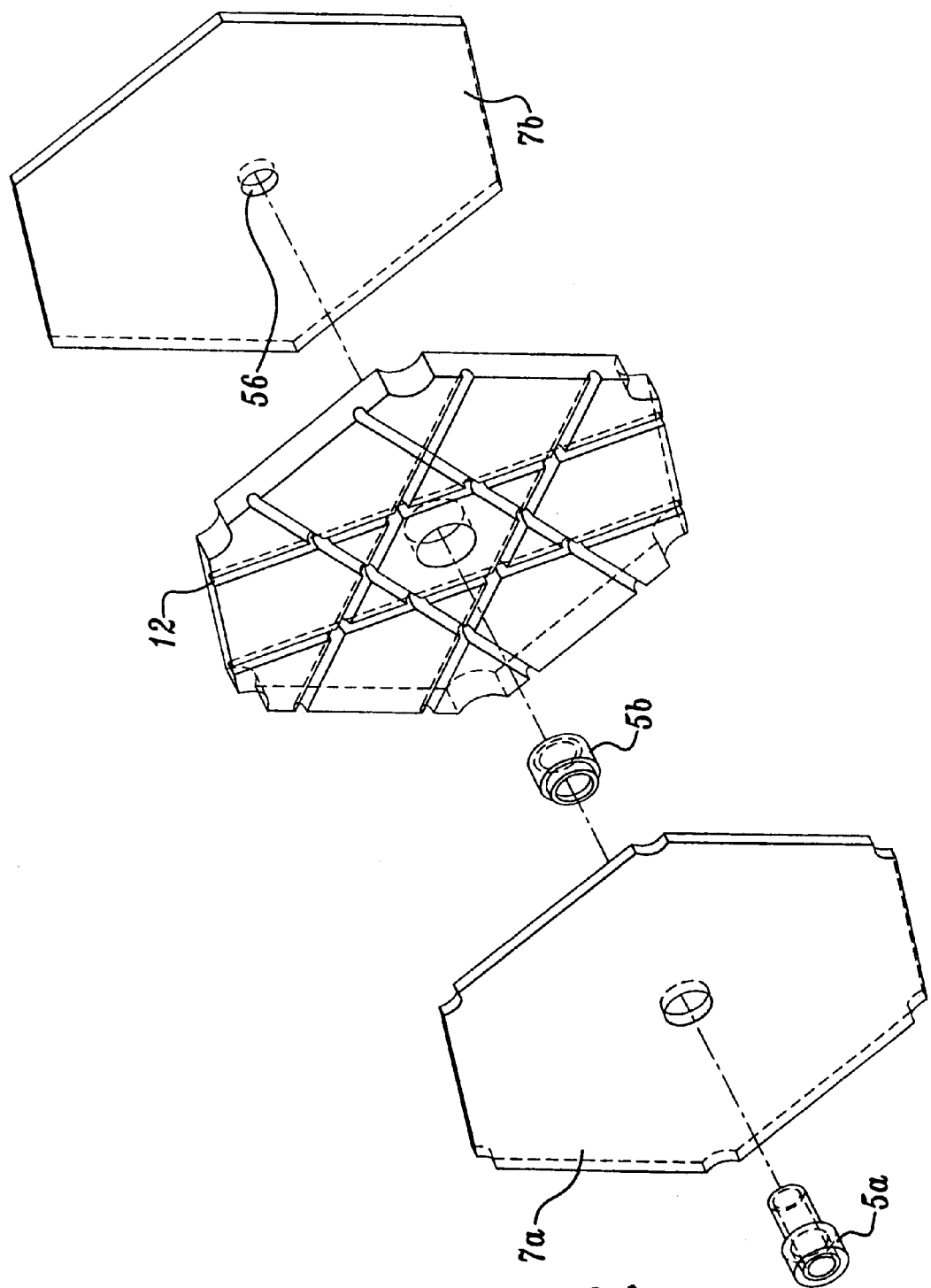
FIG. 9 illustrates an exploded view of the hexagon panel assembly.

As further illustrated in FIG. 2, the peg retainer 5 includes a peg portion 5*a* and a retainer portion 5*b* (see also FIG. 9). The peg portion 5*a* and the retaining portion 5*b* fasten the panels 1 and 2, and the core 3, together during the manufacturing of the hexagon building structures 7. Further, the retaining portion 5*b* provides dowel panel assembly registration during the manufacturing of the hexagon building structures 7. FIG. 2 shows the peg portion 5*a* and the retainer portion 5*b* joined together, while FIG. 9 shows the peg portion 5*a* and the retainer portion 5*b* separated apart. In one preferred embodiment, a polyvinyl chloride adhesive is utilized to adhere the peg portion 5*a* to the retainer portion 5*b*.

Figure 4:
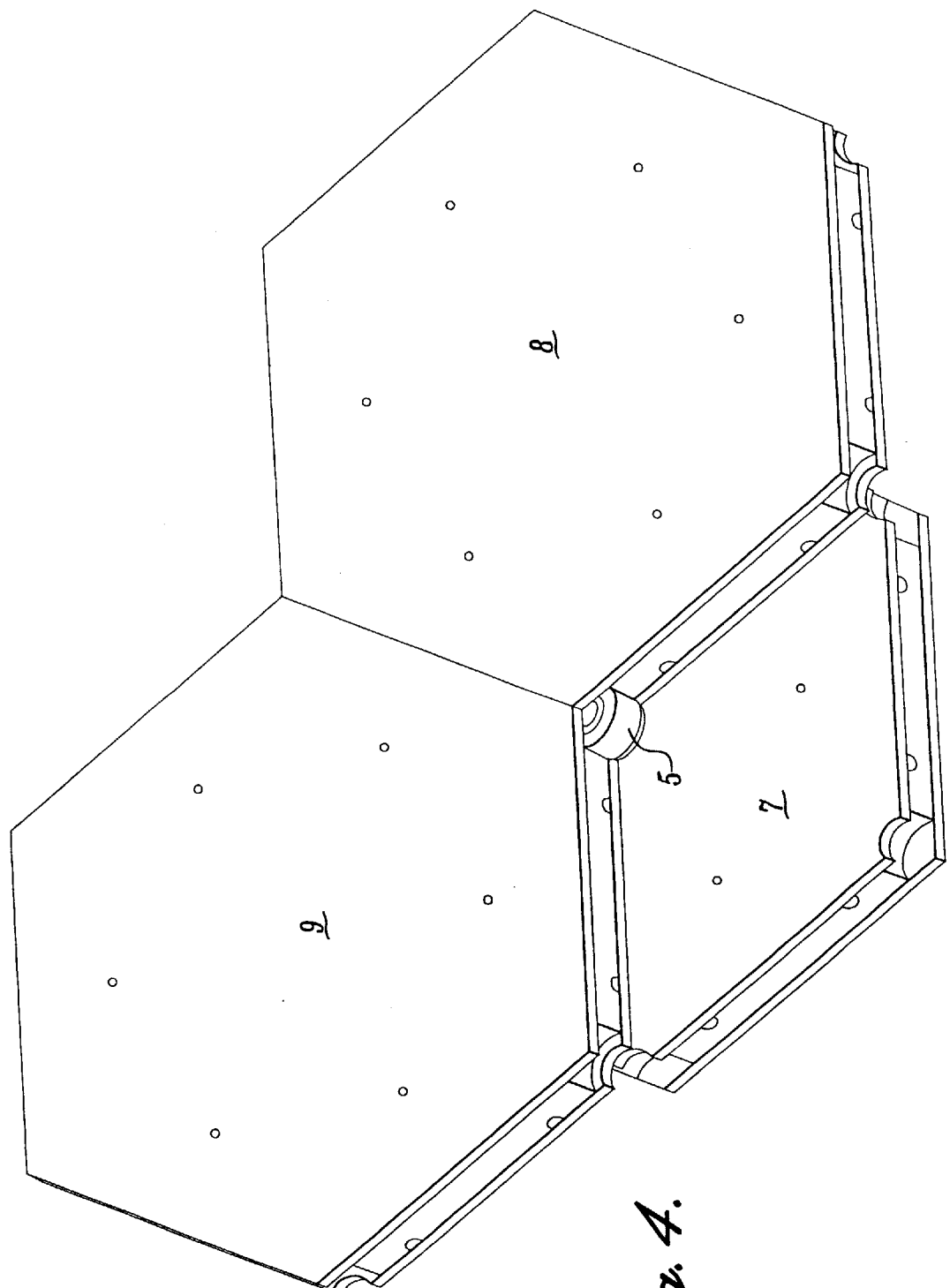
FIG. 4 illustrates a perspective view of three hexagons assembled.

Referring now to FIG. 3, two hexagon-building structures 7 can be correspondingly configured to assemble around a peg retainer 5. Similarly, three hexagon-building structures 7, 8, and 9 can also be correspondingly configured to assemble around peg retainer 5, as shown in FIG. 4. The panels of the hexagon building structures 8 and 9 act to conceal the peg retainer 5. This concealment feature is of intrinsic cosmetic value to many builders. However, for other builders, other embodiments of the present invention employ bolts fasteners that penetrate completely through the panels, mechanically compressing and fixing the panels in location. Standard metal stamped cleats or metal earthquake straps can also be inserted between the hexagon building structures during assembly. These earthquake type straps can be sandwiched between hexagons and fastened to fasteners 4, extending out of the hexagon to be a corner fastener strap or an insertion into a concrete foundation. This has value when using superelement stress analysis, which is designed to use common fastening points and symmetry.

Figure 5:
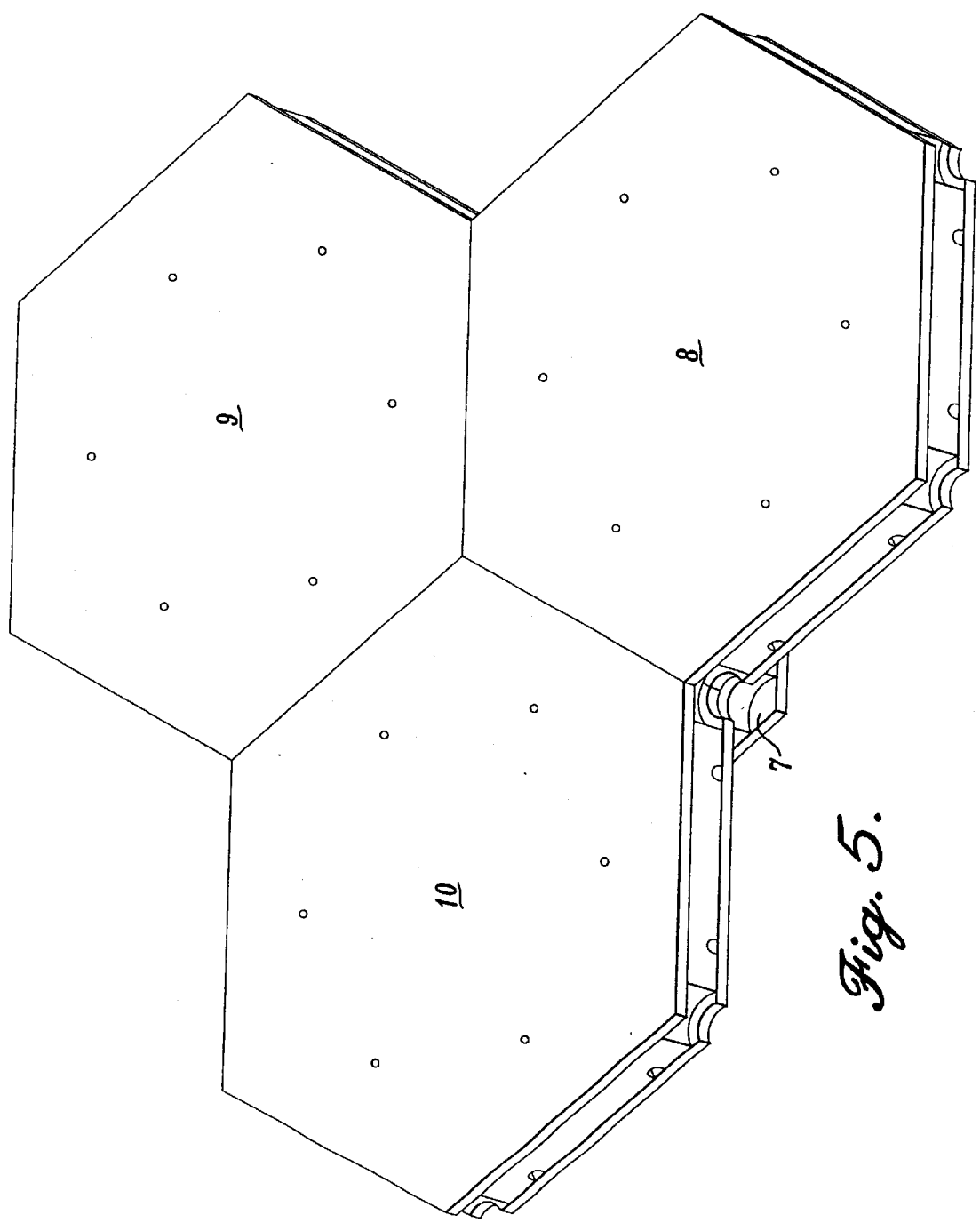
FIG. 5 illustrates a perspective view of four hexagons assembled.
Figure 6:
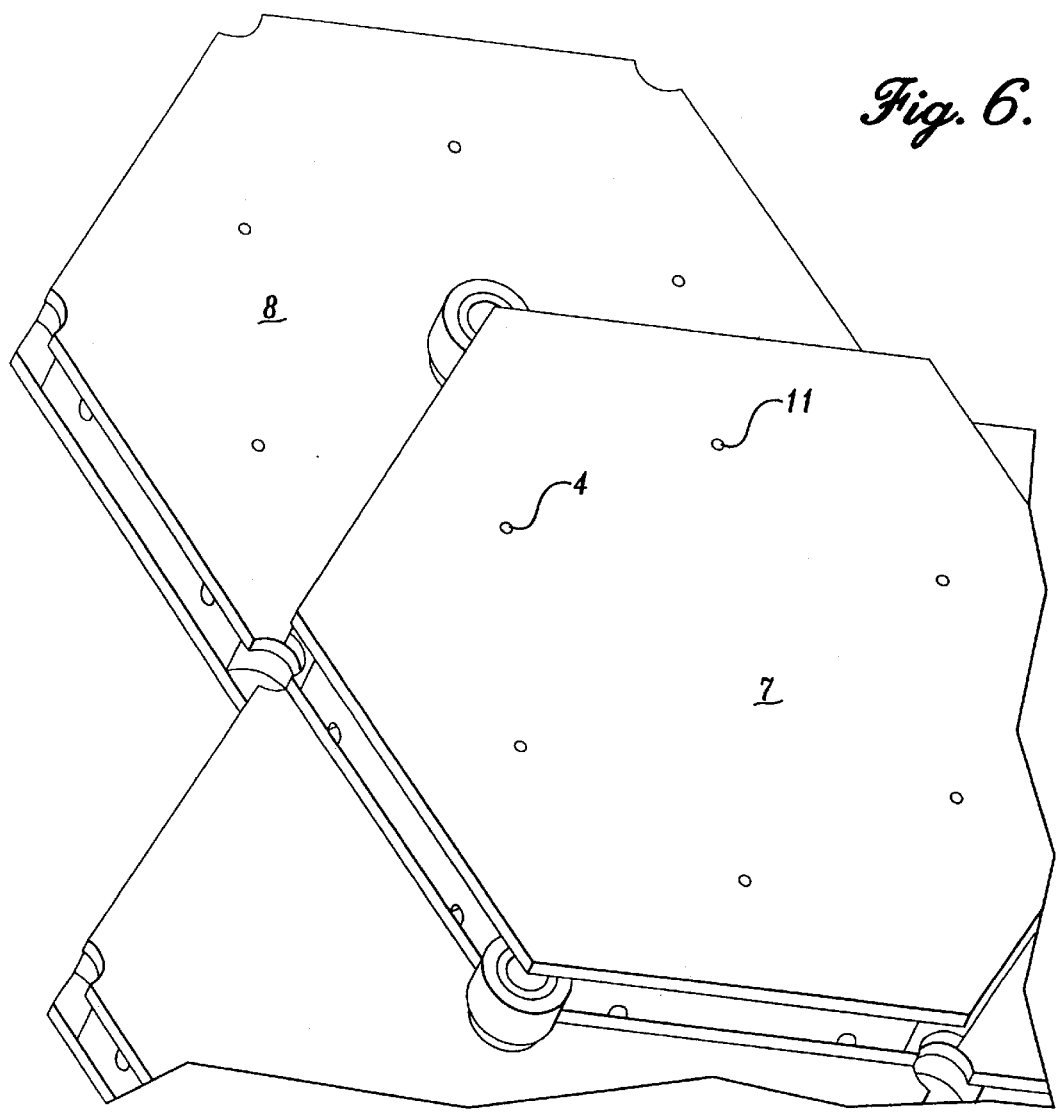
FIG. 6 illustrates a perspective view of the opposite side of FIG. 5.

When four hexagon building structures 7, 8, 9, and 10, are assembled together, as shown in FIG. 5, the peg retainer 5 cannot be seen. Alternatively, a joint fastener, barbed press fit plastic fastener, screw or metal cleats is placed in the center of hexagon building structure 7 and the joining points of hexagon building structures 8, 9, and 10 (instead of a peg retainer 5). Referring now to FIG. 6, the alignments fastening holes 4 and 11 of hexagon building structure 7 align with the alignments fastening holes of hexagon building structures 8, 9, and 10.

Figure 7:
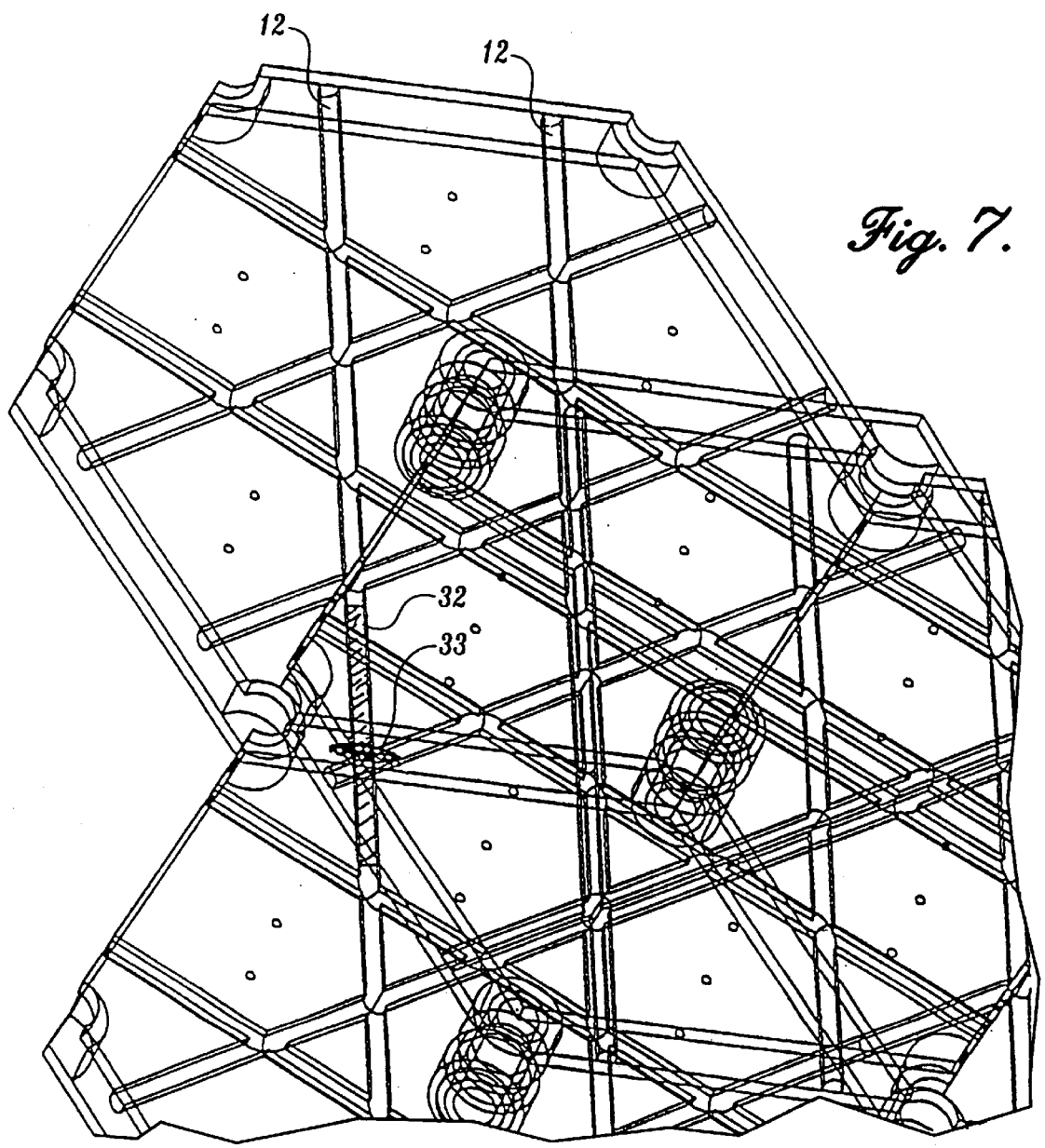
FIG. 7 illustrates a perspective view of the FIG. 6 showing foam tubes.

As shown in FIG. 7, foam tubes align to form wiring and plumbing conduit holes 12. Referring now to FIG. 19, conduit holes 25, 26, and 27 can be seen. Wire cable conduit hole 25 provides a connection path from corner 28 to base plate 19 at location 19*a*. Conduit holes 26 and 27 provide a steel wire hole to compress the wall together from one end to the other. The steel wire cable 29 and 30 can be extended through the adjoining wall forming corners 31 (shown in FIG. 20). These steel wire cables or ropes can be used to anchor the building to the ground. Cable can also be connected across the interior of the walls through common hole 4. These cables will be exposed when applied in buildings for food storage of grains, fluids, and other biomass. These interior cables strength additions can easily be calculated with accuracy, because of the superelement modeling.

Referring again to FIG. 7, graphite rod 32 and rod flange 33 are inserted into conduit holes 12. The rod 32 is centered and fixed in location by the rod flange 33. Rod 32 can be constructed of tubing, wood or other materials, without departing from the scope of the present invention. In one embodiment, rods are placed in multiple locations between every hexagon building structure 7, in order to connect the hexagon building structure 7 during assembly. Preferably, one side of the rod is attached to a hexagon building structure 7 prior to assembly. In low stress construction designs, rods 32 are sized in length and diameter to replace the need for offset double walls. In some climates and wind conditions, conduit holes 12 are not produced. This is particularly true when higher strength structures are required, or when replacing concrete block buildings where wiring and plumbing is run in an external conduit as a standard practice.

Although conduit holes 12 are convenient, the holes do result in some weakening of the panel. Wiring, water plumbing, toilet pea-traps, alarm systems, fans, sensors, refrigeration components, heating sources, and air-ducting systems can be packaged into hexagons. In some embodiments, the conduit holes 12 have hoses inserted for radiated liquid heating or liquid circulation for absorption cooling. Any amount of foam can be removed and replaced by thermal storage and/or release materials. These materials change phase forming liquid when heated and solidifying releasing stored heat when cooled. Hexagon panels provide a building structure for packaging these types of phase change materials and containing them within a building environment for safety.

Figure 8:
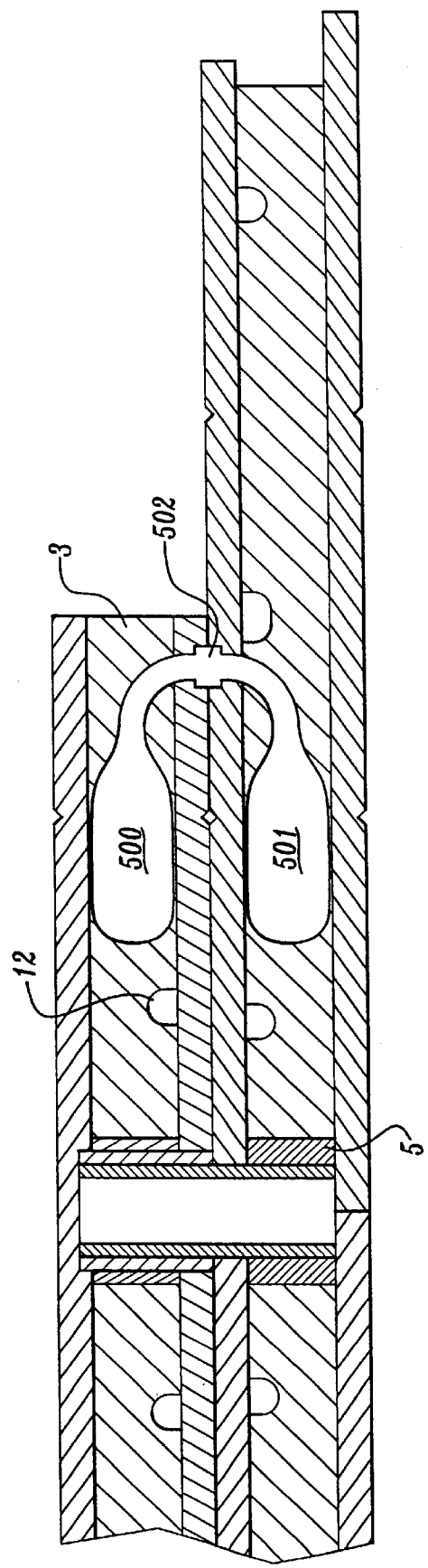
FIG. 8 illustrates a sectional view of the center of a hexagon assembly showing the detail of the peg dowel system.

Referring now to FIG. 8, a peg retainer 5 is shown in the center of an offset layering hexagon building structure assembly. In one embodiment of the present invention, a peg retainer 5 is constructed from an assembly of PVC pipes adhered together with glue. Injection molding is one suitable technique for this purpose. Conduit holes 12 are formed in the foam core 3.

Figure 10:
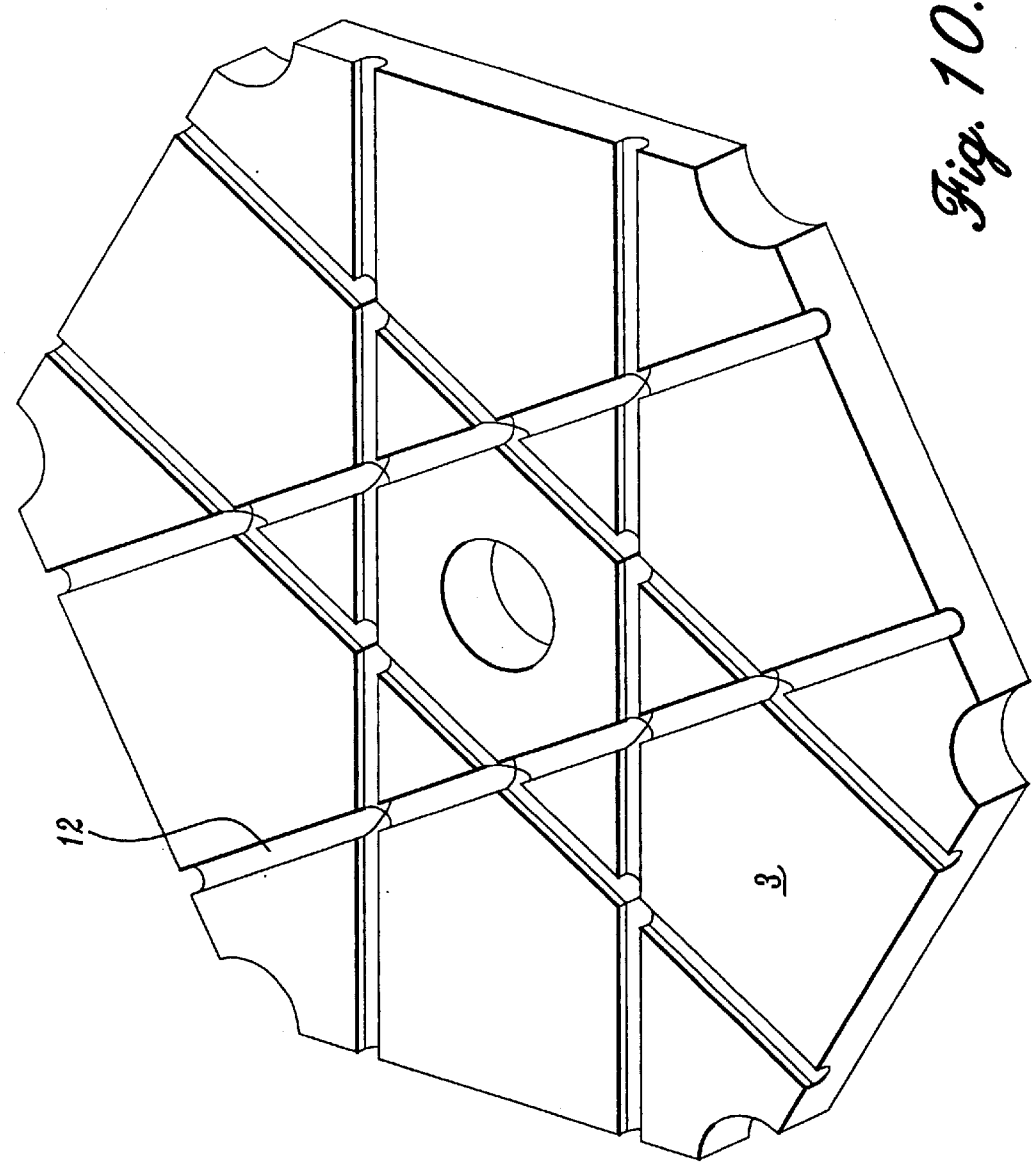
FIG. 10 illustrates a perspective view of the foam hexagon core.
Figure 11C:
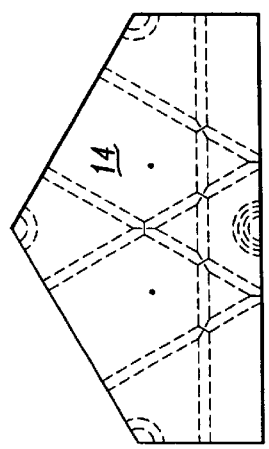
FIG. 11C illustrates a plan view of a third shape used to build geometric patterns from hexagons.
Figure 11F:
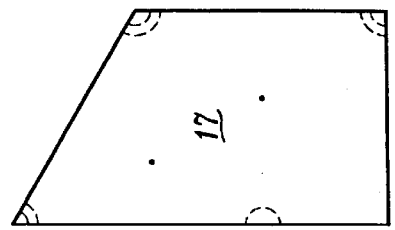
FIG. 11F illustrates a plan view of a sixth shape used to build geometric patterns from hexagons.
Figure 11B:
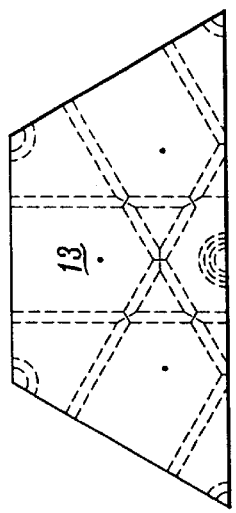
FIG. 11B illustrates a plan view of a second shape used to build geometric patterns from hexagons.
Figure 11E:
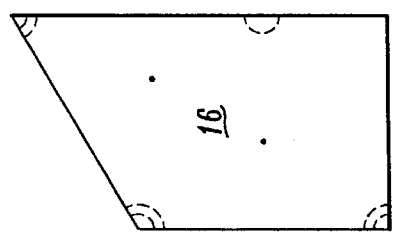
FIG. 11E illustrates a plan view of a fifth shape used to build geometric patterns from hexagons.
Figure 11A:
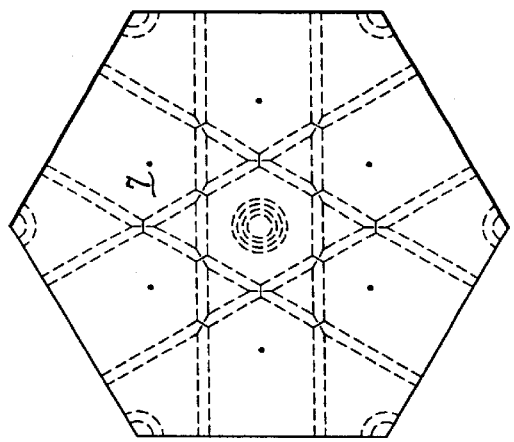
FIG. 11A illustrates a plan view of a first shape used to build geometric patterns from hexagons.
Figure 11D:
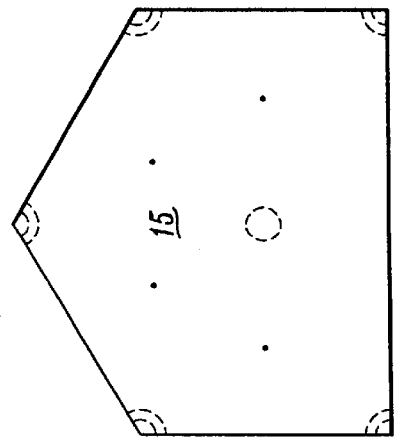
FIG. 11D illustrates a plan view of a fourth shape used to build geometric patterns from hexagons.

As shown in FIG. 9, the peg portion 5*a* and the retainer portion 5*b* can be separated. The retainer portion 5*b* provides the dowel function during glue assembly of exterior panel 7*b* and interior panel 7*a*. The peg portion 5*a* is inserted and glued into the retainer portion 5*b*. The hexagon foam core 3 and conduit holes 12 are shown in greater detail in FIG. 10.

Figure 12:
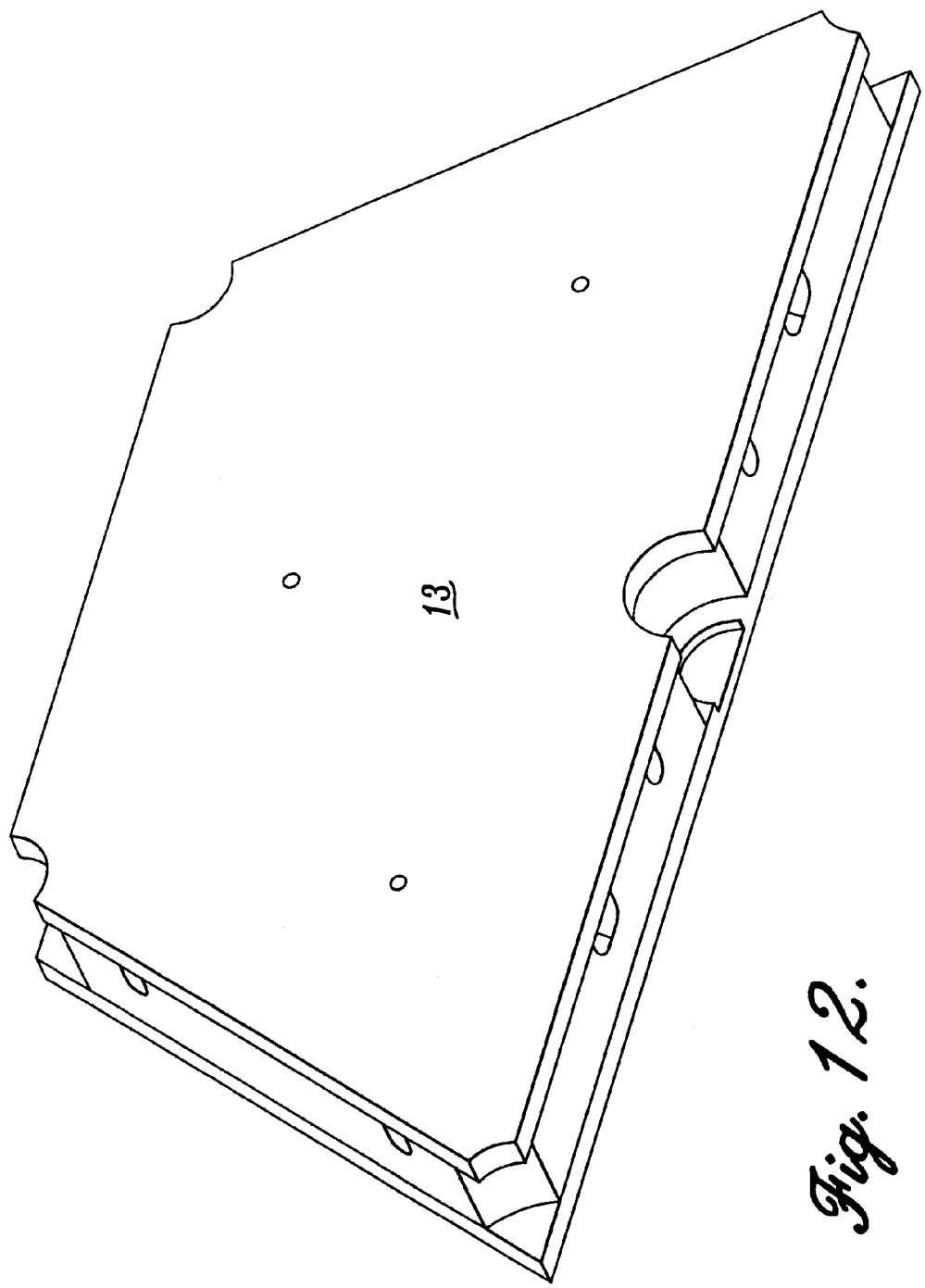
FIG. 12 illustrates a perspective view of the hexagon split on points.
Figure 13:
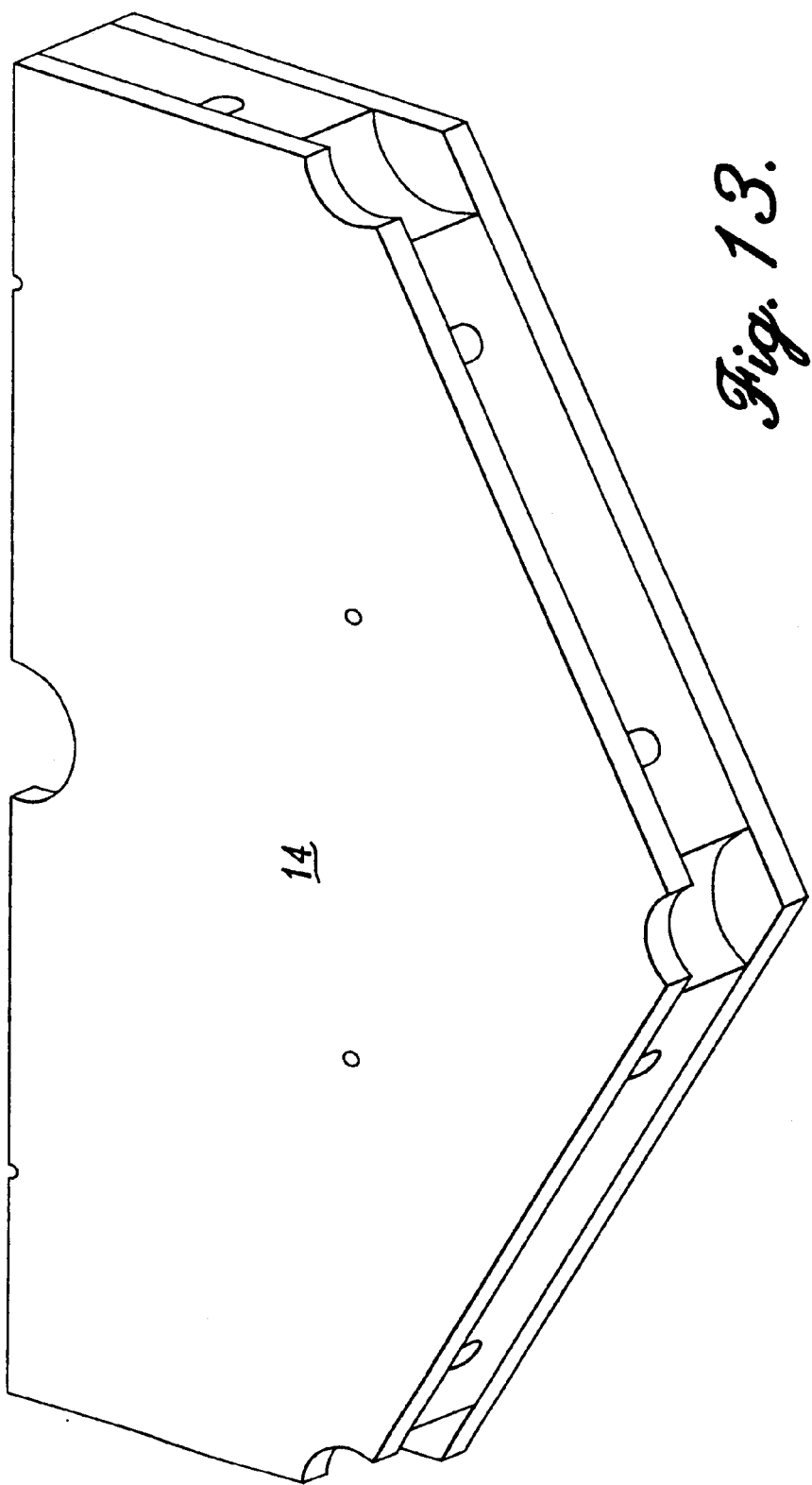
FIG. 13 illustrates a perspective view of the hexagon split across flats.
Figure 14:
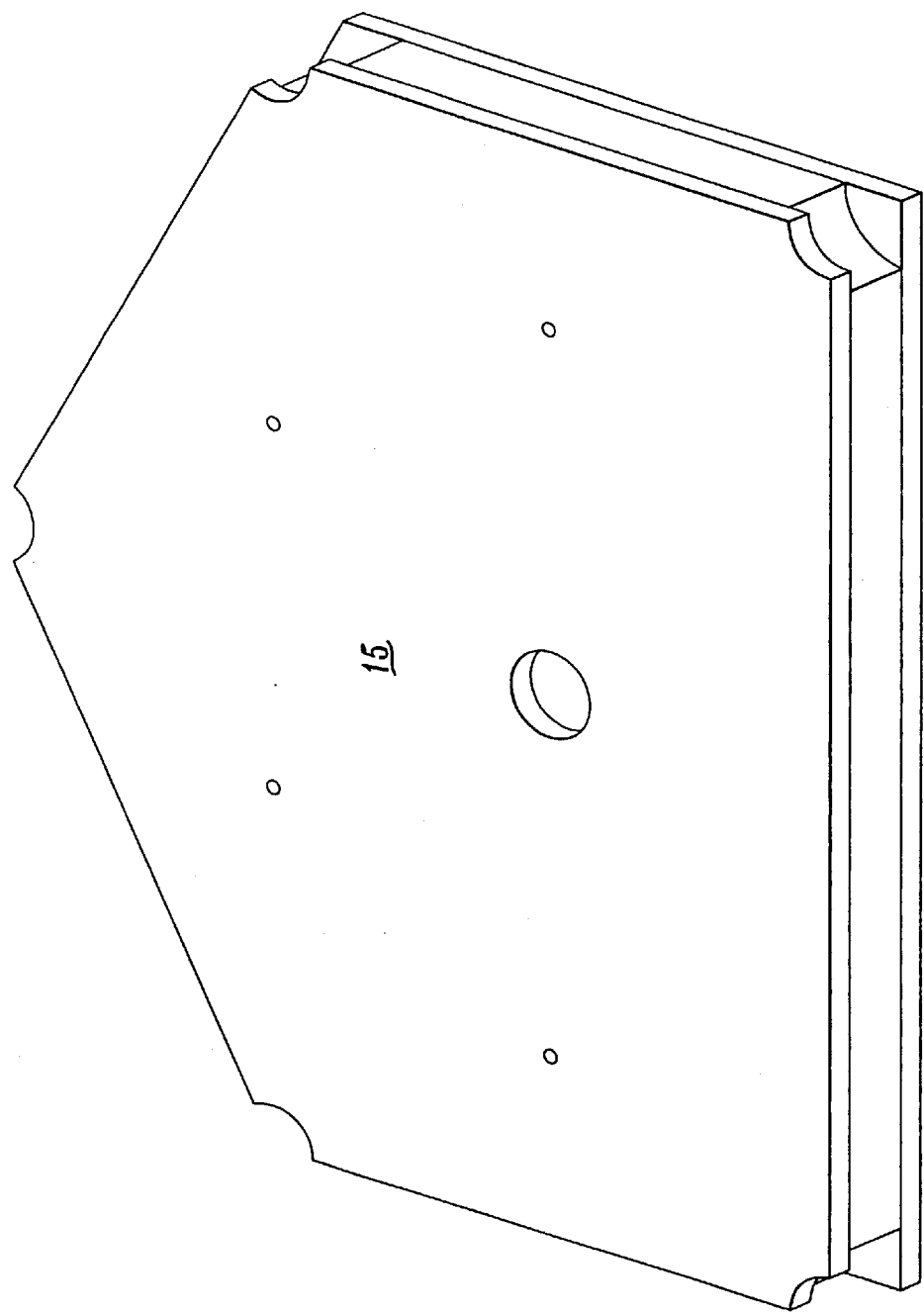
FIG. 14 illustrates a perspective view of the hexagon cut long across points.
Figure 15:
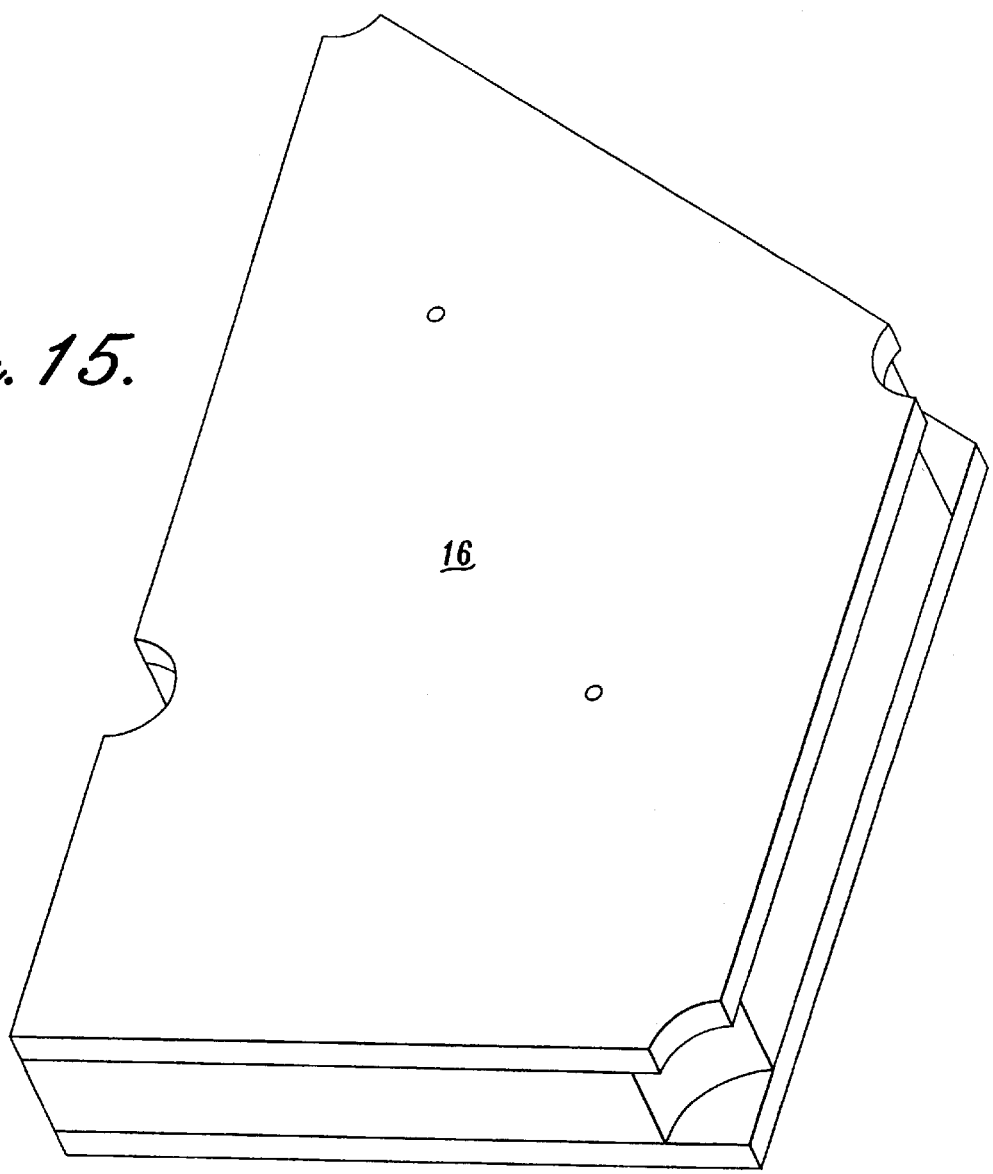
FIG. 15 illustrates a perspective view of FIG. 14 split left.
Figure 16:
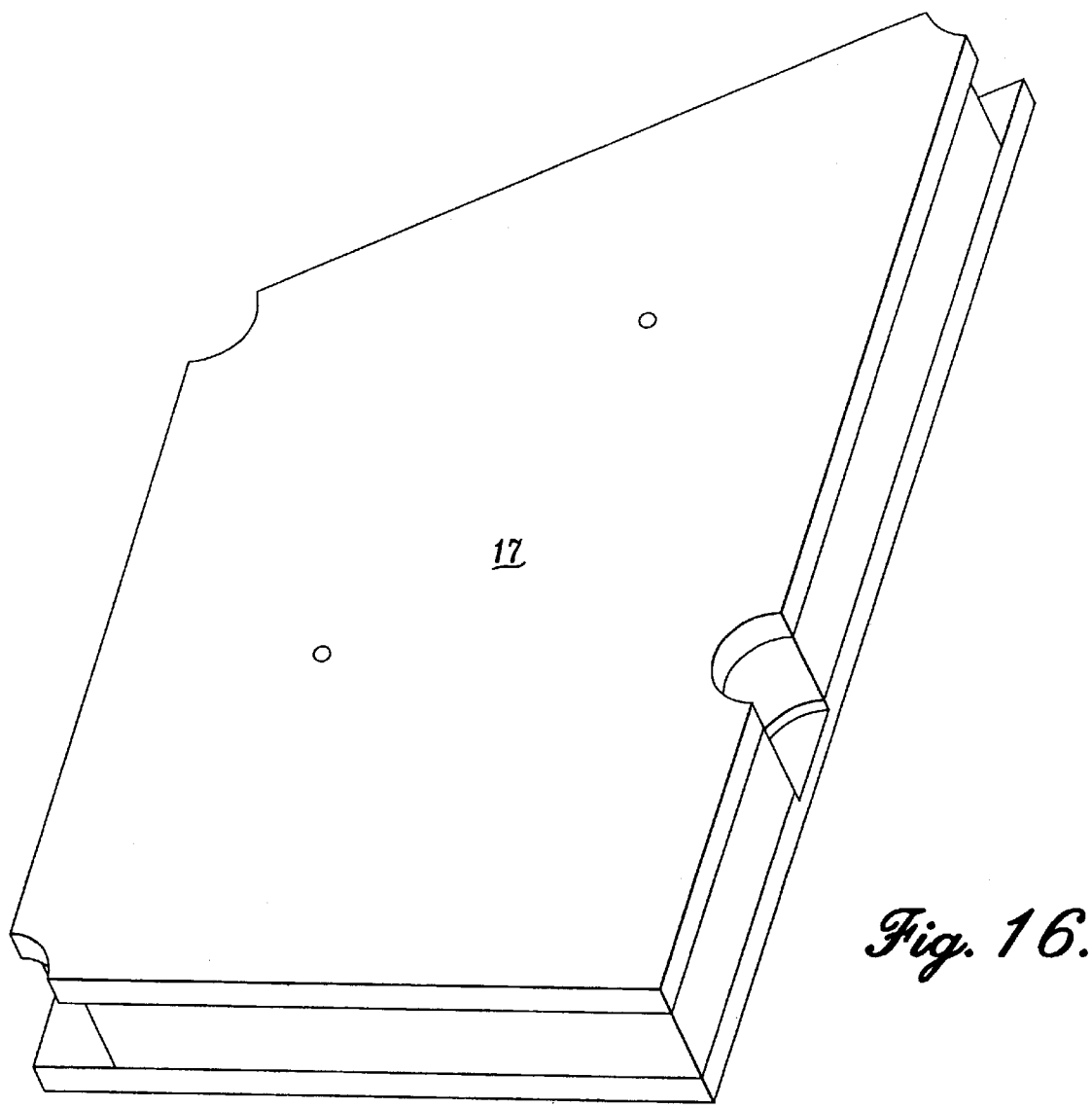
FIG. 16 illustrates a perspective view of FIG. 14 split right.
Figure 18D:
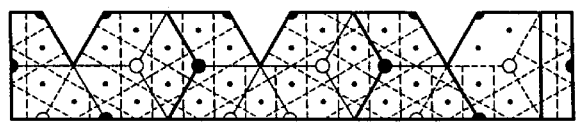
FIG. 18D illustrates a plan view of a fourth wall section.
Figure 18C:
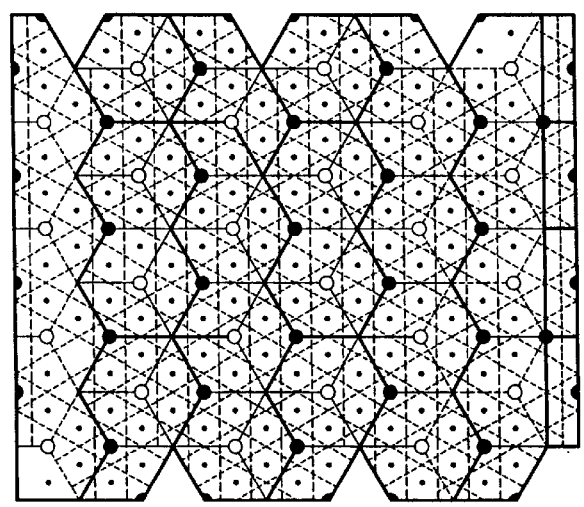
FIG. 18C illustrates a plan view of a third wall section.
Figure 18B:
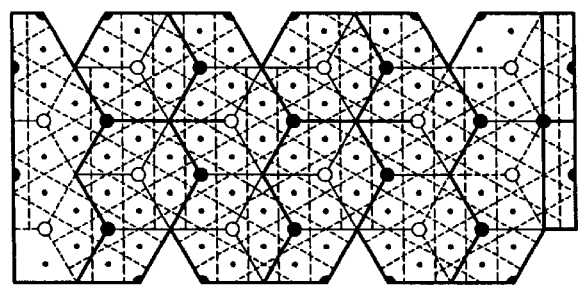
FIG. 18B illustrates a plan view of a second wall section.
Figure 18A:
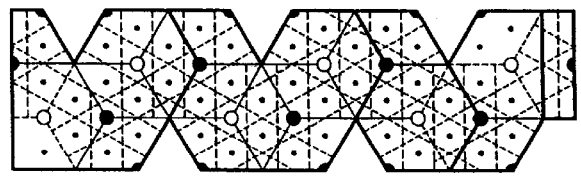
FIG. 18A illustrates a plan view of a first wall section.
Figure 18G:
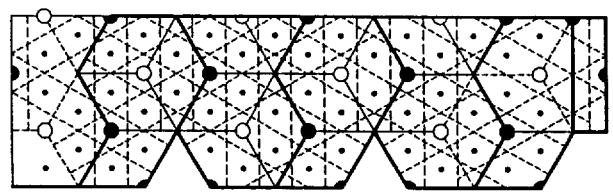
FIG. 18G illustrates a plan view of a seventh wall section.
Figure 18F:
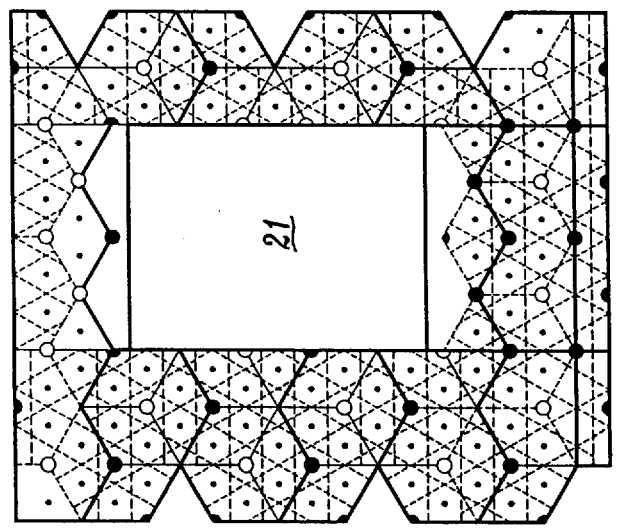
FIG. 18F illustrates a plan view of a sixth wall section.
Figure 18E:
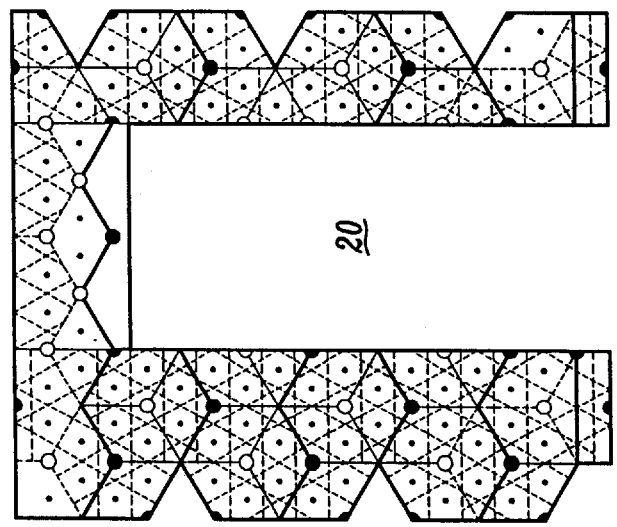
FIG. 18E illustrates a plan view of a fifth wall section.

Referring now to FIGS. 11A–11F, a hexagon building structure 7 and five-hexagon derivative building structures 13, 14, 15, 16, and 17 are shown. These six structures are assembled into the geometric shapes that make walls, floors, window, and door openings. Hexagon derivative building structure 13 is a hexagon split on points, and is shown in FIG. 12. Hexagon derivative building structure 14 is a hexagon split on flats, and is shown in FIG. 13. Hexagon derivative building structure 15 is a hexagon cut long across points, and is shown in FIG. 14. Hexagon derivative building structure 16 is a hexagon cut long across points and split left, and is shown in FIG. 15. Hexagon derivative building structure 17 is a hexagon cut long across points and split right 17, and is shown in FIG. 16. Finally, hexagon derivative building structure 18 is a hexagon door and window header 18, and is shown in FIG. 17.

Referring now to FIGS. 18A–18G, hexagon wall sections door 20, window 21, and the finished ends assemble into corners of a building. Hexagon wall sections can be computer numeric control (CNC) machined out of a single solid panel. All of the above-described hexagon and hexagon derivative building structures are utilized in this embodiment. In this embodiment of the present invention, partial hexagons extend out of the wall sections. Corner sections can also be prefabricated as a single part. Accordingly, corner sections are prefabricated out of a single part or by joining smaller corner sections in order to strengthen the corners of the structures. These prefabricated corner sections can be applied on the interior or exterior of the house to join the main walls to a room wall or partitions wall. Prefabricated hexagons can take the form of a cross with extensions off the front and back of the hexagons for locations where the interior and exterior walls are on the same locations, and a top cross sectional view would form a cross.

Builders can use these hexagon computer aided design sections to rapidly build wall sections. Super-elements are computer models that the computer processes stress calculations around. Hexagons make desirable super-elements that process as one math node in the computer. This reduces computer time dramatically to optimize building designs. Super-elements are possible from common symmetrical shapes, which is why hexagons, hexagon derivatives, or tessellation shapes are useful in building design. One of the advantages of tessellation symmetrical shapes, and specifically hexagons, is that accurate optimized designs are produced when calculating super-elements computer design assemblies. Prior art buildings structures have proved to be near impossible to use in calculating stress. Current dimensional lumber homes have random fastener locations and random tetrahedral element meshes resulting in billions of nodes to calculate to obtain the same accuracy of several hundred-hexagon nodes. Online World Wide Web Internet services can be provided to builders, because results can be obtained in minutes. Even the most unskilled builder will have data on the building structure using superelement efficiencies across networks.

Referring now to FIG. 19, hexagon wall sections are assembled into a wall. Cable locations are provided by conduit holes 25, 26, 27, 27a. Cables 29, 30, and 30a are inserted in a preferred embodiment of the present invention. It is to be understood that any one of the many conduits holes can be used in the wire cable compression.

In further embodiment of the invention, shown in FIG. 19A, the hexagon building structures 7 and 37 are spaced apart by beam 35 in a spaced apart, double wall assembly. Location dowel fasteners 38 and 39 are placed along the beam 35 to join the hexagon building structures together. Preferably, the beam 35 is substantial vertical and is arrayed along the building for increased strength. In another embodiment the beam 35 runs horizontally as well, is divided into segments providing a fluid path for concrete or cast in place foams, or at other angles. Hexagon frame building structures 70, 71, and 72 (shown in FIGS. 33, 36, and 39, and described in further detail below) are used between solid panels in order to make the panels on the outside and inside walls symmetrical. These panels can be cut for the wiring, water or plumbing pipes, or other building requirements.

Figure 20:
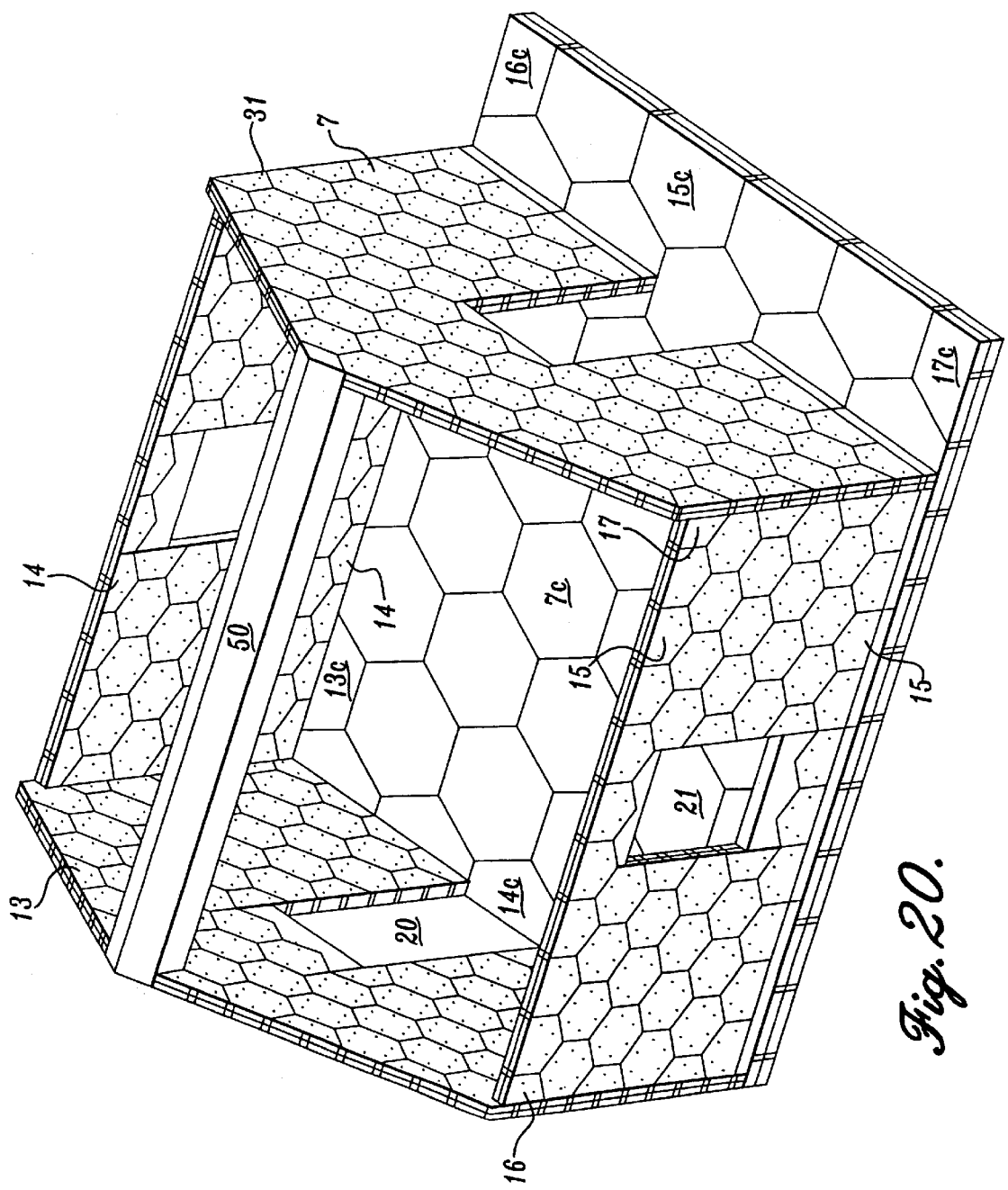
FIG. 20 illustrates a perspective view of building walls, door and window openings, and floor double hexagon panel wall assembly.

As shown in FIG. 20, hexagon building structures 7 and their hexagon derivative building structures 13, 14, 15, 16, and 17 are used to simply and efficiently build walls, door openings, window openings, and a floor double hexagon panel wall assembly. A header 18, hexagon building structures 7 (50-centimeter structures in this preferred embodiment), and hexagon panel derivatives 13, 14, 15, 16, and 17, assemble into a double wall system. Preferably, a hexagon beam 50 is utilized as a crossbeam, which has a foam core 3, along with air ducts and wiring, integrated into the beam. In one embodiment of the present invention, the wall hexagons are 50-centimeter flat to flat, and the floor hexagons are 1-meter flat to flat.

Hexagon building structures 7 of different sizes can be assembled into a single building. Referring to FIG. 20, one-meter hexagon building structures 7c, and hexagon derivative building structures 13c, 14c, 15c, 16c, and 17c, assemble into a double floor system. One-meter hexagon building structures 7c exhibit substantial strength, and thus, are preferable for many floor applications. Conduit holes 12 in these floor panels are large enough to use as heating and air-conditioning air ducts. One-meter hexagon building structures 7c are also a good selection for roof cover. Using smaller hexagon building structures 7c (such as 50-centimeter hexagons) allows an increased amount of possibilities for changes. The roofline on the preferred embodiment hexagon building of FIG. 20 is 30 degrees. In another embodiment, "A" frame steep roof alpine building is produced when the hexagon building structures are rotated 90 degrees and assembled. The thickness of the hexagon building structures can be adjusted to meet climate conditions. Any size hexagon can be made. Other tessellation made from squares and square derivatives have a 45 degree pitched roofline. These multiple tessellation can be combined for a desired shape.

Figure 21:
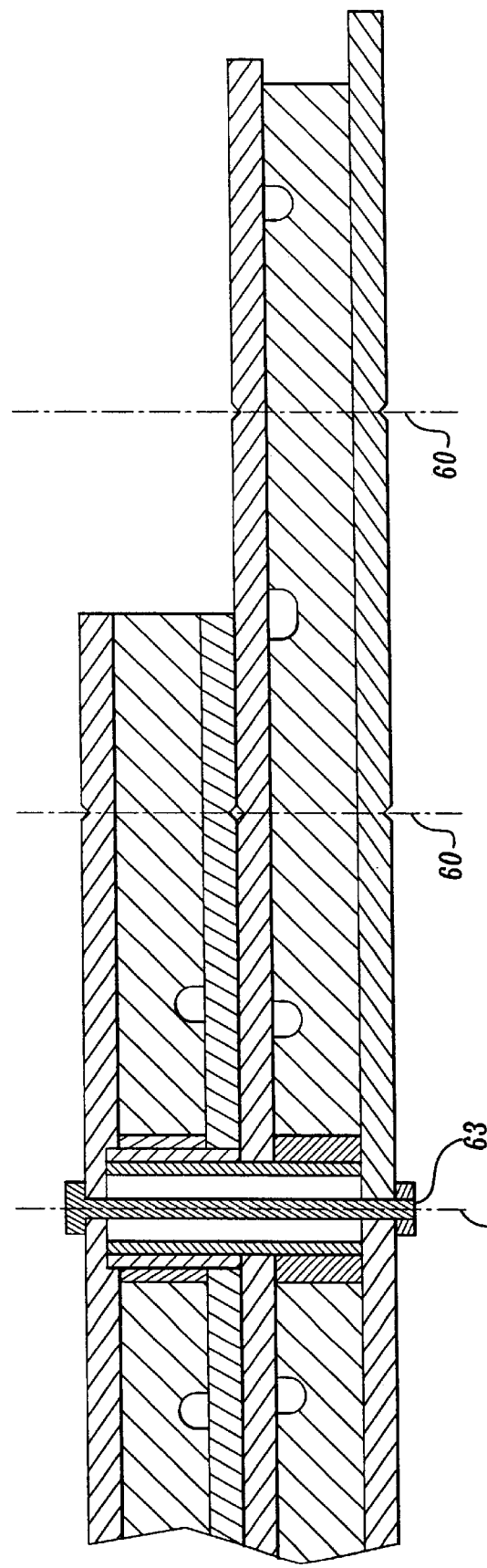
FIG. 21 illustrates a sectional view of hexagon assemblies showing how mechanical fasteners penetrate the full layer of hexagons.

In some embodiments of the present invention, mechanical fasteners penetrate the full layer of hexagon building structures 7, as shown in FIG. 21. A larger number of layers of hexagon building structures 7 can also be layered in this alternating offset layering structure, without departing from the scope of the present invention. The hexagon building structure center hole and alignments fastening holes 4 align with the bolt 63 and holes 60 and 61, respectively. Preferably, T-NUTs are utilized for fastening the bolts.

Figure 22:
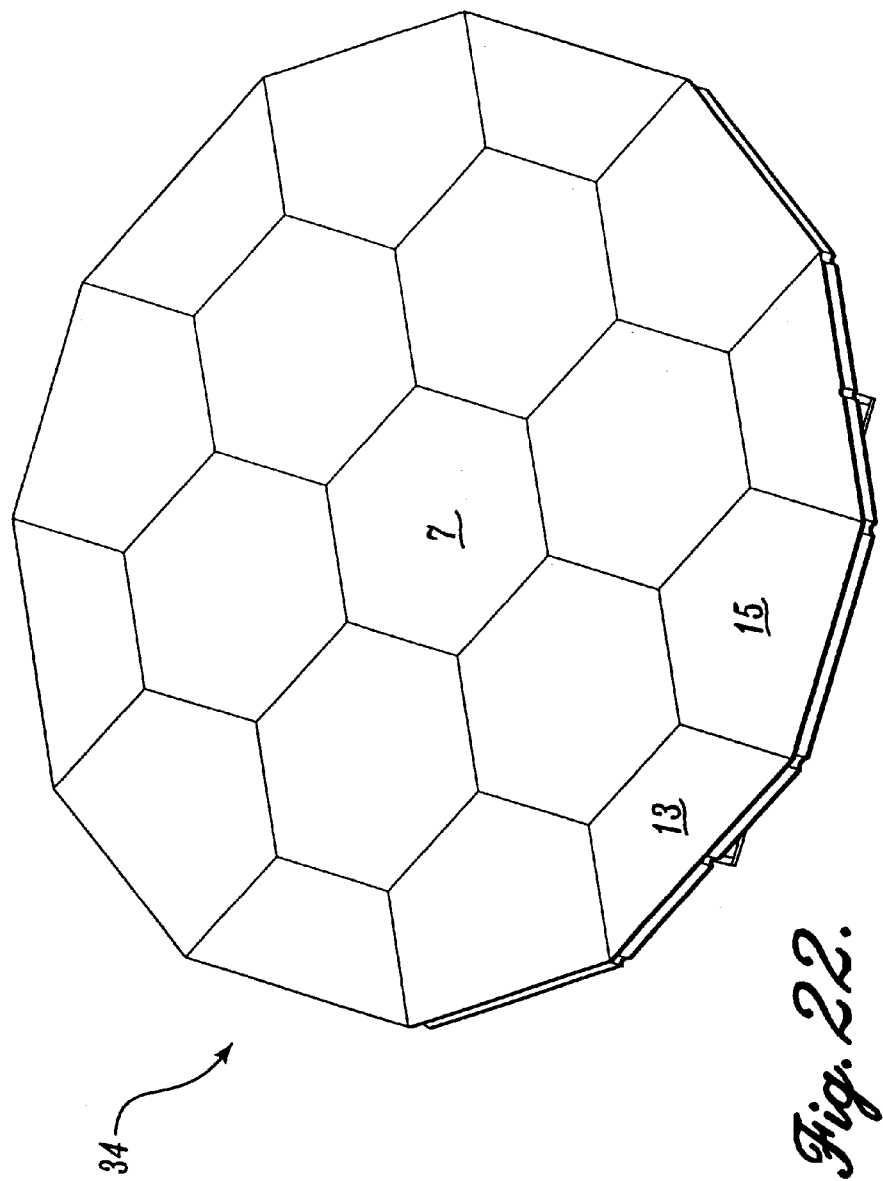
FIG. 22 illustrates a perspective top view of a substantially round hexagon assembly.
Figure 23:
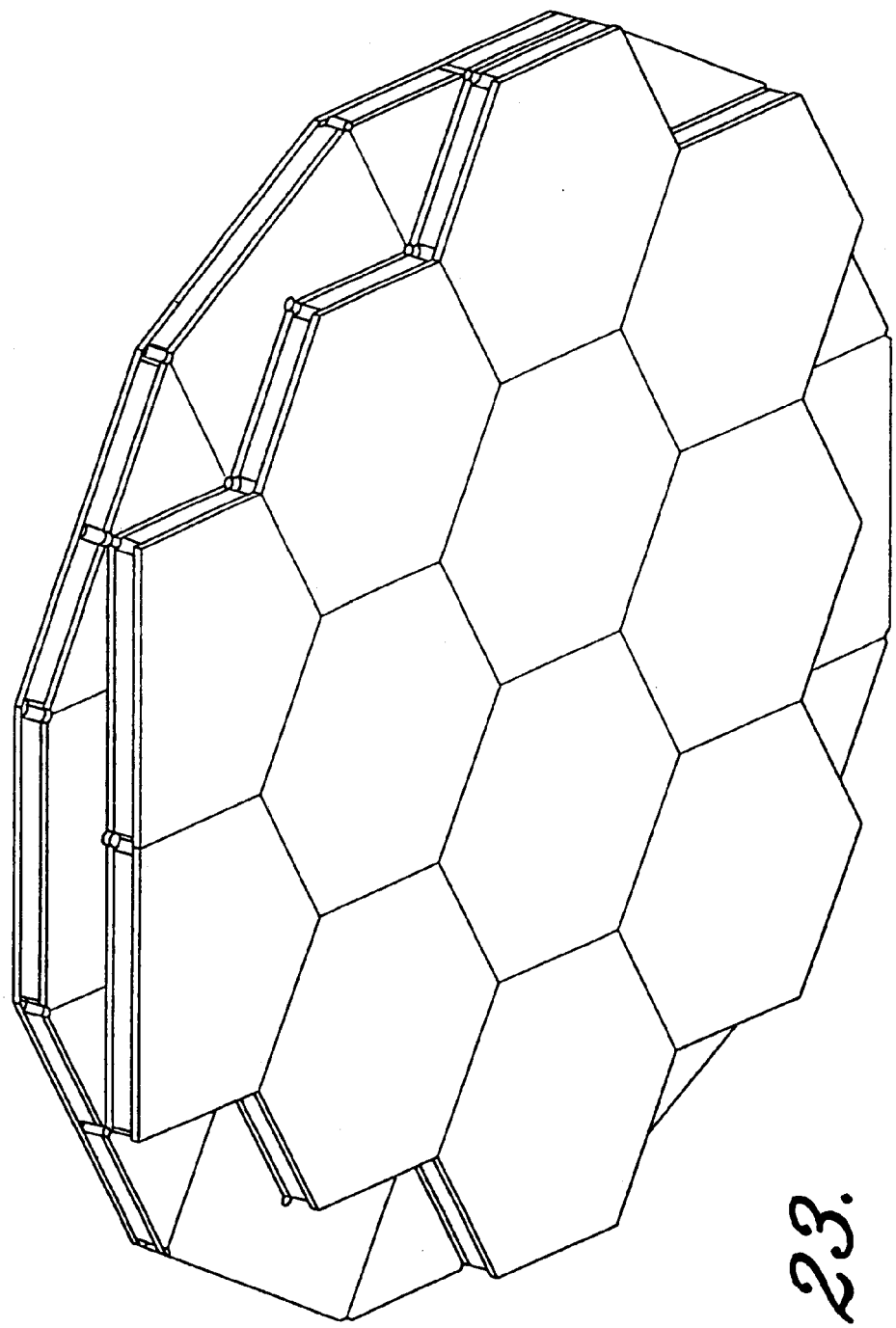
FIG. 23 illustrates a perspective bottom view of the substantially round hexagon assembly in FIG. 22.
Figure 64:
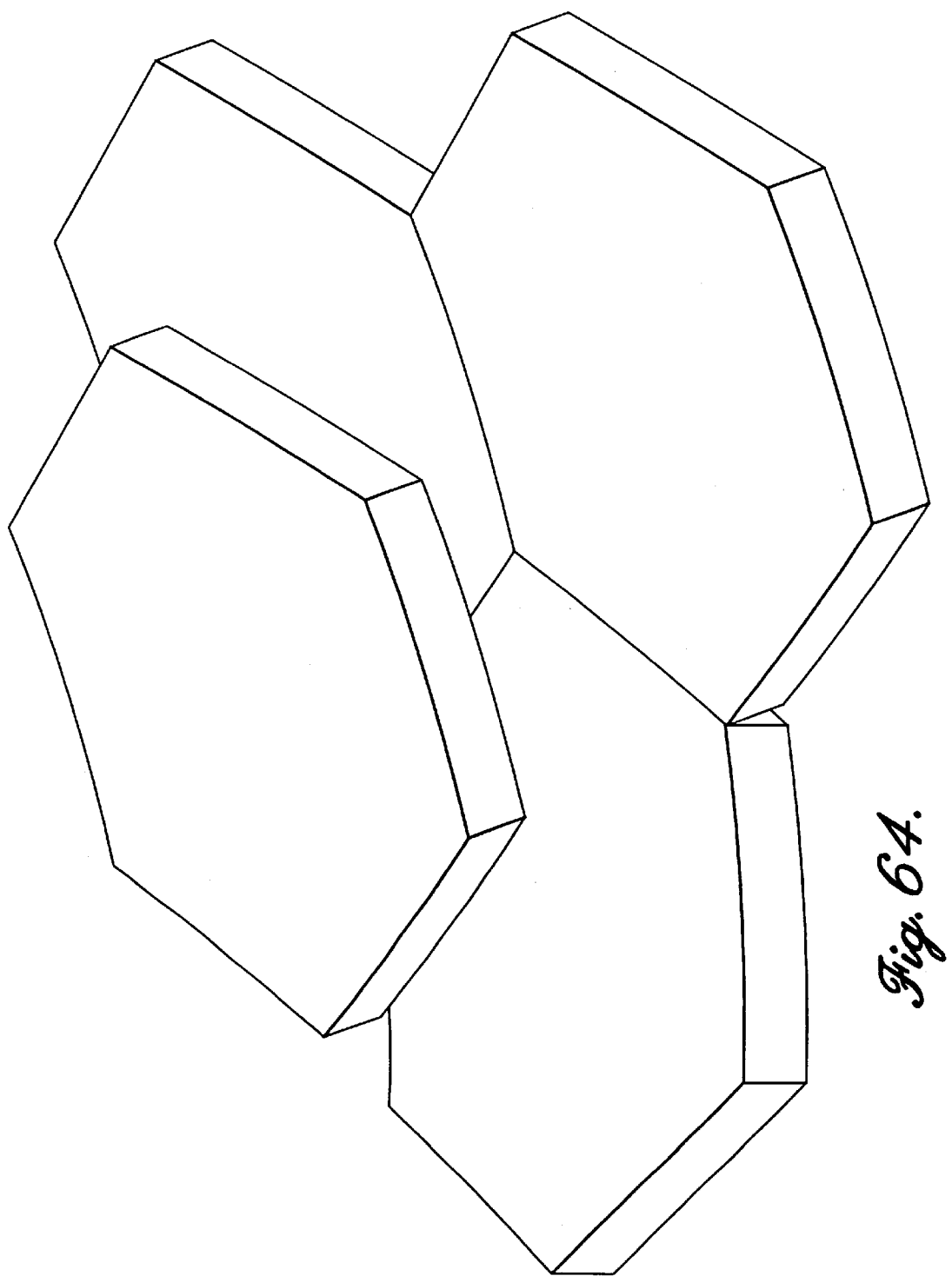
FIG. 64 illustrates a perspective view of curved hexagon members.

Substantially round hexagon assemblies 34 are also produced using hexagon building structures 7 and hexagon derivative building structures 13 and 15, as shown in FIGS. 22 and 23. These substantially round hexagon assemblies 34 are assembled without requiring cutting or other customization of hexagon building structures 7. These shapes can form substantially round hexagon assemblies 34, or circular openings for windows, door arches, and other builder-specified needs. For regional specific designs, such as in Japan and China, these round hexagon assemblies 34 can be assembled to poles in multiple floor levels to make religious or cultural buildings similar to those of ancient construction. It is to be understood that hexagons can be stacked as high as necessary in order to make big beams. Tessellations can also be curved 34A on the surfaces and assemble around the circular shape (see FIG. 64). Hexagons can be uniformly curved on the plane surfaces and assembled into a tube.

Further, in some embodiments, long graphite poles are inserted into high stacks of offset layered hexagon building structures 7. For example, a 20-foot beam could be assembled from 20 hexagons a foot thick and assembled in the substantially round hexagon assembly 34 configuration. The hexagon building structures 7 can be joined together by inserting rods into the set of six alignments fastening holes 4. Alternatively, tubes can be used instead of rods. In another embodiment of the present invention, these type of multiple stack arrangements form complex shapes like boat hauls and airplane fuselage, or wings. Only the exterior hexagon building structures 7 need to be shaped to match a desired design. Preferably, the rods act to fasten the hexagon building structures 7 together. These types of three-dimensional shapes can be fiber-glassed on the surface, including fiber-resin winding of the whole structure. Other surfaces can also be used without departing from the scope of the present invention.

Figure 24:
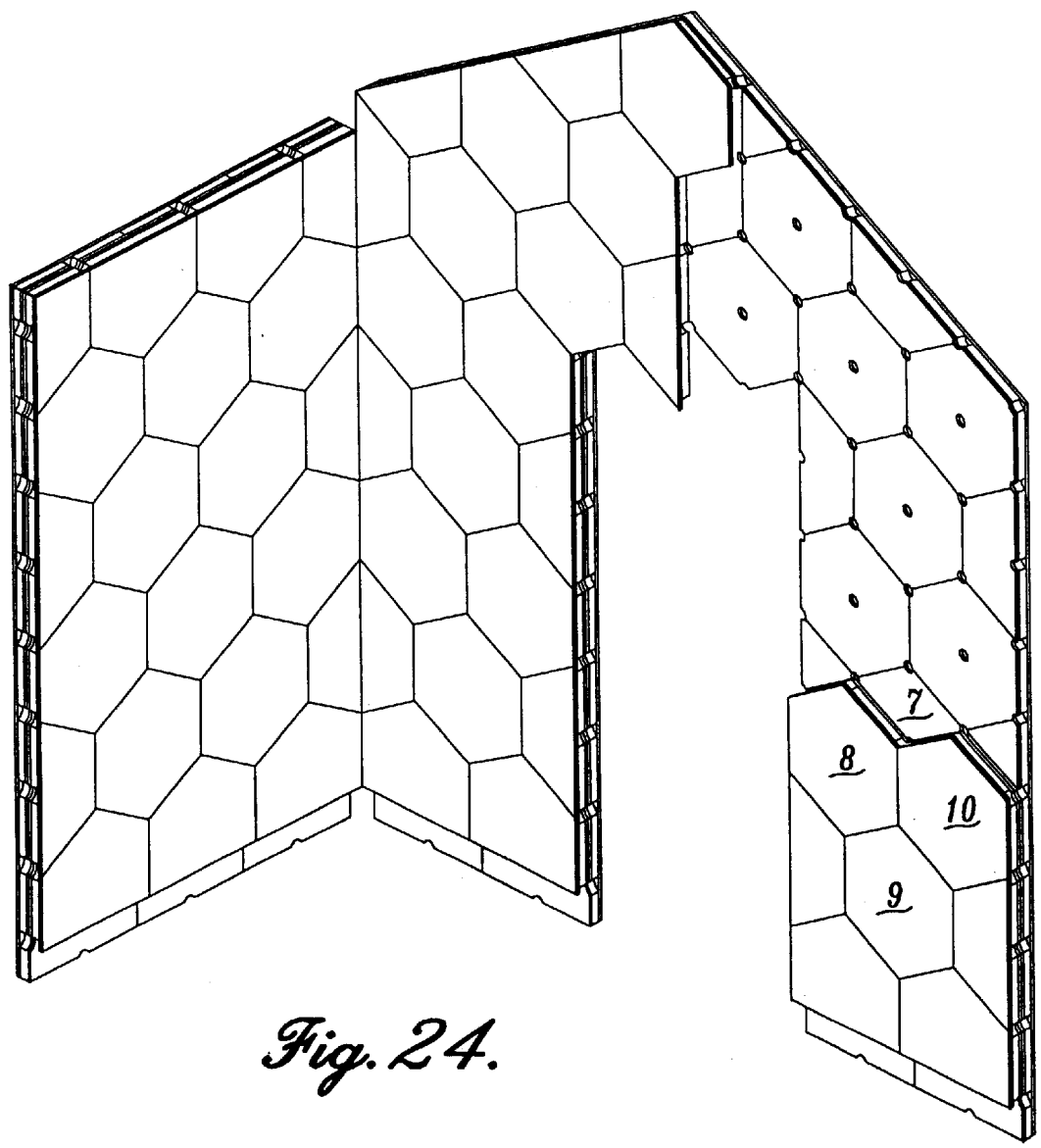
FIG. 24 illustrates a perspective inside wall view of hexagons partially assembled around a door.

Referring now to FIG. 24, hexagon-building structures 7, 8, 9, and 10 are partially assembled around a door.

Figure 25:
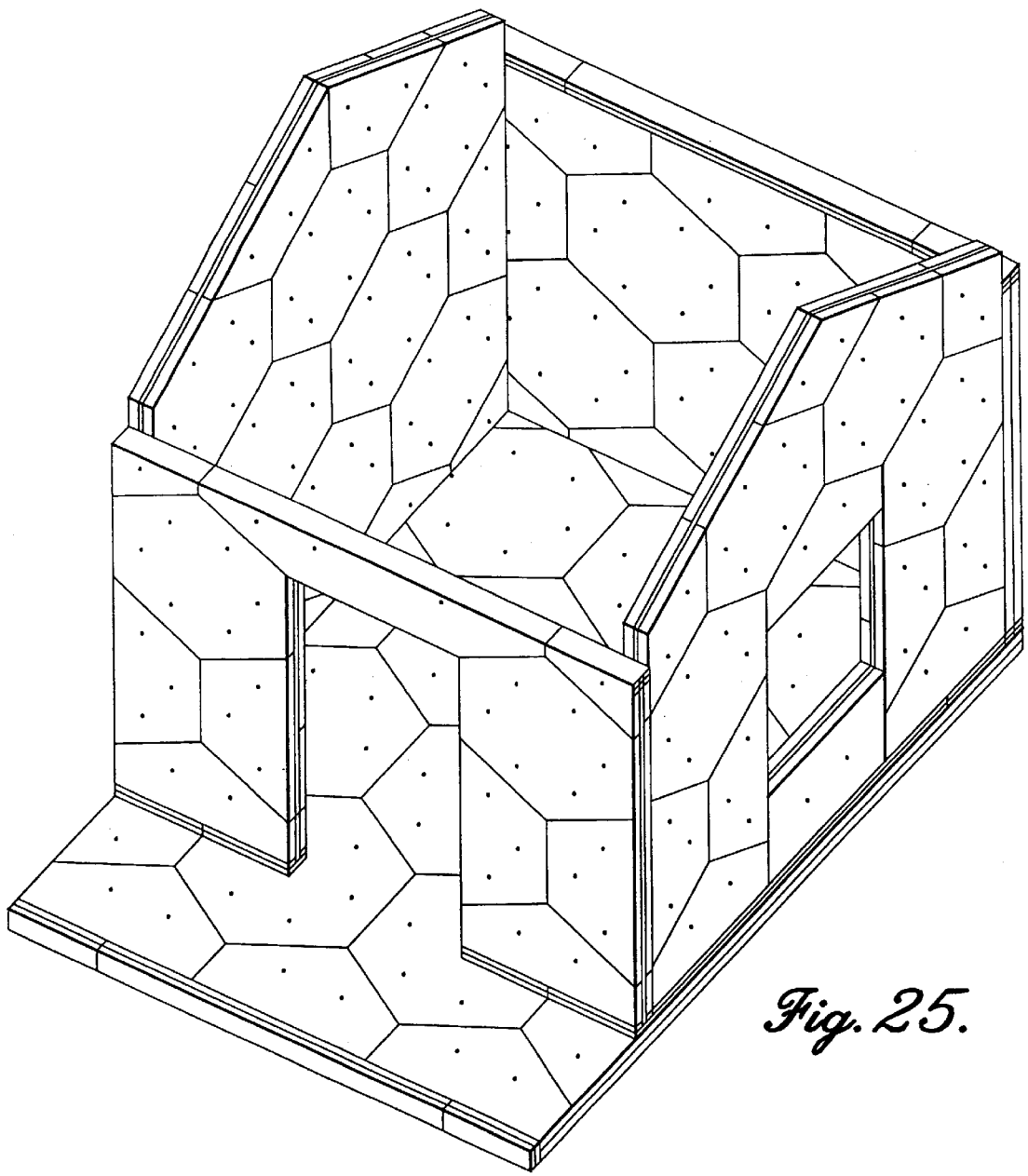
FIG. 25 illustrates a perspective view of a home assembly of one-meter wide hexagons.
Figure 26A:
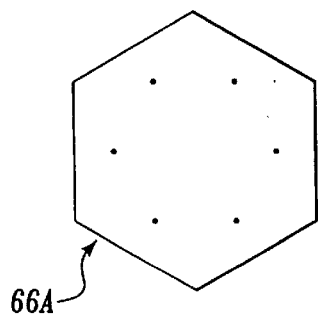
FIG. 26A illustrates a plan view of a first shape used in the home assembly of FIG. 25.
Figure 26B:
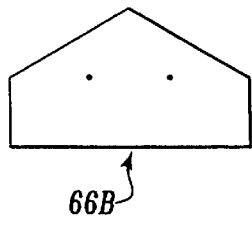
FIG. 26B illustrates a plan view of a second shape used in the home assembly of FIG. 25.
Figure 26C:
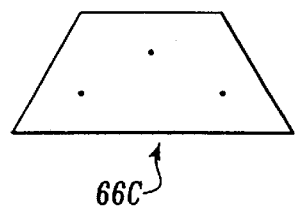
FIG. 26C illustrates a plan view of a third shape used in the home assembly of FIG. 25.
Figure 26D:
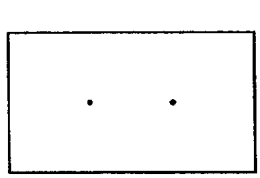
FIG. 26D illustrates a plan view of a fourth shape used in the home assembly of FIG. 25.
Figure 26E:
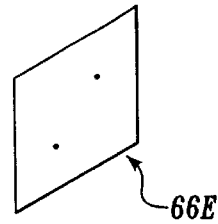
FIG. 26E illustrates a plan view of a fifth shape used in the home assembly of FIG. 25.
Figure 26F:
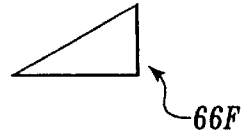
FIG. 26F illustrates a plan view of a sixth shape used in the home assembly of FIG. 25.
Figure 26G:
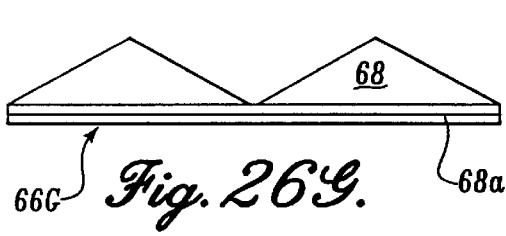
FIG. 26G illustrates a plan view of a seventh shape used in the home assembly of FIG. 25.
Figures 26H, 26I:
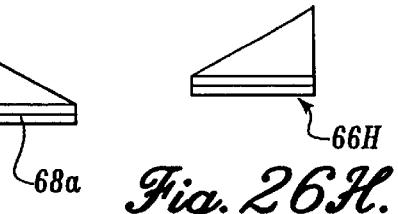
FIG. 26H illustrates a plan view of a eighth shape used in the home assembly of FIG. 25.
FIG. 26I illustrates a plan view of a ninth shape used in the home assembly of FIG. 25.
Figure 26J:
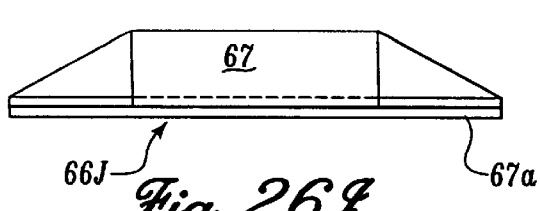
FIG. 26J illustrates a plan view of a tenth shape used in the home assembly of FIG. 25.
Figure 26K:
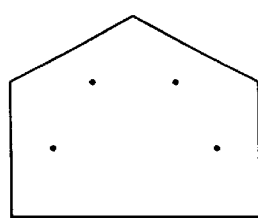
FIG. 26K illustrates a plan view of a eleventh shape used in the home assembly of FIG. 25.

Specifically, the offset layering of the hexagon building structures 7, 8, 9, and 10 is shown in this house wall assembly. A hexagon building structure home assembly is illustrated in FIG. 25. This particular embodiment utilizes one-meter wide hexagons. When larger hexagon building structures 7 are utilized, fewer of the hexagon building structures 7 are needed. However, as shown in FIGS. 26A–26K, a larger number of hexagon derivative building structures are then required (items 4, 5, 7, 8, 9, and 10). These additional hexagon derivative building structures are constructed with optional plates 67a, and 68a.

Figure 27:
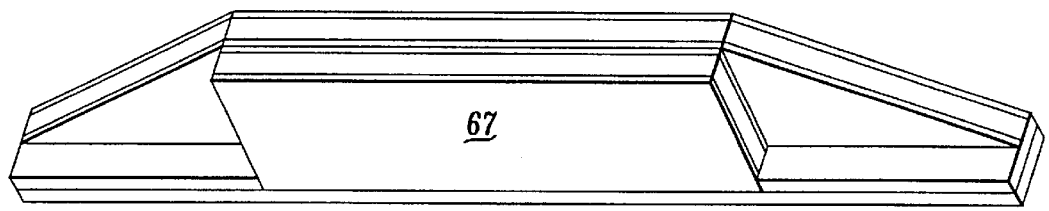
FIG. 27 illustrates a perspective view of the door and window header.
Figure 27A:
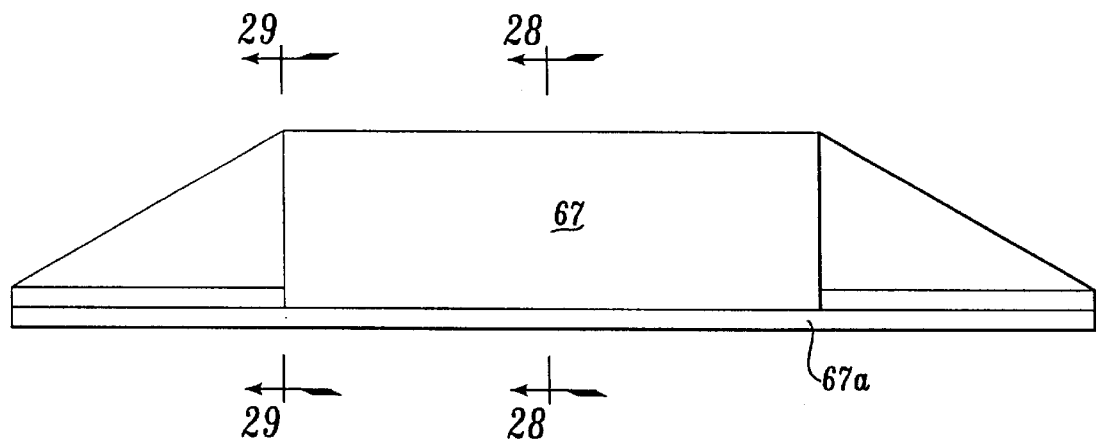
FIG. 27A illustrates a side view of the door and window header.
Figure 28:
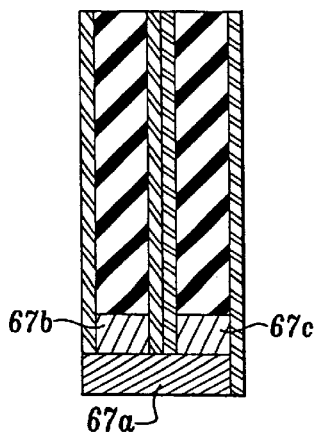
FIG. 28 illustrates sectional view A—A of FIG. 27A.
Figure 29:
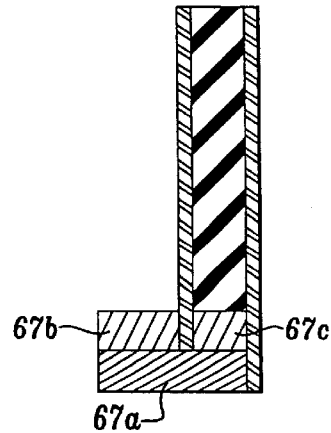
FIG. 29 illustrates sectional view B—B of FIG. 27A.
Figure 30:
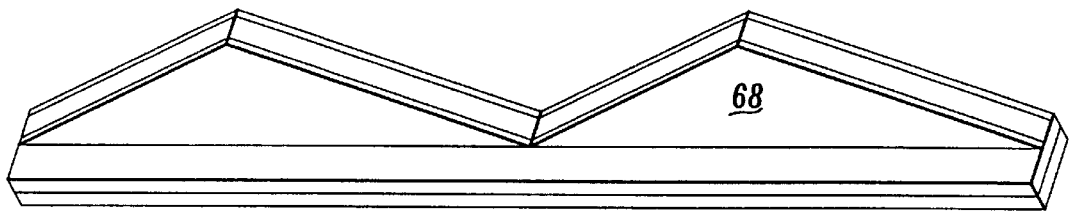
FIG. 30 illustrates a perspective view of the top and bottom plate of a wall or floor.
Figure 31:
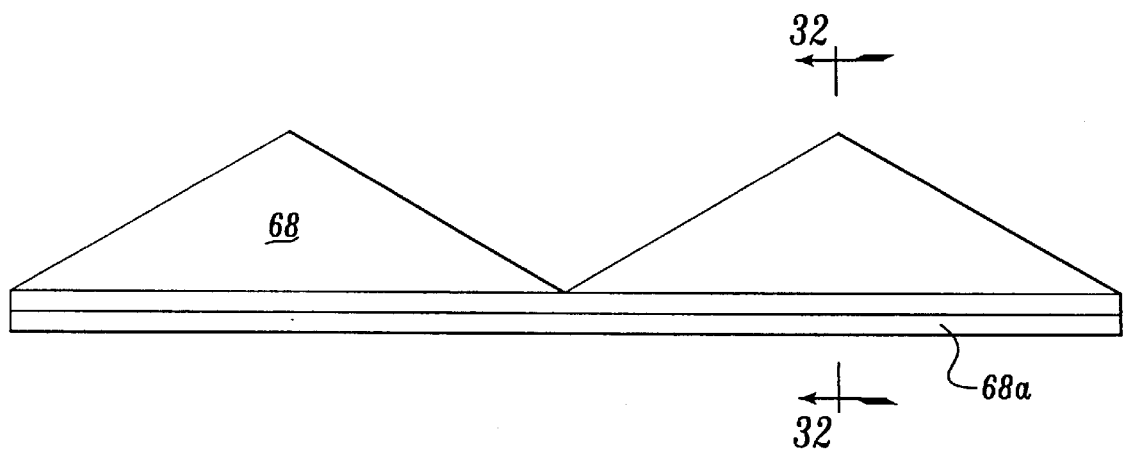
FIG. 31 illustrates a side view of the top and bottom plate assembly in FIG. 30.
Figure 32:
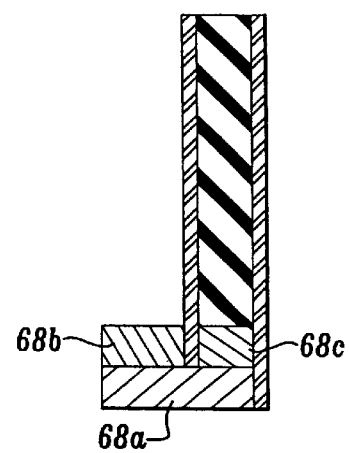
FIG. 32 illustrates a sectional view A—A of FIG. 31.

One interesting hexagon derivative building structure is the door and window header 67, as shown in FIGS. 27 and 27A. Optional plates 67a, 67b, and 67c are integrated into the panel 67 for strengthening and providing a platform for bolting the wall to the floor and joining corners, as shown in FIGS. 28 and 29. Another interesting hexagon derivative building structure is the top and bottom plate for a wall or floor, as shown in FIGS. 30 and 31. Similarly, optional plates 68a, 68b, and 68c are integrated to the panel 68 for strengthening and providing a platform for bolting the wall to the floor and joining corners, as shown in FIG. 32.

Figure 33:
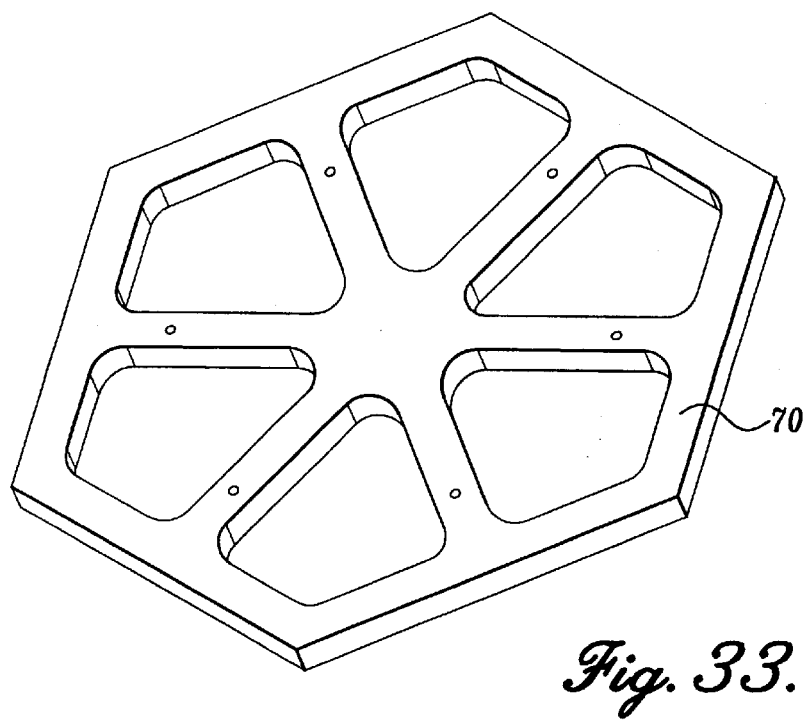
FIG. 33 illustrates a perspective view of a hexagon frame.
Figure 34:
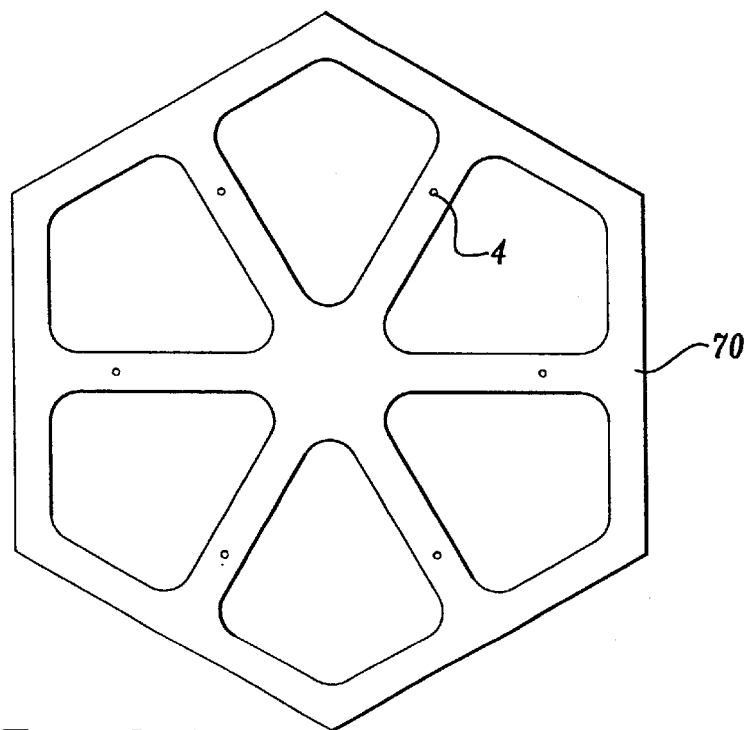
FIG. 34 illustrates a side view of the hexagon frame of FIG. 33.
Figure 35:
FIG. 35 illustrates an end view of the hexagon frame of FIG. 33.

A hexagon frame building structure 70 is shown in FIGS. 33, 34, and 35. Hexagon frame building structure 70 can be constructed from any of a wide variety of materials, depending upon the particular application. A wide variety of fabrication methods can also be utilized, including but not limited to extruding, molding, casting, etc. In a preferred embodiment of the present invention, the hexagon frame building structures 70 are extruded recycled plastic composites (70 percent oak wood fiber and 30 percent plastic in a more preferred embodiment). Preferably, channels and stamped metal are applied during the fabrication process. Channels are provided to slide and lock the edges of the hexagons together. Further, adhering a solid board to each side of this frame can provide full hollow panels.

Figure 61:
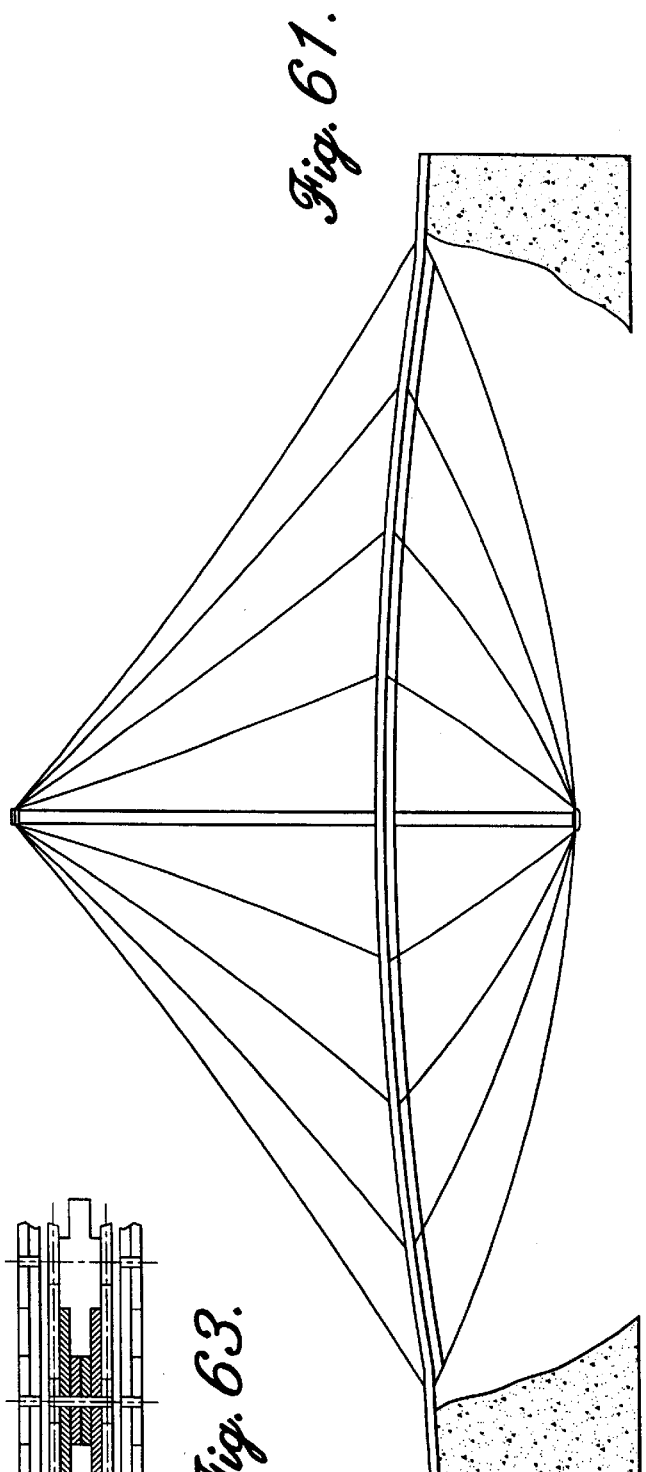
FIG. 61 illustrates a side view of a hexagon bridge assembly.
Figure 62:
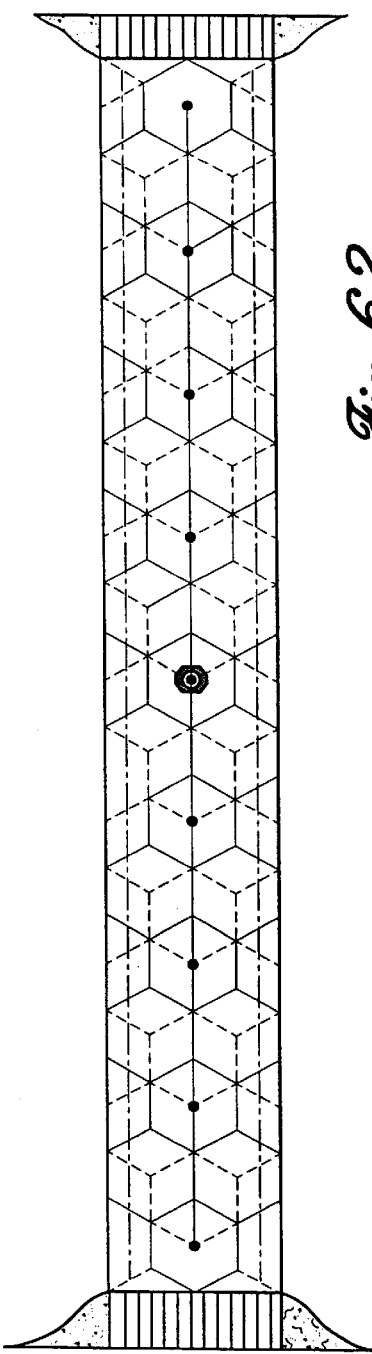
FIG. 62 illustrates a top view of the hexagon bridge assembly of FIG. 61.
Figure 63:
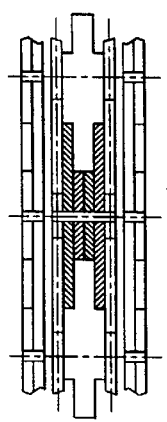
FIG. 63 illustrates a side view of the hexagon bridge assembly of FIG. 61.

The hexagon frame building structures 70 of the present invention also allow reinforced materials and spacers to be inserted between the hexagon frame building structures 70, due to the open configuration of the structures 70. Further, concrete can be poured between the hexagon frame building structure 70 system to form a permanent structure like a wall, floor, road bed, bridge (see FIGS. 61, 61, and 62) and other possible structure.

In one embodiment of the present invention, the hexagon frame building structures 70 contain six cavities. A vacuum is pulled in these cavities to provide the capability for insulation cavities. Insulation or other substances with a thermal storage and release function can be added to this cavity. The preferred insulative material to be inserted into the frame cavities is a bladder full of phase change materials (PCM's) (which can be obtained from Oak Ridge National Lab, Oak Ridge Tenn. U.S.A.). Additionally attic insulation materials, called RCR, that absorbs heat during the day and release heat at night, are a preferred insulative material. This phase change material is insulation that consists of perlite embedded with hydrogenated calcium chloride. The phase change material changes from a solid to liquid at 82° F., absorbing heat (from a hot attic for instance) during the day, before the heat can penetrate a home. When attic temperatures cool at night, the phase change material solidifies and releases the heat back into the attic, moderating outdoor temperatures.

A preferred board for use when applying phase change thermal materials is Concrete Hardie Board. If a hexagon frame building structures 70 is glued to a sheet of hexagon building structure panels, half of a panel is produced. In one embodiment, these panels are provided with gypsum board for the finished wall. Other embodiments employ Concrete Hardie Board to finish the floor.

A hexagon frame building structure that is split along flats 71 is shown in FIGS. 36, 37, and 38. A hexagon frame building structure that is split along points 72 is shown in FIGS. 39, 40, and 41. A partial wall assembly of the hexagon frame building structures 70 and the partial hexagon frame building structures 71 and 72, of FIGS. 33, 36, and 39, is shown in FIGS. 42 and 43. The full and partial hexagon frame building structures 70, 71, and 72 are assembled into a wall (preferably 3.5 inches in thickness). The six alignments fastening holes 4 of each hexagon frame building structures 70 are equally spaced and are located as described in detail above.

Figure 44:
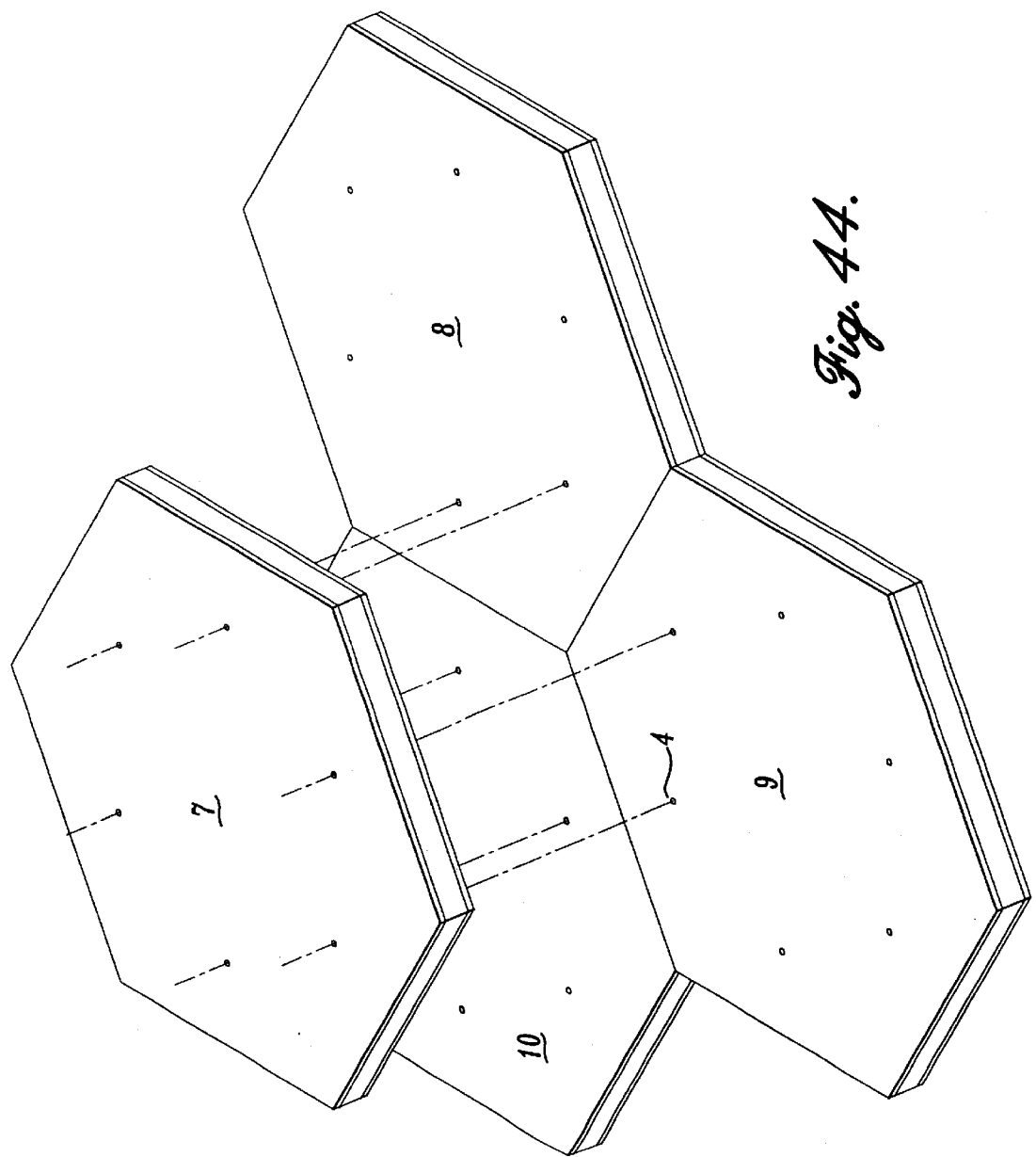
FIG. 44 illustrates a perspective view of the six common fastening holes between four hexagons.
Figure 45:
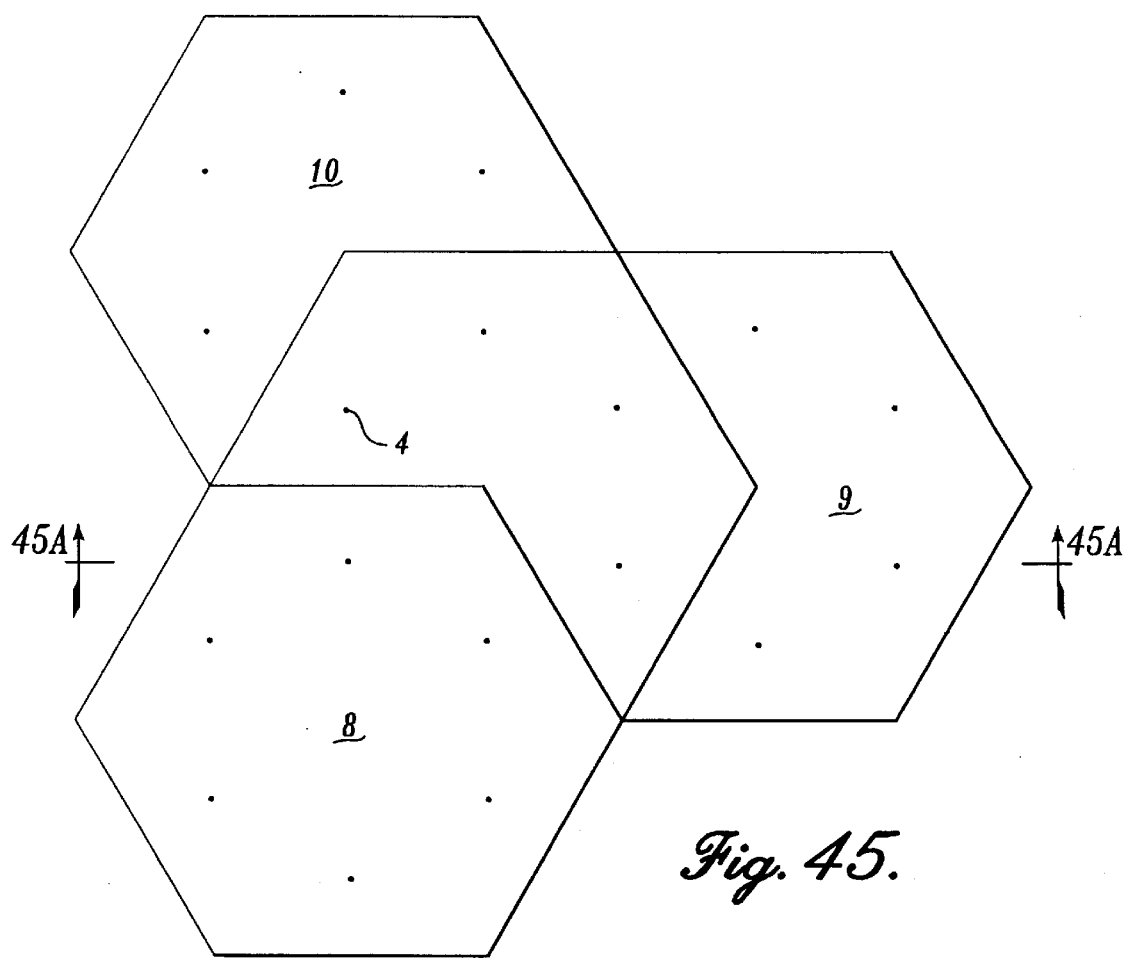
FIG. 45 illustrates the top view of the six common points displayed in FIG. 44.
Figure 45A:
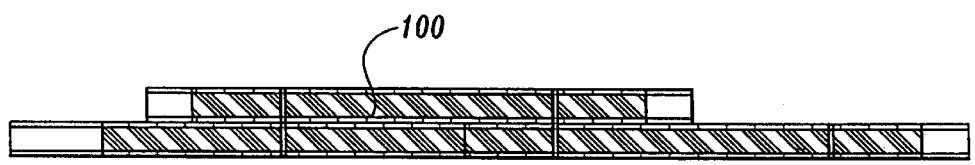
FIG. 45A illustrates a sectional view C—C of FIG. 45.

Referring again to hexagon building structures in FIGS. 44, 45, and 45A, the alignment of the fastening holes 4 of the hexagon building structure 7 with the fastening holes 4 of the hexagon building structures 8, 9, and 10, is clearly shown. The hexagon building structures form a central structure 100 for increased load bearing capability. These six alignments fastening holes 4 are found by drawing lines between each corner-point and the two closest non-adjacent, corner-points (forming two isosceles triangles). The intersecting points of these lines define the location of the alignments fastening holes 4, which are equally spaced. The size of the alignments fastening holes 4 can be varied in order to fit a particular fastening system.

Figures 46A, 46B:
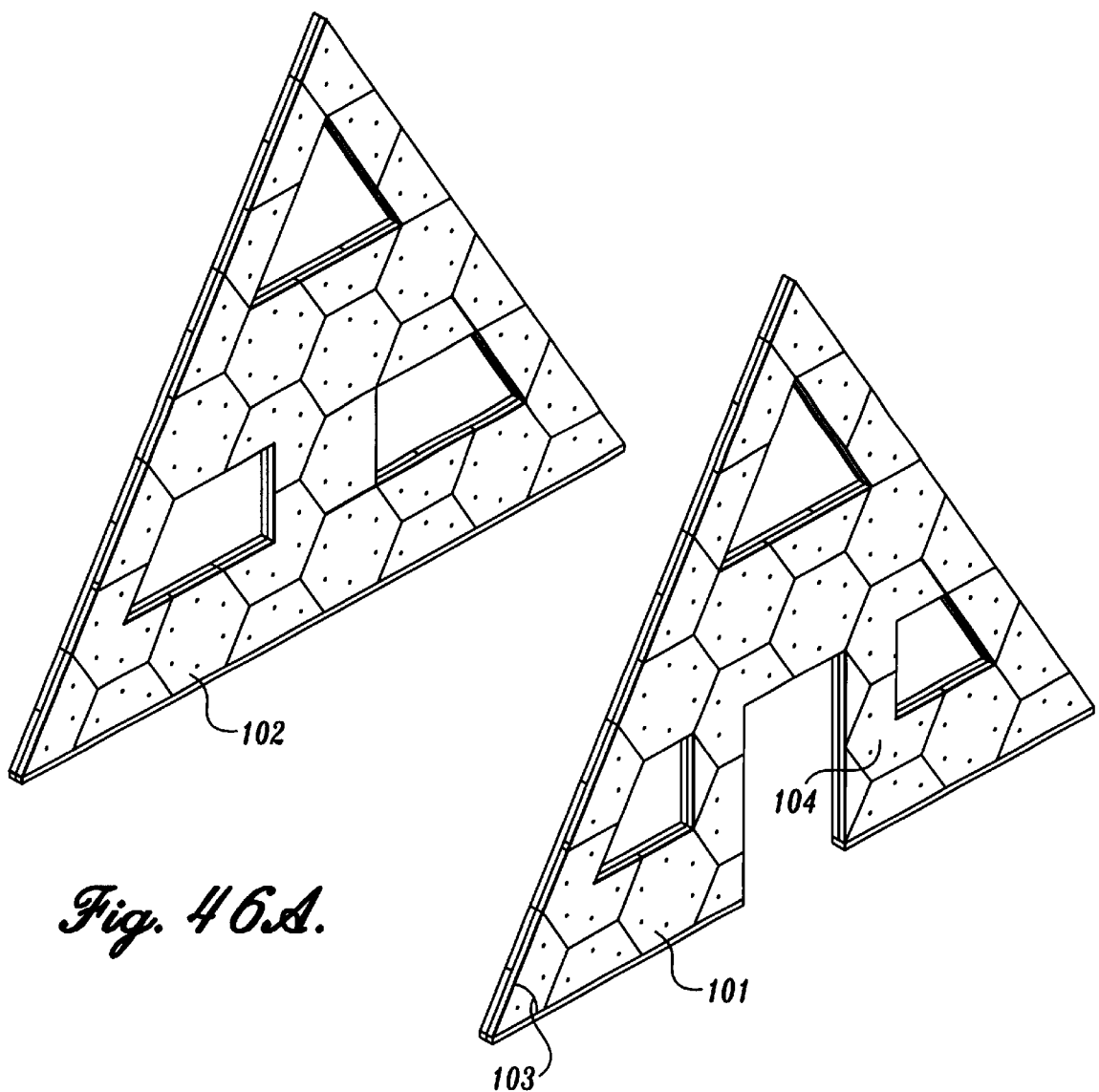
FIG. 46 illustrates a perspective view of "A" frame building end walls.
Figure 47:
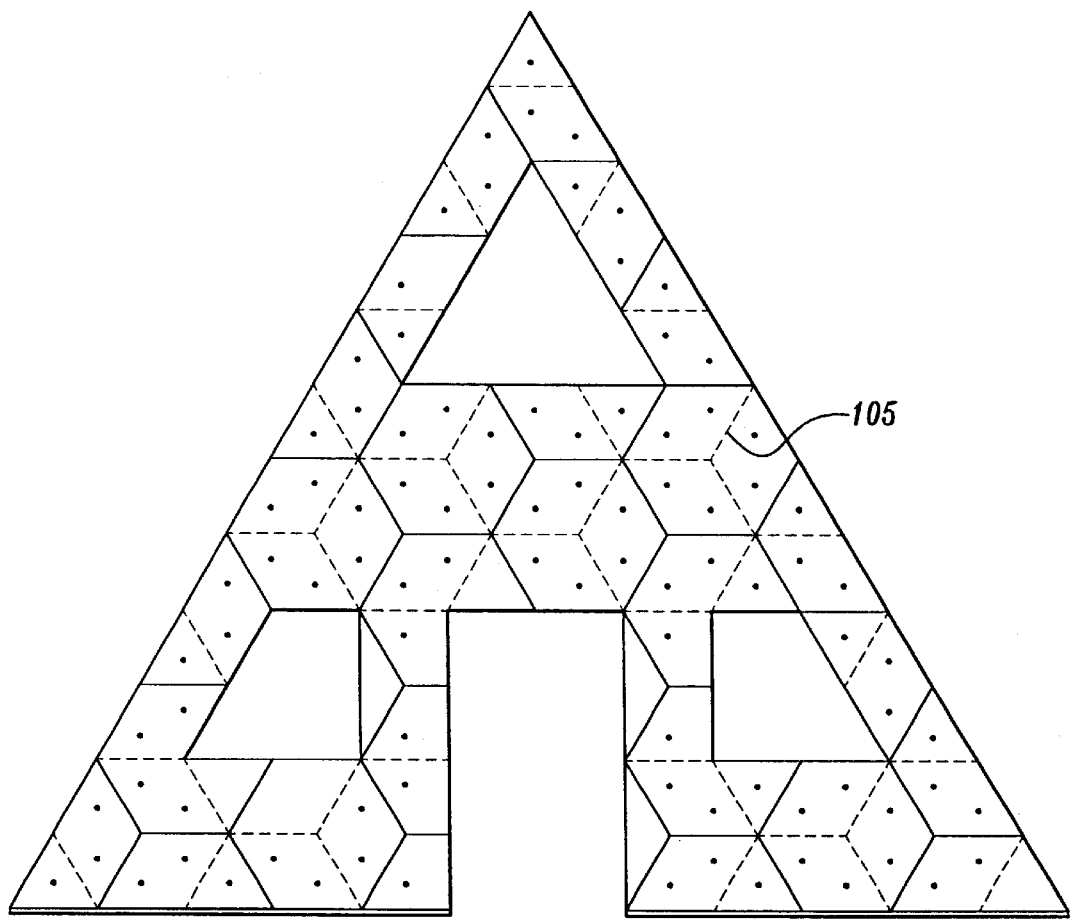
FIG. 47 illustrates an end view of the "A" frame building end walls of FIG. 46 showing the hidden lines of the hexagons offset in the second layer.

"A" frame building end walls 101 and 102, are shown in FIGS. 46A and 46B. When the walls are assembled with hexagon flat ends on the floor, the roof 103 has a pitch of 60 degrees. Depending upon the type of window and door configurations selected, new hexagon derivative building structures 104 may be produced. Alternatively, full hexagon building structures 7 are used, which results in the window size being reduced. The hidden lines 105 produced by the offset layering of the hexagon building structures 7 and hexagon derivative building structures in the second layer, are shown in FIG. 47.

Panel materials are selected based upon many different criteria, including but not limited to, climate and bug resistance requirements. In one preferred embodiment, the panels 1, and 2 are manufactured from wood chipboard. Some other suitable materials include foam, aluminum, steel, fiberglass, concrete, aluminum foam, create, plastics, composites, and the natural fibers native to the home can be selected as building material. The thickness of foam or boards can also be changed to meet the specific builder requirements. In a preferred embodiment, the present invention primarily uses $7/16$-inch Weyerhaeuser chipboard and 2-inch foam, however any metal wood, plastic, concrete fiber, or other material can also be combined. Screws, bolts, and other fasteners are selected by the builders to fit their existing tools and engineering needs. Carpets, hardwood floors, tile, gypsum board, finish wood paneling, and any other suitable finishing materials can be pre-assembled on hexagons.

As previously mentioned, in another preferred embodiment of the present invention the offset layered tessellations take the shape of square building structures 106, as shown in FIG. 48. In this embodiment, four alignment-fastening holes 107 are utilized to produce the common point-to-center fastener locations. Additional alignments fastening holes can be added for specific applications, however, the holes 107 are the preferred number and are positioned in the preferred locations.

Figure 49A:
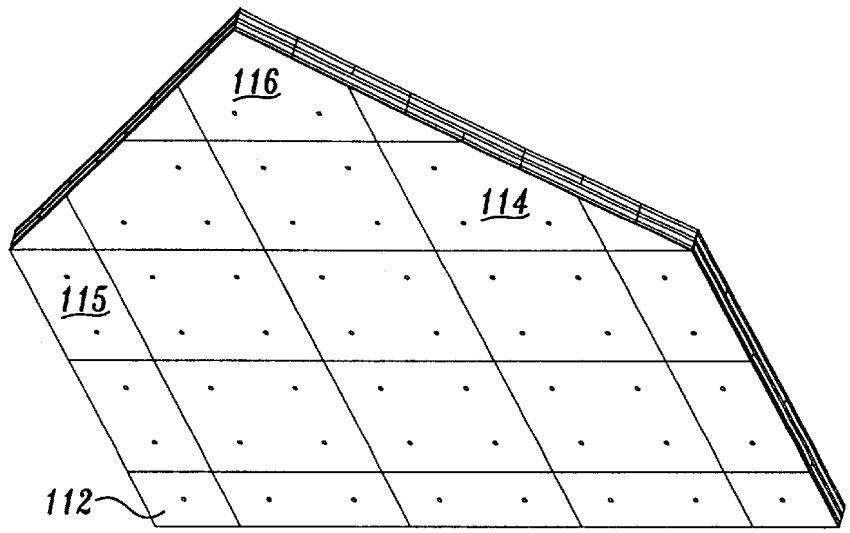
FIG. 49A illustrates a rear perspective view of the layered offset square tessellation building wall of FIG. 49.
Figure 49:
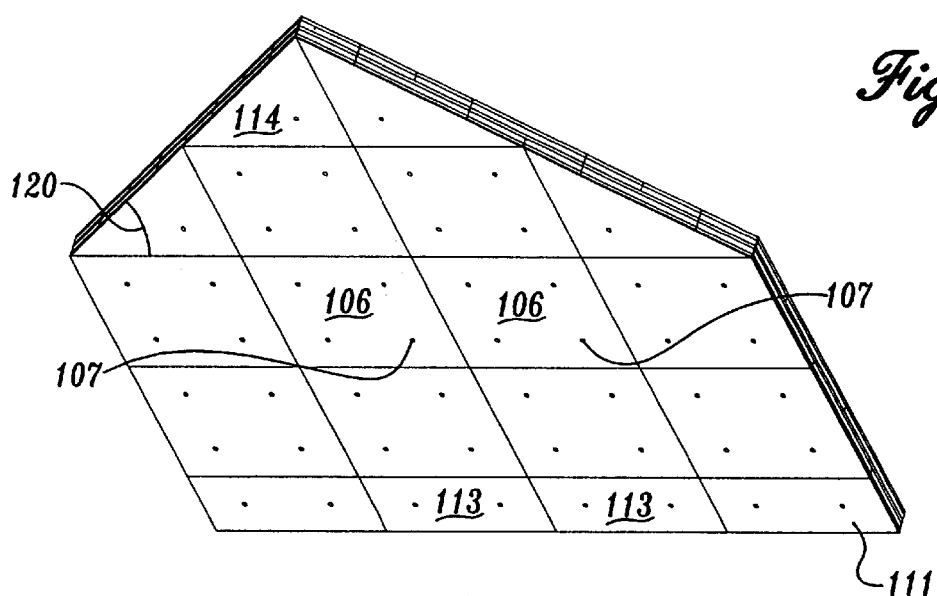
FIG. 49 illustrates a front perspective view of a layered offset square tessellation-building wall with a 45-degree roof pitch and square derivatives.
Figure 52:
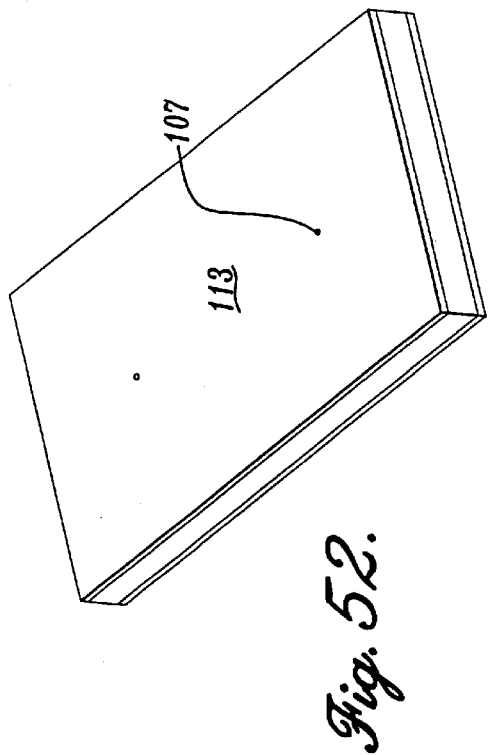
FIG. 52 illustrates a perspective view of a rectangle derivative that is one half of the square panel of FIG. 51 split along flats.
Figure 55:
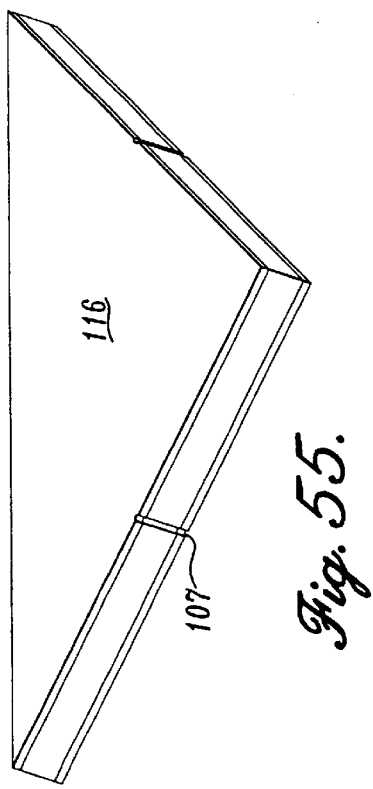
FIG. 55 illustrates a perspective view of a triangle derivative of the square panel of FIG. 51.
Figure 54:
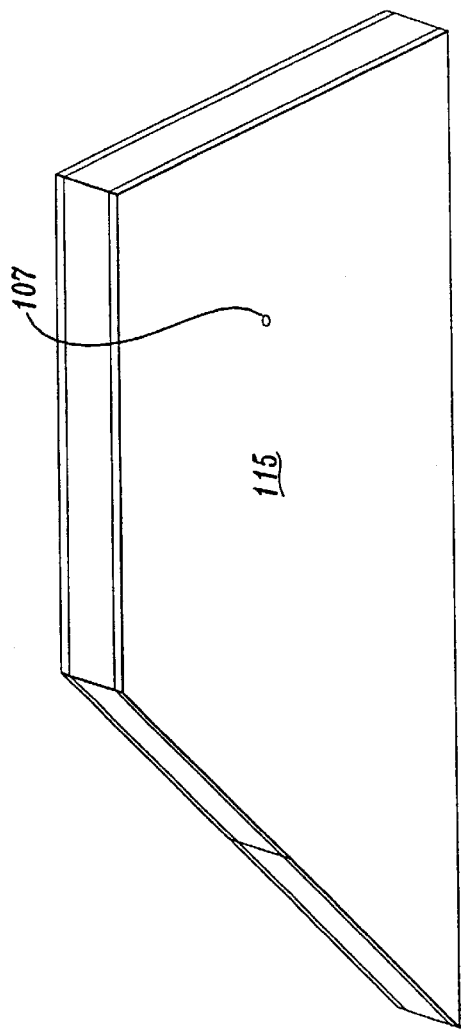
FIG. 54 illustrates a perspective view of a trapezoid derivative of the square panel of FIG. 51.
Figure 53:
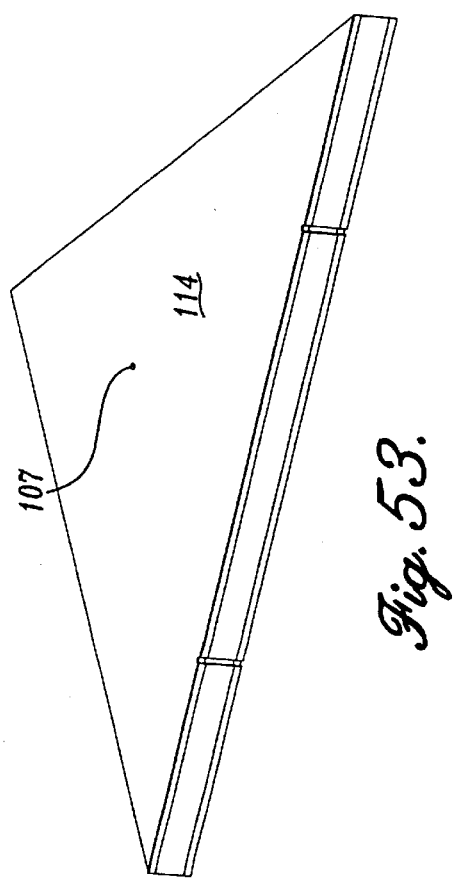
FIG. 53 illustrates a perspective view of a triangle derivative that is one half of the square panel of FIG. 51 split along points.

Referring now to FIGS. 49 and 49A, the front 111 and back 112 of two layered offset square building walls are shown. The square building walls have a 45 degree pitched roof 120. Further, the construction of the square building walls preferably also utilizes square derivative rectangle building structures 113 (shown in FIG. 52), triangle building structures 114 (shown in FIG. 53), trapezoid building structures 115 (shown in FIG. 54), and triangle quarter-section building structures 116 (shown in FIG. 55), in addition to the square building structures 106.

Figure 50A:
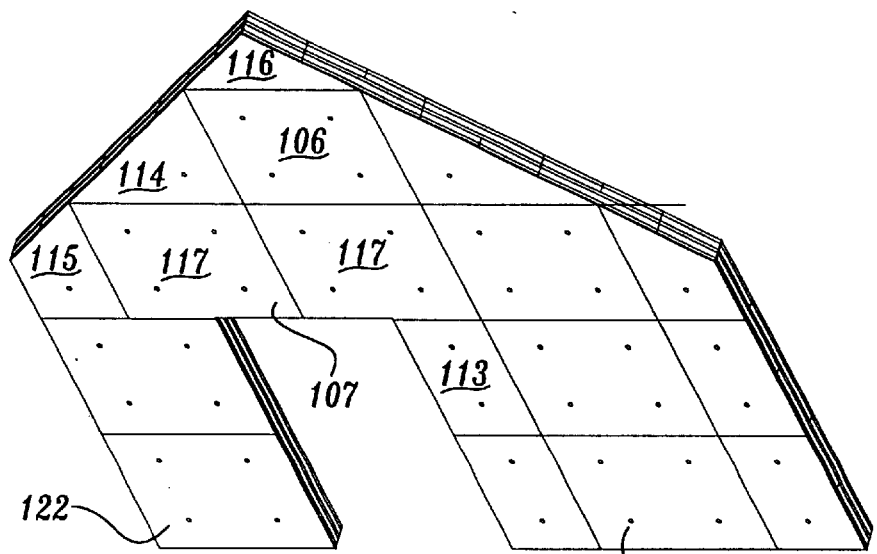
FIG. 50A illustrates a rear perspective view of the layered offset square tessellation-building wall of FIG. 50.
Figure 50:
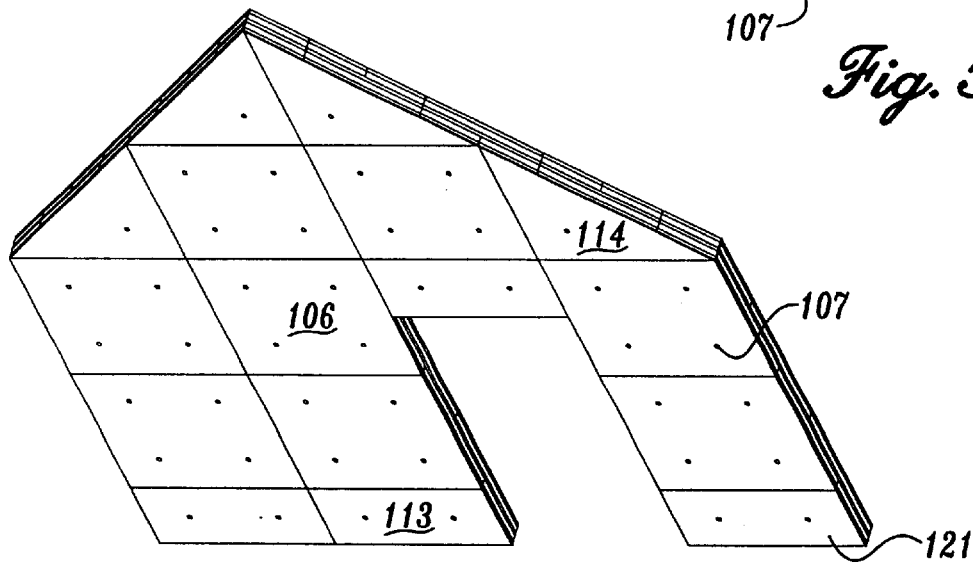
FIG. 50 illustrates a front perspective view of a layered offset square tessellation building wall with 45-degree roof pitch and square derivatives forming doors openings.
Figure 50B:
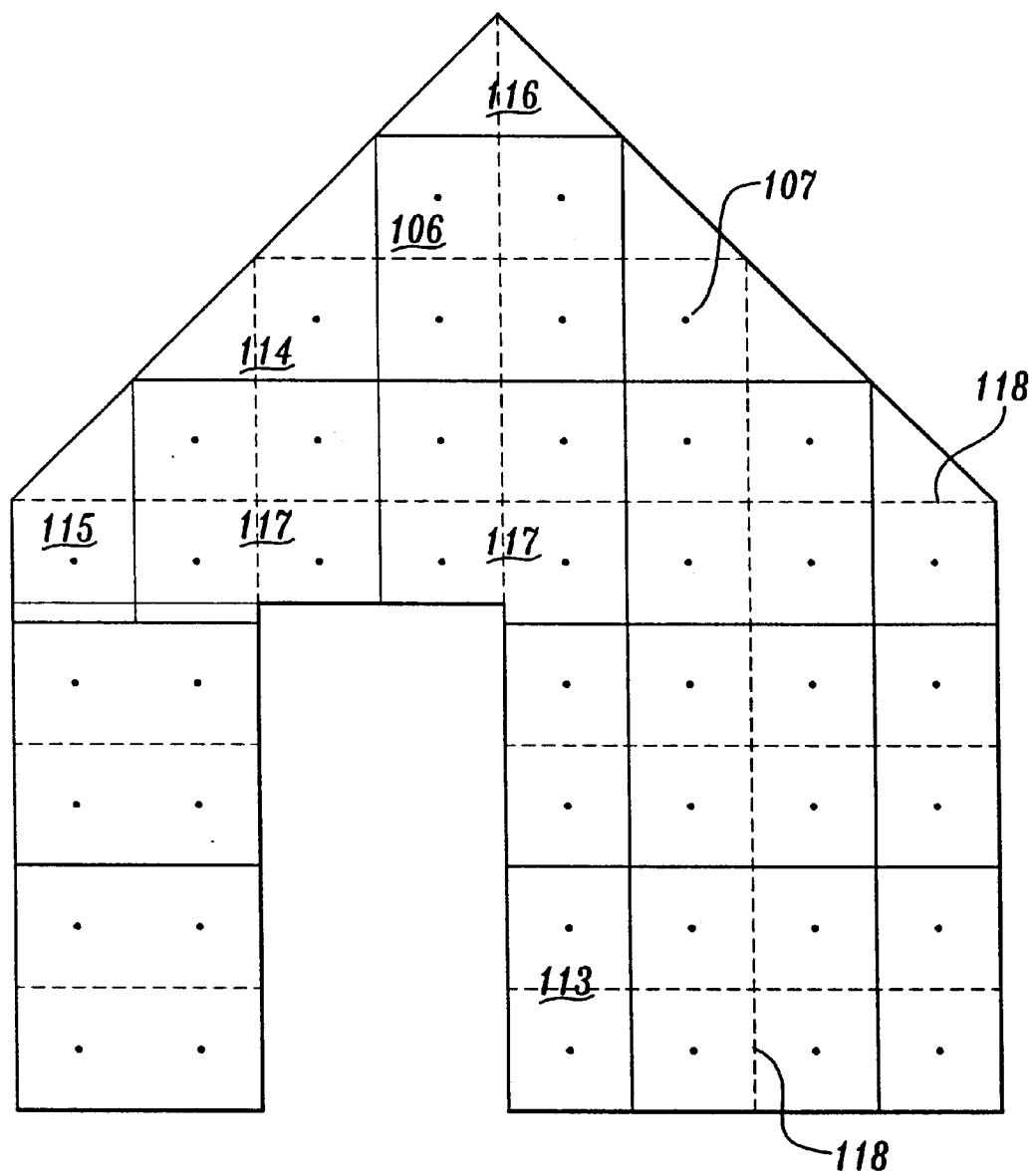
FIG. 50B illustrates an end view of the building wall of FIG. 50 showing the hidden lines of offset squares and derivatives of squares point-to-center locations.

Referring now to FIGS. 50 and 50A, the front 121 and back 122 of another set of two offset layered square building walls are shown. In this embodiment the square building walls also have a 45 degree pitched roof Once again, the construction of the square building walls preferably also utilizes square derivative rectangle building structures 113, triangle building structures 114, trapezoid building structures 115, and triangle quarter-section building structures 116, in order to form doors openings. The hidden lines 118 produced by the offset layering of the square building structures 106 and square derivative building structures (rectangle building structures 113, triangle building structures 114, trapezoid building structures 115, and triangle quarter-section building structures 116) in the second layer, are shown in FIG. 50B, as well as corresponding point-to-center locations.

Figure 51:
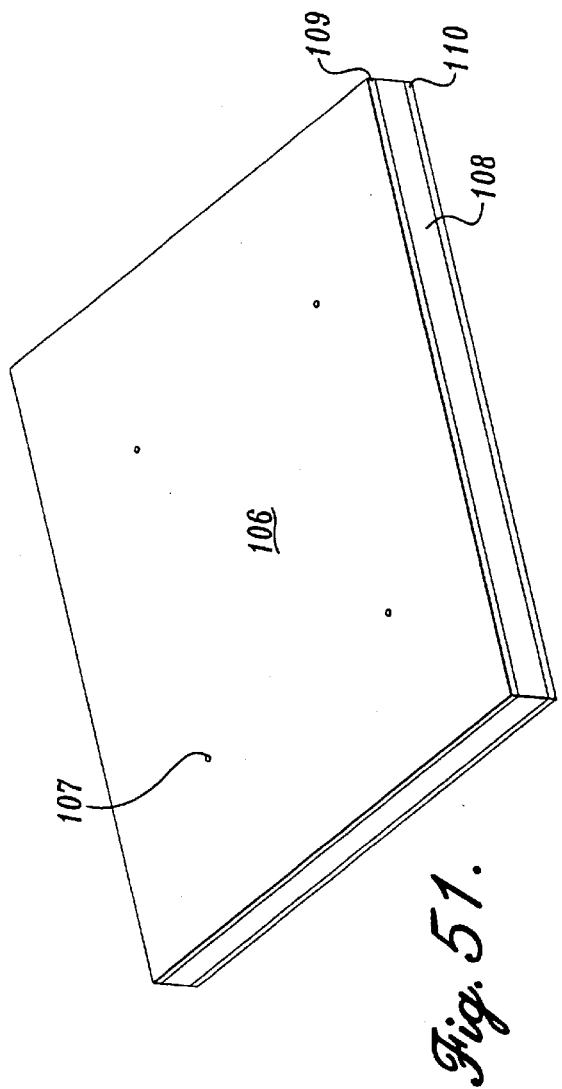
FIG. 51 illustrates a perspective view of a square tessellation panel.

A square tessellation panel 106 is shown in FIG. 51. Common fastening points 107 are located in the center of each of the four-quarter sections. Preferably, the insulation foam core 108 has oriented strand boards (OSB) 109 and 110 adhered to the core 108. Due to the difficulty in cutting concrete, square tessellation panel 106 are a preferred configuration when James Hardie concrete fiberboard is utilized as a building material. Further, square tessellation panels 106 make effective floors and roofs, because concrete can easily be cut and applied to a square shape, and floor covering (i.e. tongue and groove flooring) can come adhered to the concrete fiberboard. Marble, granite, glass, and other difficult to cut materials are better in square form.

Figure 56:
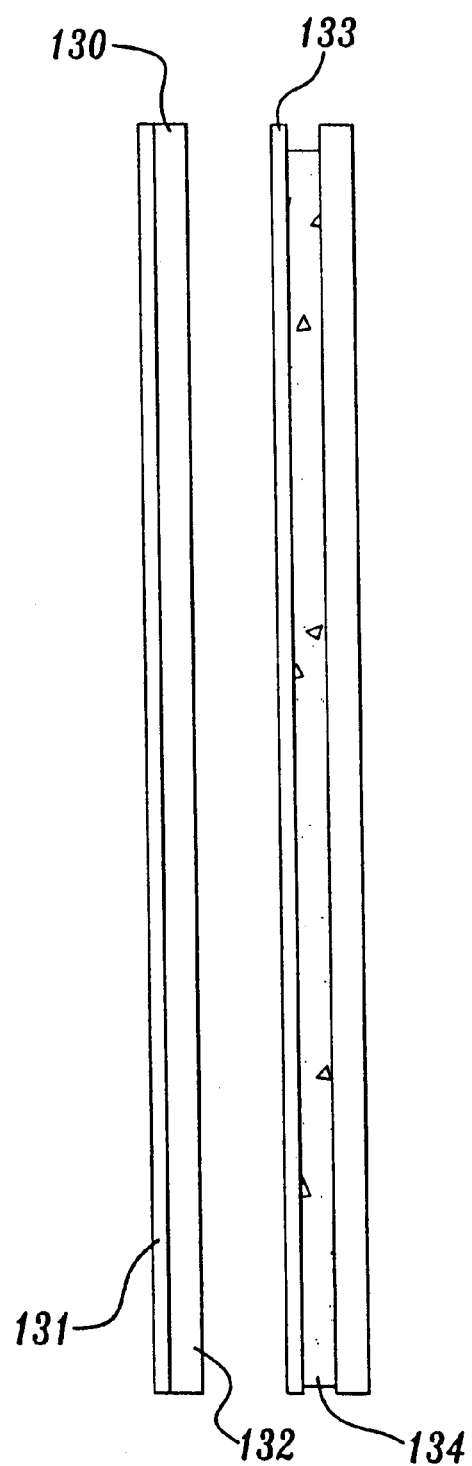
FIG. 56 illustrates a side view of a TV screen.
Figure 57:
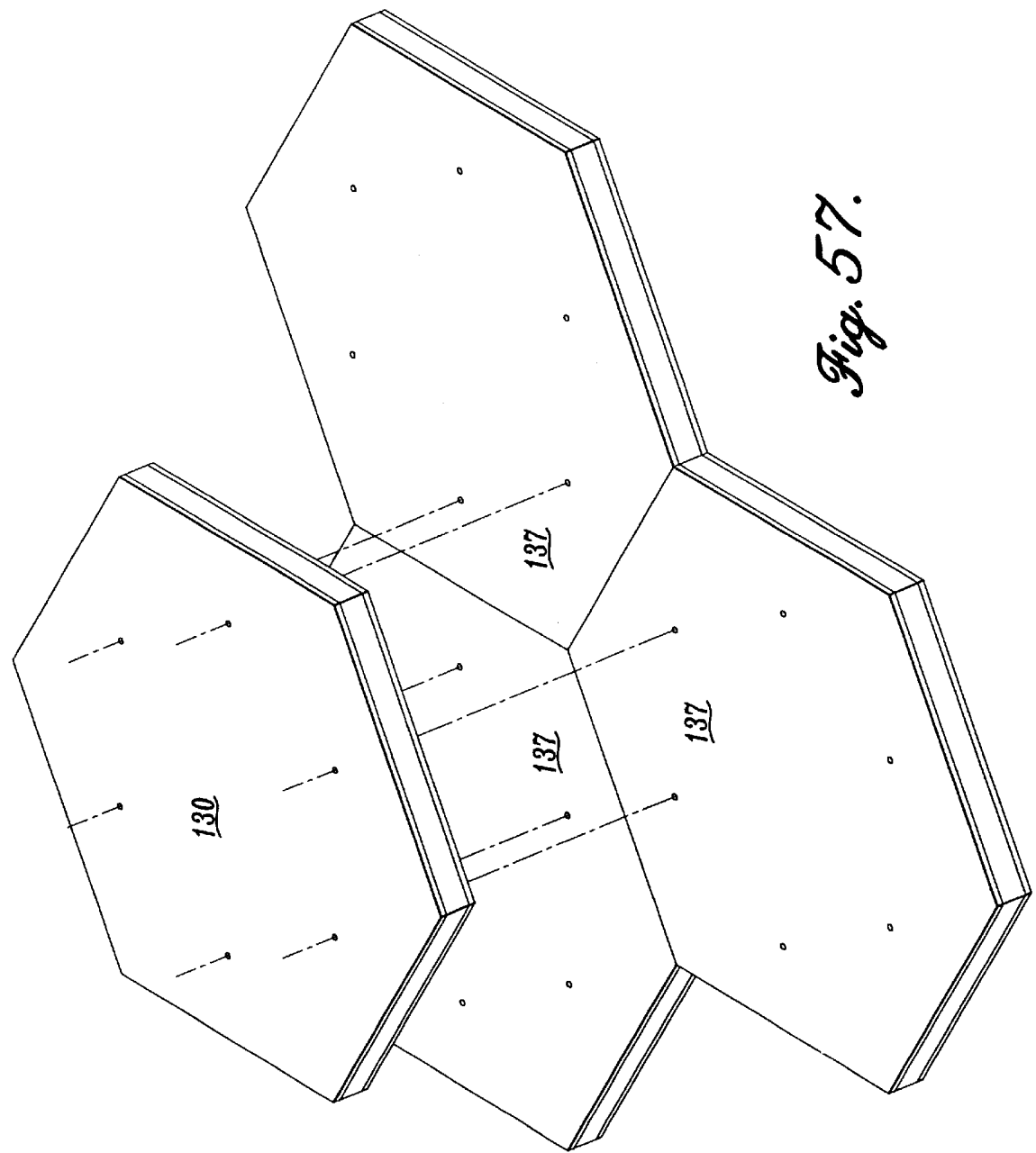
FIG. 57 illustrates a perspective view of a tessellation TV screen cathode/backplate circuits and faceplates aligned by point-to-center offset layering.
Figure 58:
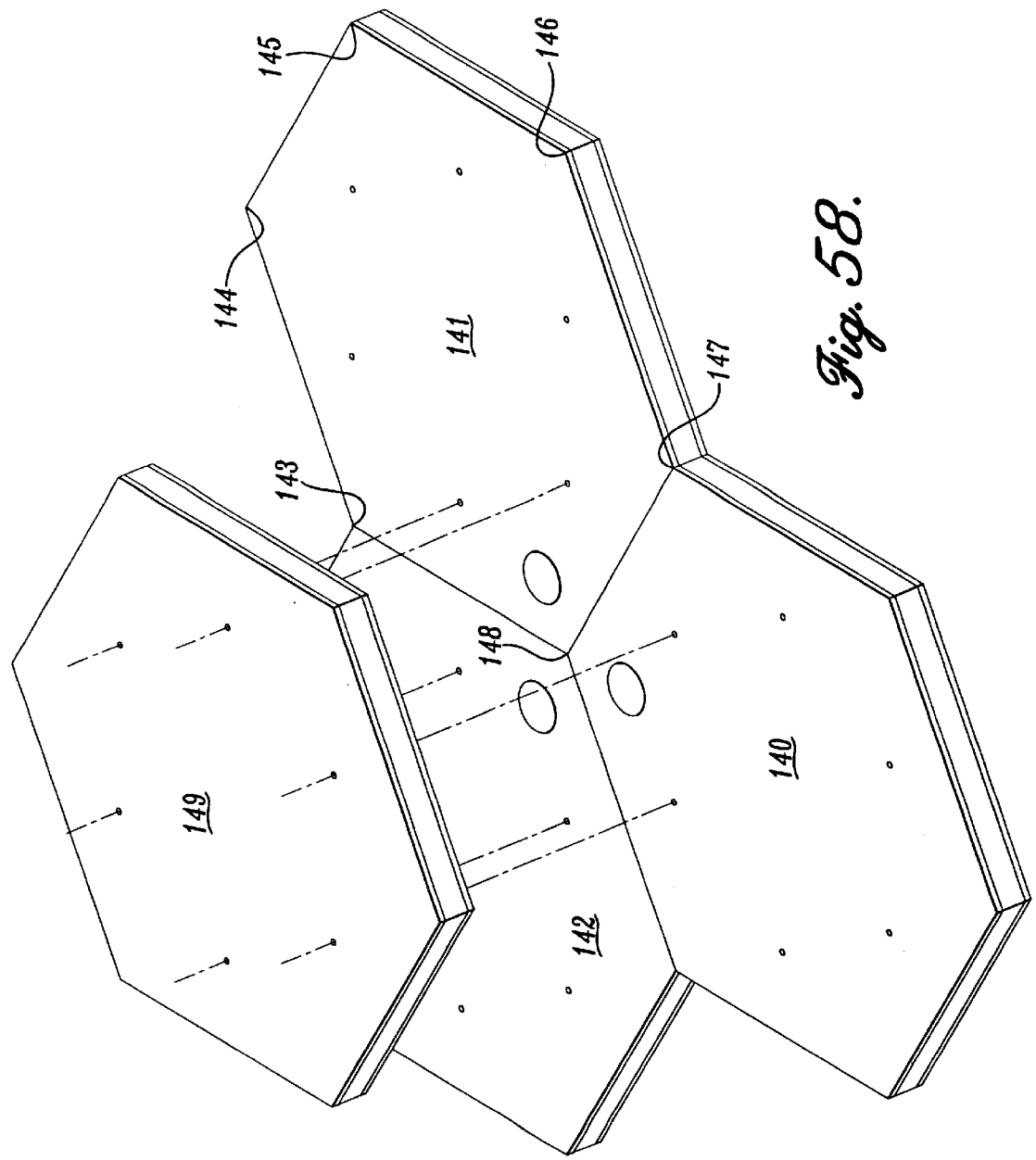
FIG. 58 illustrates a perspective view of an optically transparent multi-color film for TV screen or large optical projectors.

Referring now to FIGS. 56–58, in one embodiment of the present invention, the hexagon building structures are fabricated from a glowing layered plastic developed by Cambridge Display Technology (CDT) of Cambridge, England. In accordance with the present invention, computer and television displays are made from these light-emitting polymers (LEP's). Preferably, these computer and television displays are only approximately 2-millimeters thick.

Other miniature display technologies are field emission devices, which essentially rely on miniaturized versions of electron guns used in cathode ray tubes. These new emerging flat technologies are also compatible with the offset layering hexagon building structure technique of the present invention. To make polymer light-emitting diodes (LED), very thin layers of fluorescent polymer are sandwich between two electrodes. The tooling of these displays to all the needed sizes of is very expensive. Each application requires a new display size. The tessellation offset layering of the present invention is well suited for efficiently constructing flat display technology in order to meet customer's requirements.

Display technologies constructed in accordance with present invention integrate display electrical connections from one offset tessellation layer to one or more other offset tessellation layers, thus, producing a light enhancing screen that projects an even display of light. In light-emitting polymers, this "macro" offset layering can be the poly(p-phenylene vinylene), or PPV layer offset from the CN-PPV layer, including the offset of the protective transparent substrate. These joining lines can be angled to further provide an even display of light where one circuit joins the other. A dramatic advantage of utilizing the present invention for this type of structure, is that to the customer the display appears substantially as one large screen, while to the display manufacturer the screen component sizes are common tessellations and small enough to produce a wide range of sizes, thus reducing costs.

In a preferred embodiment of the present invention that incorporates the offset layering of light-emitting polymer tessellations, hexagon tessellations are employed on one layer, while another layer employs another shaped tessellation, such as square tessellations. (This alternative technique can also be used with the offset layering of hexagon or square building structures). Due to factors such as crystal lattice structure, different materials are prone to effectively produce different types of tessellations. Thus, preferably a material and tessellation matched for optimal configuration parameters.

The offset layering of hexagon building members in accordance with the present invention, is particularly effective when utilized in conjunction with display technologies, because the human eye does not readily distinguish hexagon angles in a scan. Further, the fabrication of display technologies with hexagon building members is complete without the requirement of any hexagon derivative shapes, because the display can be optically turned on or off to make light emit from only half of the hexagon split at the points or flats of the hexagon. Thus, a completely square display can be produced from offset layered hexagon building members. Additionally, uneven edges of the hexagon display assembly can be covered with an opaque frame. In some embodiments of the present invention, more than two layers of tessellations are employed.

The screen technology of a cathode ray tube desktop monitor, or CRT can be combined with a low-power cold cathode to produce a display module less than eight millimeters thick. This technology is known as ThinCRT™ (produced by Candescent Technologies® Corporation, 6320 San Ignacio Ave. San Jose, Calif. 95119) and has been developed with the demands of portable multimedia in mind—to deliver bright true color fidelity, brighter video-rate images with no motion smearing, wider viewing angles and lower power consumption than prior art. The offset layering of hexagon building members in accordance with the present invention is ideally compatible with ThinCRT technology for flat panel displays.

Unlike semiconductor devices, where costs typically decline over time as consumer demands push reducing the size of these devices, the opposite effect is true for displays. Display screens continue to grow larger, and thus, the need for these displays screens to be manufactured with a scaleable technology, such as the hexagon building member offset layering technology of the present invention, continues to increase. By utilizing the present invention, larger sizes of displays screens can be manufactured with little increase of effort, due to an efficient offset layering tessellation architecture of the present invention. Further, fewer tools and processes are needed than that required by the prior art.

Referring again to FIG. 56, a preferred embodiment of the present invention incorporates a cathode/backplate 130 is a matrix of row and column traces. Each crossover lays the foundation for an addressable field of microscopic cathode emitters. Each crossover has up to 5000 emitters, 150 billionths-of-a-meter in diameter. This emitter density assures a high quality image through manufacturing redundancy, and long-life through low operational stress. Emitters generate electrons when a small voltage is applied to both row (base layer) 131 and column (top layer) 132. This method of emission is known as "cold cathode" and is very power efficient because the devices do not have to be heated. Faceplate picture elements (pixels) are formed by depositing and patterning a black matrix, standard red, green, and blue TV phosphors 134 and a thin aluminum layer 133 to reflect colored light forward to the viewer. A focusing grid is layered on the cathode, collimating electrons to strike the corresponding subpixel, ensuring color purity and power efficiency.

FIGS. 57 and 58 illustrates ThinCRT display utilizing the offset layering hexagonal building member architecture of the present invention. The cathode/backplate circuits 130 and faceplates 137 are aligned by point-to-center offset layering (as described in detail above), and are sealed with the driver electronics attached. Total display thickness is less than 8 millimeters. Each pixel is illuminated by thousands of tiny electron emitters providing an even display of light through seamless tileable tessellation patterns (preferably hexagons) formed from pixel layers and cathode layers created from a basic geometric hexagon grid. Alternatively, other tessellations can be applied to form the seamless grid, like squares, triangles, or complex shapes.

Beneficially, hexagon grid seams can be at right angles to the surface plane or slightly angled in order to provide an overlapping seam for phosphors application on that angle or a stepped fit ledge. This phosphors placement eliminates the visible seam, thus, further illustrating the ideal computability of the use of the offset layering hexagonal building member architecture of the present invention with CRT technologies. Additionally, different CRT technologies can be layered in between different functioning structures of the present invention.

Retroreflective sheeting is based on transparent microprism films (manufactured by Reflexite Corporation 120 Darling Drive Avon, Conn. 06001). Microprism retroreflective sheets are produced in a variety of colors and reflect color back to the source of light. These sheets can be cut or cast in hexagon tessellation forms for offset layering in accordance with the present invention, thereby producing images with multiple colors in the same plane. Referring again to FIG. 58, in a CRT display of the present invention, the red 140, blue 141, and green 142 colored hexagons are selected and joined such that at least one of the six hexagon points 143, 144, 145, 146, 147, and 148, is touching all three different colors. This allows light projecting through the hexagon from a back light source 149 to be angled such as to allow most desired colors to be produced.

Multiple layers of colors can be applied to achieve the color desired and the color film can be pure transparent colored film or reflective opaque backed film. In one embodiment of the present invention, this type of apparatus is manufactured on a microscopic level. Top electrodes and transparent electrodes are positioned in each of the six hexagon corner locations. Microscopic hexagon sheeting can be manufactured by Frenel Optics 1300 Mount Read Blvd, Rochester N.Y. 14606. Alternatively, grid patterns of other tessellation are utilized in this offset layering architecture of the present invention, since curved tessellations can be easier to shape. However, hexagon is the preferred shape for this optical color grid. In accordance with the present invention, projected or reflective observable colors are also modified by moving a light source large enough to cover several of the colors around the intersecting points of the hexagon-building members. The movement of the light relative to the intersecting points creates the resultant color mix.

Figure 59:
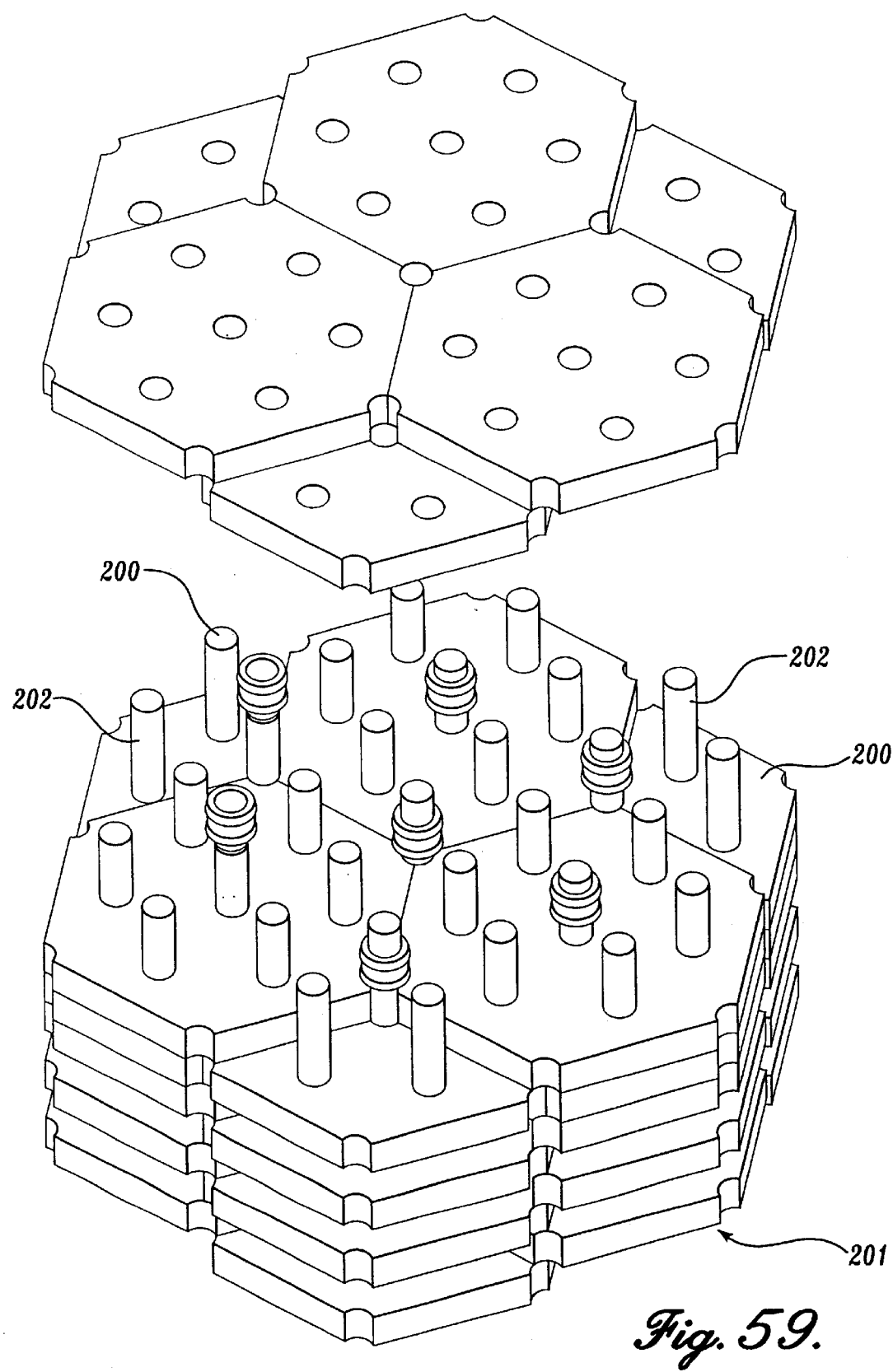
FIG. 59 illustrates a perspective view of a hexagon aircraft fuselage formed from offset hexagons integrated and held together by tubes.
Figure 60:
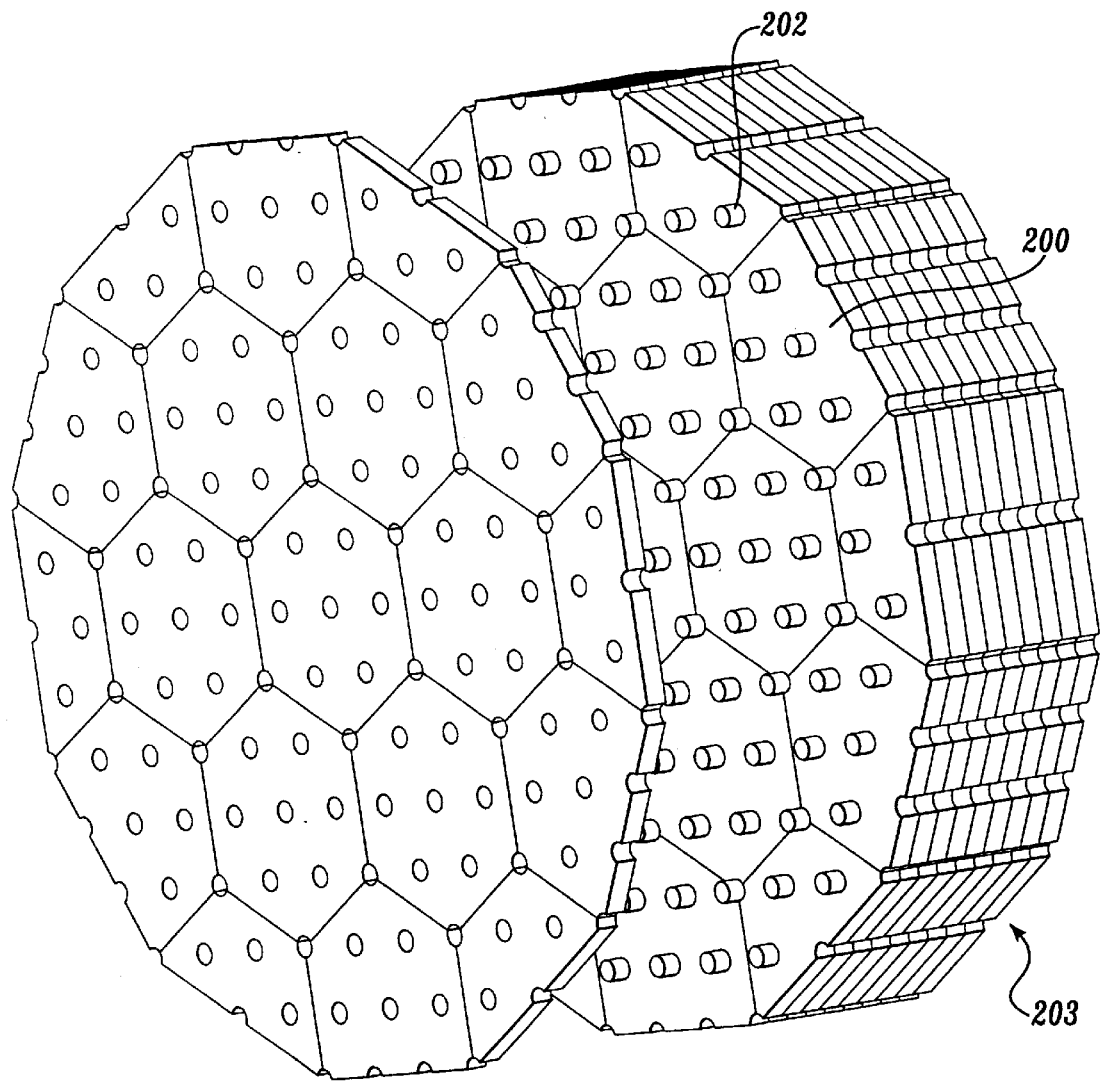
FIG. 60 illustrates a perspective view of a hexagon aircraft fuselage formed from closely tiled hexagons and tubes.

In another embodiment of the present invention, FIGS. 59 and 60 illustrate how helium hexagons are assembled to make aircraft fuselages (as will be described in further detail below).

Referring again to FIG. 1, the foam 3 can be manufactured from many different substances, including but not limited to neoprene, hypalon, vinyl nitrile, nitrile, (NBR), epichlorohydrin, or urethane foam. Closed cell foam is manufactured in several densities. The more air or gas pressure applied during the foaming process, the more or less dense the foam becomes as a final product. Nitrogen gas is typically applied to the gas to make closed cell foam, because trapping nitrogen in the closed cell foam rather than air reduces oxidation. In a preferred embodiment of the present invention, the nitrogen is replaced with helium, producing a new neoprene closed cell helium material. In the present invention helium gas (or another suitable lightweight gas or gas mixture) is used to form closed cell foam, trapping the lightweight gas in the closed cells.

The present invention advantageously traps helium in the closed cells to produce foam that will float in the air. The foam density is determined by the pressure of gas volume applied to the foaming process and can be very dense or of very low density (to the point of being extremely fragile). The mole weight of helium is 0.004. In one atmosphere, one-cubic foot of helium will lift approximately 0.0646 pounds off the ground. Each engineering project utilizing this invention will determine the requisite helium foam density based on strength and lift requirements. Applications designed to encounter only low levels of stress (such as telecommunications or high atmospheric satellite broadcast and transmission systems) use very low-density fragile foam, because the equipment is installed only once, and with very minimal handling or need of impact resistance. In contrast, a personal airplane will be higher density foam for strength, because of landing impact and frequent human handling.

Helium closed cell foam can be shaped into a hexagon building structures 7, as shown in FIG. 1. The closed multi-cell material can form many small shapes, including but not limited to tubes, squares, triangle polygons, hexagons, honeycombs, and other shapes, without departing from the scope of the present invention. Further, in some embodiments of the present invention, loose beads filled with helium are packed in the cavities (like existing aircraft voids) or in hexagon building structures that are specifically engineered to have cavities to hold these beads or relatively small bladders. Multiple balloons are contemplated as well.

Referring now to FIG. 9, in one embodiment of the present invention, carbon fiber composite sheathings 7a and 7b are applied to the hexagon building structures 7 making them substantial structural panels by adding strength to the helium hexagon foam panel. Long rods, preferable graphite carbon fiber rods (or tubes) are inserted in the alignments fastening holes 4 (shown in FIG. 1) or another desired location. In yet another embodiment, substantially round hexagon assemblies 34 (shown in FIGS. 22 and 23) are stacked forming the fuselage of a plane or a boat haul. In the embodiment of the present invention shown in FIG. 44, alignments fastening holes 4 are sized and configured for rod fastener insertion to connect hexagon building structure 7 to hexagon building structures 8, 9, 10, as well as any number of other layers and shapes.

In still other embodiments of the present invention, flat wings and shaped wings are derived using the assembly methodology of present invention. Graphite rods, cable, rope, plastic, carbon fiber, tapes, adhesives, or any other fastener can also be used to build desired shapes. Once a shape is constructed, skin can be wrapped around it. The skin is applied using a variety of methods, including but not limited to fiber glassing, carbon fiber spinning, painting, plastic vinyl wrapping, dipping, and shrink-wrapping. Any cavities in the hexagons can be filled with a foaming agent or other material. Hexagons can be built into personal aircraft or industrial aircraft, toys or any other floating application where floating is desired.

Any shape helium foam parts can be tooled by molding, machining, extruding, hot knife, wire cutting, saw, and water jet cutting techniques. Future shaping by extrusion, ultrasonic, dielectric, microwave, and lithography, chemical or laser is also possible. Some embodiments of the present invention utilize helium closed cell foams for buoyant aircraft. Many base materials will foam other than neoprene and are applied in alternate embodiments of the present invention. Aluminum foam is a good candidate for aircraft. Indeed, many metals can be foam manufactured in accordance with the present invention, such as titanium. Flexible foams are also available and are considered good species of foam for helium.

Honeycomb cores are used in the fabrication of lightweight structures typically used in the aerospace and commercial markets and are employed as the material for hexagon building structure 7 in some embodiments of the present invention. The core material is typically "sandwiched" between skins of aluminum or other high strength composite material. A bonding adhesive is used to attach the "skin" material to the honeycomb core while the in the presents of a helium gas trapping the helium in the honeycomb. The resultant honeycomb panel offers one of the highest strength to weight constructions available. Aircraft engine nacelles, flaps, overhead bins, floor panels, and galleys all are constructed from honeycomb core. Honeycombs can be cut into hexagon shapes, or other tessellations, with fasteners referenced for use in embodiments of the present invention.

Helium gas can be used as the fill gas for the bubbles packaging (such as SealedAir® Bubble packaging manufactured by Sealed Air, Park 80 East, Saddle Brook, N.J. 07663) making the packaging float in air. This bubble helium packaging can be engineered geometrically to match and be sealed into the honeycomb materials referenced above, by sealing the bubbles packaging in additional skin for strength. The plastic can be selected for adhesive bonding, dielectric, or ultrasonic sealing. This sealed helium packaging is used as filler in many parts of aircraft or other structures in accordance with the present invention.

Applications of this technology range from air floating to water floating structures or devices. Space structures are also possible and would aid earth-launching weight. Toys, signs, planes, bridges, boats, trains, barges, cargo, underwater systems, air or watercraft, manned or unmanned systems are possible. Homes and furniture could be built to float in air. An untrained aviator farmer could apply agriculture chemical or biological agents from air. Any air, water, land, space transport, or fixed floating type device could be assembled from this invention. Extremely lightweight planes can be produced that have an actual weight (without helium) that is substantially larger. Carbon foam and other heat adsorbent material can be employed to heat the helium obtaining extra lift. These materials are covered and uncovered to control heat. Phase change heat storage systems are also applied to the present invention to keep the system in high elevation at night by heat recovery.

Prior art in helium systems consist of bladder or balloon type containment. None of this prior art could be accelerated in the air without distorting the shape or destruction. A hole in the bladder type configuration generally loses all the gas in that section. A hole of the same size in the present invention does not significantly impact this helium foam because the present invention teaches a closed cell helium foam that compartmentalizes the gas in millions of individual chambers (in the case of large systems). Thus, this structure can float in the air, be cut without dramatically reducing buoyancy, and has structural strength so building structures can be shaped, coated, and assembled into a variety of configurations. Reticulated foams are open cell, and can still be used as a helium vessel of the present invention, if a coating is placed completely around the foam to seal the helium in the foam.

In still another aspect of the present invention, aircraft related systems are being directed through the air by thin layer composite unimorph ferroelectric driver "wafer" (U.S. Pat. No. 5,632,841 Hellbaum et al.). Motion occurs when high frequency voltage is applied to the wafer driver directing airflow to move the whole aircraft related systems. Hexagon wafers can effectively morph the whole surface of a craft. This technique can be applied to water equipment as well.

Polyimide foam can be foamed in place for installation and repair, resulting in dramatic labor and material cost savings. This low-density foam can be processed into neat or syntactic foams, foam-filled honeycomb or other shapes, and microspheres. These products offer excellent thermal and acoustic insulation, and high-performance structural support, as well as other benefits. Polyimide foam meets aerospace industry demands for high-performance structural foam with increased stiffness but without large weight increases.

The process for this foam begins with a monomeric solution with salt-like properties to yield a homogeneous polyimide precursor solid residuum. The resulting precursor can be processed into polyimide neat or syntactic foams, foam-filled honeycomb or other shapes, and microspheres, all of which produce useful articles through normal foaming techniques. These spheres can be opened vacuumed clean of gas and moisture filled with helium and reclosed. These helium filled foam spheres are ideal for containing the helium, which is a very small molecule that escapes most polymer or latex bladders. These polyimide foams can be coated around other helium filled foam structures like urethane foam structures or reticulated foam filled with helium to form gas tight monolith helium filled foam. Any composite, such as carbon graphite materials, carbon foams, metal aluminum foam, paper, paper fiber products, cloth, and fiberglass can be coated with these foams to seal in helium. Very low-density materials can also be coated with polyimide foam to seal in helium.

This process can produce foam and microsphere materials by reacting a derivative of a dianhydride (e.g., ODPA, BTDA, PMDA) with a diamine (e.g., ODA, PDA, DDS). A mixture of two or more polyimides can be combined or used separately to make a variety of polyimide foams with varying properties. Foams and microspheres can be fabricated to specific densities from approximately 0.5 to over 20 pounds per cubic foot.

A preferred method of the present invention converts the above-mentioned low-density stable polyimide foam into a low-density stable carbon foam or fiber composite by applying microwave energy. In some methodologies of the present invention, pressure is applied during heating the polyimide resin as an added control of density. The resultant carbon foam is very thermally conductive. Aluminum molds are preferred for this process because they do not require a mold release agent. In some alternate embodiments, other molds are selected because they will bond to the carbon end product and become the final integrated net shape products. Carbon foam, carbon fiber, and graphite composites, are all products that can be produced by microwaving a cast or molded shape of polyimide foam. The foam can be cast, molded, and formed on a variety of materials. This foam is transparent and can be backlit illuminating a building. This foam can me easily molded into curved shapes and dome tessellation components.

The unique quality this stable foam has is its integration to other materials and then conversion to carbon materials by microwave or other heat energy. A preferred embodiment of the present invention microwaves polyimide foams to achieve control of polyimide density. This invention teaches converting carbon materials and controlling density to produce reticulated carbon foam having near original polyimide foam density. By controlling the density and form of the foam prior to carbonizing the foam, new levels of material density and material integration can occur.

Microwaving is a radiant energy source so when converting polyimide foam to carbon materials only a portion of the foam needs to be converted based on the power and direction the microwaves are directed. Metals like magnetic materials can be added to the foam prior to microwaving the materials into carbon materials. These metals can be positioned to reflect the microwaves into a pattern that localizes the carbon conversion of the polyimide. Insulators and conductive carbons result from this process. These processes can be stopped at any point during conversion to get carbon, graphite, or other composites of the polyimide foam. No other process provides the localization of producing insulation and conductive materials as an integrated product. Carbon fibers (chopped, or long fibers), fiberglass, metals, or other fibers can me molded into this composite system. Paper molds can be cast onto and then removed to form complex shapes.

In a preferred embodiment of the present invention, aluminum foam material is utilized to construct foam panels, hexagon building structures 7, and other tessellation shapes. Additionally, aluminum foam can be applied to obtain a final net shape on the outer structure of a hexagon assembly. Hard aluminum foam cores can have complex exact shapes on the outside. The final outer skin hexagonal composite can also be a unimorph ferroelectric driver "wafer" that provides electronic control of the surface shape.

Silica carbonate aluminum foam exhibits a combination of qualities not found in other low-density materials including sufficient strength to serve as structural members, good thermal qualities for insulation, resistance to fire and immunity to electromagnetic fields. Aluminum foam is strong enough to build panels without sheathing bonded to each side of the panel, just aluminum foam is needed. Sheathing panels can be bonded into a sandwich arrangement if extra strength is desired in application where thickness and strength need to be at the highest density. Aluminum foam can be heated in shaping the hexagon building structures 7 into curved shapes in order to form a macro-sphere, large tube, aerospace component, boat hull, auto body, or frame components. Final net shape surfaces can be polyimide foams as described above.

During the gas injection stage of aluminum foam production, helium gas can be substituted for air. (Other gases and/or liquids can also be substituted for air and combined with the aluminum foam.) The combination of low aluminum alloy weight and helium gas is ideal for making strong air buoyant structures. Heat should be applied along with any other coating to seal the helium into the aluminum foam. Copolymides polyimides, or other suitable materials can be added to the aluminum foam to form a gas tight seal for helium gas. Carbon fiber, carbon foam, ceramic spheres, copper foam, glass, and other structural material can be cast while the foam is in the liquid state. Paper and burnable cores can also be cast forming complex shapes.

Aluminum foam can be cast around a carbon foam or carbon fiber monolith to produce gas tubes. In the case of the carbon fiber, an insulated structural vessel will form around the carbon fiber. A copolymide coating can be applied to the outside of the carbon fiber to form a gas tight seal between the carbon fiber and aluminum foam. The closed cell foam of the aluminum has small fractures that require closure to produce a gas tight seal. This aluminum foam can produce simple structural insulated foam around a pressure vessel. Carbon fiber reduces gas pressure by adsorbing the gas. Natural gas stores at 3000 pounds per square inch (psi) in a typical pressure vessel, but when stored on carbon fiber gas pressure is reduced to 500 psi. The aluminum foam as a structural and insulating material further reduces the possible rupture of a gas pressure or vacuum vessel. Thus, fuel vessels can be inserted into hexagon building structures to store fuels. ORNL carbon foam referred to above is porous foam and aluminum does not stick to it when it is molded to its surface shape. The porous carbon foam can have air passed through it to foam the silica carbonate aluminum foam materials. The crucible containing the aluminum just prior to foaming would be totally or partially made from carbon foam. This carbon foam will not provide an opening for aluminum to flow through, but does provide an air path for blowing air into the aluminum foam replacing mechanical stirring and air insertion rods that do not make uniform aluminum.

Reticulated aluminum foam can be manufactured by placing the silica carbonate aluminum in a carbon foam closed tube. In one embodiment the mold can be a hexagon mold with the walls of the hexagon a graphite closed surface and two of the opposing flat ends of the hexagon would be porous carbon foam, one to rest the molten aluminum materials on and the other to pull a vacuum. When a vacuum is pulled, the aluminum will foam into a reticulated porous aluminum in the form of a hexagon. Hexagon molds are used in this example, but any shape will work where there is a carbon foam surface to rest the molten aluminum on and a vacuum surface to pull gas through the aluminum reticulating it.

In FIG. 8 a cross sectional view of two hexagons adsorption/desorption vessels 500 and ice sublimation vessel 501 are inserted into the hexagons. This system is disclosed in BALANCED ADSORPTION REFRIGERATOR U.S. Pat. No. 5,813,248 Jack Bauer and David Zornes. A thermally conductive hexagon material is used on the outer hexagon and an insulative material is isolating the two vessels 500 and 501 that are connected by a value 502. As sunlight heats up the hexagon water desorption of the vessel 500 occurs and when the hexagon is shaded or the sun moves the vessel 500 cools sublimating the water (ice) removing the heat from the building. This system could be used in reverse by switching the location of the vessels or having both type of vessels in the hexagon walls, absorbing heat from the outside climate/air and heating the inside of the building.

As shown in FIG. 65 a hexagon assembly 930 may be formed by interconnecting several individual hexagons two of which are shown in FIG. 65 each having spaced apart plates or leaves 941 that interlock with leaves of adjacent shaped portions, The shaped portions 940 may be connected due to frictional forces between the leaves 941. The shaped portions 940 may include a carbon foam material, aluminum foam material or any material that provide desired functions. Each of the shaped portions 941 shown in FIG. 65 has a generally hexagonal planform outline, so that the shaped portionsform a generally gapless array when assembled (tessellation).

The present invention has been described in relation to a preferred embodiment and several alternate preferred embodiments. One of ordinary skill, after reading the foregoing specification, may be able to affect various other changes, alterations, and substitutions or equivalents thereof without departing from the concepts disclosed. It is therefore intended that the scope of the Letters Patent granted hereon be limited only by the definitions contained in the appended claims and equivalents thereof.

The embodiments of the invention in which an exclusive property or privilege is claimed are defined as follows:

1. A building structure configured to be utilized in an offset layering building technique, the building structure comprising:

a first hexagon member having a central point and six corner points; and a second hexagon member having a center point and six corner points, said second hexagon member corresponding in size and shape to the first hexagon member;

wherein the first hexagon member is selectively mountable to the second hexagon member in an offset layering configuration, such that one of the six corner points of the first hexagon member aligns with the center point of the second hexagon member, and wherein the first and second hexagon members each contain an array of equally spaced locating holes, and at least two of the equally spaced locating holes of the first hexagon member align with at least two of the equally spaced locating holes of the second hexagon member when the first and second hexagon members are selectively mounted in an offset layering configuration.

2. A building structure configured to be utilized in an offset layering building technique, the building structure comprising:

a first hexagon member having a central point and six corner points; and a second hexagon member having a center point and six corner points, said second hexagon member corresponding in size and shape to the first hexagon member;

wherein the first hexagon member is selectively mountable to the second hexagon member in an offset layering configuration, such that one of the six corner points of the first hexagon member aligns with the center point of the second hexagon member, and wherein the hexagon members each include a core that is sandwiched between first and second panels.

3. The building structure of claim 2, wherein the hexagon member core is a foam core.

4. A building structure configured to be utilized in an offset layering building technique, the building structure comprising:

a first hexagon member having a central point and six corner points; and a second hexagon member having a center point and six corner points, said second hexagon member corresponding in size and shape to the first hexagon member;

wherein the first hexagon member is selectively mountable to the second hexagon member in an offset layering configuration, such that one of the six corner points of the first hexagon member aligns with the center point of the second hexagon member, and wherein a central aperture is located at the center point of each hexagon member, and wherein a radial cutout is located at each corner point of each hexagon member.

5. The building structure of claim 4, wherein a peg member is selectively securable to the central aperture of each hexagon member, and wherein the peg member is selectively securable to the radial cutouts located at each corner point of each hexagon member.

6. A building structure configured to be utilized in an offset layering building technique, the building structure comprising:

a first hexagon member having a central point and six corner points; and a second hexagon member having a center point and six corner points, said second hexagon member corresponding in size and shape to the first hexagon member;

wherein the first hexagon member is selectively mountable to the second hexagon member in an offset layering configuration, such that one of the six corner points of the first hexagon member aligns with the center point of the second hexagon member, and wherein each hexagon member contains conduit holes oriented in the plane of each hexagon member.

7. A building structure configured to be utilized in an offset layering building technique, the building structure comprising:

a first hexagon member having a central point and six corner points; and a second hexagon member having a center point and six corner points, said second hexagon member corresponding in size and shape to the first hexagon member;

wherein the first hexagon member is selectively mountable to the second hexagon member in an offset layering configuration, such that one of the six corner points of the first hexagon member aligns with the center point of the second hexagon member, and wherein the hexagon members contain foam tubes.

8. A building structure configured to be utilized in an offset layering building technique, the building structure comprising:

a first hexagon member having a central point and six corner points; and a second hexagon member having a center point and six corner points, said second hexagon member corresponding in size and shape to the first hexagon member;

wherein the first hexagon member is selectively mountable to the second hexagon member in an offset layering configuration to produce housing structures, such that one of the six corner points of the first hexagon member aligns with the center point of the second hexagon member, the hexagon members being of different sizes and incorporated together to produce housing structures.

9. A building structure configured to be utilized in an offset layering building technique, the building structure comprising:
- a first hexagon member having a central point and six corner points; and
- a second hexagon member having a center point and six corner points, said second hexagon member corresponding in size and shape to the first hexagon member;
- wherein the first hexagon member is selectively mountable to the second hexagon member in an offset layering configuration, such that one of the six corner points of the first hexagon member aligns with the center point of the second hexagon member, and wherein hexagon members are buoyant and are selectively mountable to each other to produce buoyant structures.

10. A building structure configured to be utilized in an offset layering building technique, the building structure comprising:
- a first hexagon member having a central point and six corner points; and
- a second hexagon member having a center point and six corner points, said second hexagon member corresponding in size and shape to the first hexagon member;
- wherein the first hexagon member is selectively mountable to the second hexagon member in an offset layering configuration, such that one of the six corner points of the first hexagon member aligns with the center point of the second hexagon member, and wherein the hexagon members comprise non-paneled hexagon frames.

11. The building structure of claim 10, wherein the hexagon frames are selectively mountable to each other in an offset layering configuration that allows reinforcement material to be interspersed between the hexagon frames.

12. The building structure of claim 10, wherein hexagon members having first and second panels are selectively mountable to hexagon frames in an offset layering configuration.

13. The building structure of claim 10, wherein the hexagon frames contain cavities.

14. The building structure of claim 13, wherein the hexagon frame cavities contain insulative material.

15. The building structure of claim 13, wherein the hexagon frame cavities contain phase change materials.

16. A building assembly employing an offset layering architecture, the building assembly comprising:
- a plurality of hexagon members, each hexagon member including a central protrusion and six corner receptacles;
- wherein the central protrusion of each hexagon member is configured to align with a corner receptacle of another hexagon member; and
- wherein each hexagon member includes an array of equally spaced connecting holes in the plane of the hexagon member for selectively securing hexagon members to one another in an offset layering architecture.

17. The building assembly of claim 16, wherein at least two of the equally spaced connecting holes of a first hexagon member align with at least two of the equally spaced connecting holes of a second hexagon member when a first and second hexagon member are selectively mounted in an offset layering configuration.

18. The building assembly of claim 16, wherein the central protrusions are selectively connectable to the hexagon members.

19. The building assembly of claim 16, wherein each hexagon member contains conduits holes oriented in the plane of each hexagon member.

20. The building assembly of claim 16, wherein the hexagon members are selectively mountable to each other in an offset layering configuration to produce housing structures.

21. The building assembly of claim 16, wherein the hexagon members are selectively mountable to each other in an offset layering configuration to produce housing structures using only hexagon members and five hexagon derivative shaped members.

22. The building assembly of claim 16, wherein the hexagon members are non-destructively, non-customizedly secured to each other to produce housing structures, such that the hexagon members are readily recyclable for use in another structure due to the non-destructive, non-customized securement.

23. The building assembly of claim 16, wherein the hexagon members are a helium filled closed foam.

24. The building assembly of claim 16, wherein the hexagon members are a reticulated foam that is coated, sealed, and filled with helium.

25. The building assembly of claim 16, wherein the hexagon members are a compartmentalized helium filled closed foam.

26. The building assembly of claim 16, wherein the hexagon members are a polymide foam.

27. The building assembly of claim 16, wherein the hexagon members are a aluminum foam.

28. A display system configured utilizing an offset layering architecture, the display system comprising:
- a plurality of hexagon members having central points and corner points;
- wherein the plurality of hexagon members are selectively securable in a juxtapositioned offset layering configuration, such that at least one of the six corner points of each hexagon member aligns with the center point of another hexagon member, thereby constructing the display system, and wherein the hexagon members are light emitting polymers.

29. The display system of claim 28, wherein the hexagon members are selectively securable to each other in an offset layering configuration to produce a readily scaleable display system.

30. The display system of claim 28, wherein the hexagon members are selectively securable to each other to produce a cold cathode emitter display system.

31. The display system of claim 28, wherein the hexagon members are selectively mountable to each other to produce thin CRT display systems.

32. A display system configured utilizing an offset layering architecture, the display system comprising:
- a plurality of hexagon members having central points and corner points;
- wherein the plurality of hexagon members are selectively securable in a juxtapositioned offset layering configuration, such that at least one of the six corner points of each hexagon member aligns with the center point of another hexagon member, thereby constructing the display system, and wherein the hexagon members are microprism films.

33. A display system configured utilizing an offset layering architecture, the display system comprising:

a plurality of hexagon members having central points and corner points;

wherein the plurality of hexagon members are selectively securable in a juxtapositioned offset layering configuration, such that at least one of the six corner points of each hexagon member aligns with the center point of another member, thereby constructing the display system, and wherein the hexagon members are retroreflective sheeting.

* * * * *

UNITED STATES PATENT AND TRADEMARK OFFICE
CERTIFICATE OF CORRECTION

PATENT NO. : 6,631,603 B2
DATED : October 14, 2003
INVENTOR(S) : D.A. Zornes

It is certified that error appears in the above-identified patent and that said Letters Patent is hereby corrected as shown below:

Title page,
Item [57], ABSTRACT,
Line 5, "radial cutouts the corners" should read -- radial cutouts at the corners --

Column 3,
Line 31, "first wall section;" should read -- first hexagon wall section; --
Line 32, "second wall section;" should read -- second hexagon wall section; --
Line 33, "third wall section;" should read -- third hexagon wall section; --
Line 34, "fourth wall section;" should read -- fourth hexagon wall section; --
Line 35, "fifth wall section;" should read -- fifth hexagon wall section; --
Line 36, "sixth wall section;" should read -- sixth hexagon wall section; --
Line 37, "seventh wall section;" should read -- seventh hexagon wall section; --

Column 4,
Line 5, "a eighth" should read -- an eighth --
Line 11, "a eleventh" should read -- an eleventh --

Column 8,
Line 59, "right 17," should read -- right, --

Column 10,
Line 45, "curved 34A on" should read -- curved on --
Line 66, "hexagon-building" should read -- hexagon building --

Column 11,
Line 11, "67*a*, and 68*a*." should read -- 67*a* and 68*a*. --

Column 12,
Line 39, "second layer," should read -- second layer --

UNITED STATES PATENT AND TRADEMARK OFFICE
CERTIFICATE OF CORRECTION

PATENT NO. : 6,631,603 B2
DATED : October 14, 2003
INVENTOR(S) : D.A. Zornes

It is certified that error appears in the above-identified patent and that said Letters Patent is hereby corrected as shown below:

Column 24,
Line 2, "conduits holes" should read -- conduit holes --
Line 34, "a aluminum" should read -- an aluminum --

Signed and Sealed this

Tenth Day of February, 2004

JON W. DUDAS
*Acting Director of the United States Patent and Trademark Office*